US011252237B2

(12) United States Patent
Yamada et al.

(10) Patent No.: US 11,252,237 B2
(45) Date of Patent: Feb. 15, 2022

(54) DEVICE MANAGEMENT SYSTEM AND DEVICE MANAGEMENT METHOD

(71) Applicant: PANASONIC INTELLECTUAL PROPERTY MANAGEMENT CO., LTD., Osaka (JP)

(72) Inventors: Mitsuki Yamada, Osaka (JP); Masayuki Kozuka, Osaka (JP); Kunio Gobara, Osaka (JP); Shinya Nakai, Nara (JP); Masaya Yamamoto, Kyoto (JP); Tomoki Ogawa, Osaka (JP); Junya Suzuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/638,692

(22) PCT Filed: Feb. 27, 2019

(86) PCT No.: PCT/JP2019/007572
§ 371 (c)(1),
(2) Date: Apr. 29, 2020

(87) PCT Pub. No.: WO2019/168032
PCT Pub. Date: Sep. 6, 2019

(65) Prior Publication Data
US 2021/0014314 A1    Jan. 14, 2021

Related U.S. Application Data

(60) Provisional application No. 62/637,544, filed on Mar. 2, 2018, provisional application No. 62/640,745, filed on Mar. 9, 2018.

(51) Int. Cl.
*H04L 29/08* (2006.01)

(52) U.S. Cl.
CPC ................... *H04L 67/125* (2013.01)

(58) Field of Classification Search
CPC ....... H04L 67/125; H04L 69/14; H04L 67/18; H04L 67/12; G06F 13/00; H04W 4/38; H04M 11/00; H04Q 9/00
See application file for complete search history.

(56) References Cited

U.S. PATENT DOCUMENTS 7,526,539 B1 *   4/2009   Hsu ..................... H04L 12/2818
                                                                709/203
2010/0274913 A1 * 10/2010  Ando .................. H04W 12/069
                                                                709/229

(Continued)

FOREIGN PATENT DOCUMENTS

EP       2395795 A2       12/2011
JP       2016-063520 A    4/2016

OTHER PUBLICATIONS

International Search Report and Written Opinion dated May 21, 2019, in International Application No. PCT/JP2019/007572; with partial English translation.

(Continued)

*Primary Examiner* — Eyob Hagos
(74) *Attorney, Agent, or Firm* — McDermott Will and Emery LLP

(57) ABSTRACT

A device management system includes: a server; base stations for long-distance wireless communication; and a device that communicatively connect to one of the base stations and that each sequentially transmit, to the server via the one base station, operation information indicating the current operation state of the device. Upon sequentially receiving the operation information, each of the base stations sequentially transmits, to the server, unique information unique to the base station together with the sequentially received operation information. The server sequentially (Continued)

receives, and sequentially stores in association with each other, the operation information and the unique information. When first and second unique information received at first and second times, respectively, are different, the server separately manages first operation information received in a first period ending at the first time and second operation information received in a second period starting at the second time.

9 Claims, 50 Drawing Sheets

(56) References Cited

U.S. PATENT DOCUMENTS

| | | | | |
|---|---|---|---|---|
| 2013/0020871 | A1* | 1/2013 | Takehara | H02J 3/14 |
| | | | | 307/32 |
| 2015/0180993 | A1 | 6/2015 | Yamada | |
| 2016/0028853 | A1* | 1/2016 | Nagpal | H04L 67/34 |
| | | | | 709/203 |
| 2016/0057029 | A1* | 2/2016 | Iida | G05B 15/02 |
| | | | | 709/224 |
| 2016/0301543 | A1* | 10/2016 | Minezawa | G06F 3/0482 |
| 2016/0373270 | A1* | 12/2016 | Yang | H04L 63/10 |
| 2017/0099353 | A1* | 4/2017 | Arora | H04L 67/22 |
| 2018/0187969 | A1* | 7/2018 | Kim | F25D 29/005 |
| 2018/0352310 | A1* | 12/2018 | Bonicatto | H04Q 9/02 |

OTHER PUBLICATIONS

Extended European Search Report dated Apr. 1, 2021, issued in corresponding European Patent Application No. 19760454.9.

* cited by examiner

FIG. 8
Prior Art

| | Wi-Fi | LoRa | NB-IoT | CAT.M1 |
|---|---|---|---|---|
| TYPE | NOT GUARANTEED TO BE ALWAYS CONNECTED | ALWAYS CONNECTED THROUGH NON-CELLULAR NETWORK | ALWAYS CONNECTED THROUGH CELLULAR NETWORK | |
| RADIO LICENSING | NOT REQUIRED (USES LICENSE-FREE BAND) | NOT REQUIRED (USES LICENSE-FREE BAND) | REQUIRED (CARRIER EXCLUSIVE) | |
| BASE STATION OPERATION | HOME GW PLACED BY CUSTOMER | MOBILE CARRIER/SELF-OPERATED | MOBILE CARRIER | |
| RADIO USAGE FEE | NOT REQUIRED | NOT REQUIRED | REQUIRED | |
| DEVICE COMMUNICATION FEE | PER-HOUSEHOLD LUMP SUM | LOW | APPROX. 20 TIMES HIGHER THAN LoRa | APPROX. 50 TIMES HIGHER THAN LoRa |
| COMMUNICATION STABILITY | UNSTABLE | UNSTABLE | GUARANTEED TO AN EXTENT BY CARRIER | |
| COMMUNICATION SPEED | VERY FAST | SLOW | SLOW | MEDIUM TO FAST |
| COMMUNICATION DATA VOLUME | EXCEEDINGLY HIGH | LOW | LOW | RATHER HIGH |
| COMMUNICATION DISTANCE | INSIDE HOME | APPROX. 1–20 km | APPROX. 1–20 km | APPROX. 1–10 km |
| NETWORK CONGESTION TOLERANCE | LOW | LOW | HIGH | |
| EVALUATION | ·COMMUNICATION COST PAID BY CUSTOMER ·FAST AND BROAD, BUT UNSTABLE COMMUNICATION CHANNEL ·RISK OF NOT BEING ABLE TO CONNECT | ·COSTS ARE EXCEEDINGLY LOW ·HOWEVER, COMMUNICATION CHANNEL IS SLOW AND NARROW | ·HAS OPERATION COSTS ·COMMUNICATION CHANNEL IS SLOW, BUT STABLE | ·OPERATIONS COSTS ARE HIGH ·STABLE COMMUNICATION CHANNEL WITH ADEQUATE SPEED AND DATA VOLUME |

FIG. 17

| DATA FIELDS | CONTENT |
|---|---|
| DEVICE UNIQUE ID | NUMBER IDENTIFYING APPLIANCE |
| COMMUNICATION MODULE ID | ID IDENTIFYING COMMUNICATION MODULE THAT TRANSMITTED DATA |
| COMMUNICATION MODULE TYPE | TYPE OF COMMUNICATION MODULE THAT TRANSMITTED DATA |
| TRANSMISSION DATE AND TIME | DATE AND TIME OF TRANSMISSION OF DATA |
| POWER STATE | POWER STATE OF APPLIANCE AT DATE AND TIME OF TRANSMISSION OF DATA (E.G.: OFF / ON) |
| COUNTING START DATE AND TIME OF OPERATION COUNT | DATE AND TIME OF START OF COUNTING OF OPERATION COUNT |
| OPERATION COUNT | NUMBER OF TIMES APPLIANCE HAS BEEN OPERATED IN PERIOD FROM COUNTING START DATE AND TIME OF OPERATION COUNT TO DATE AND TIME OF TRANSMISSION OF DATA, OR NUMBER OF TIMES OF OPENING / CLOSING OF DOOR OR LID<br><br>NOTE: WHETHER OPERATION IS COUNTED OR NOT DEPENDS ON ORIGINAL FUNCTION OF APPLIANCE |
| POSITION INFORMATION | INFORMATION ON POSITION OF APPLIANCE<br>NOTE: OBTAINED BY LPWA BASE STATION |

FIG. 47

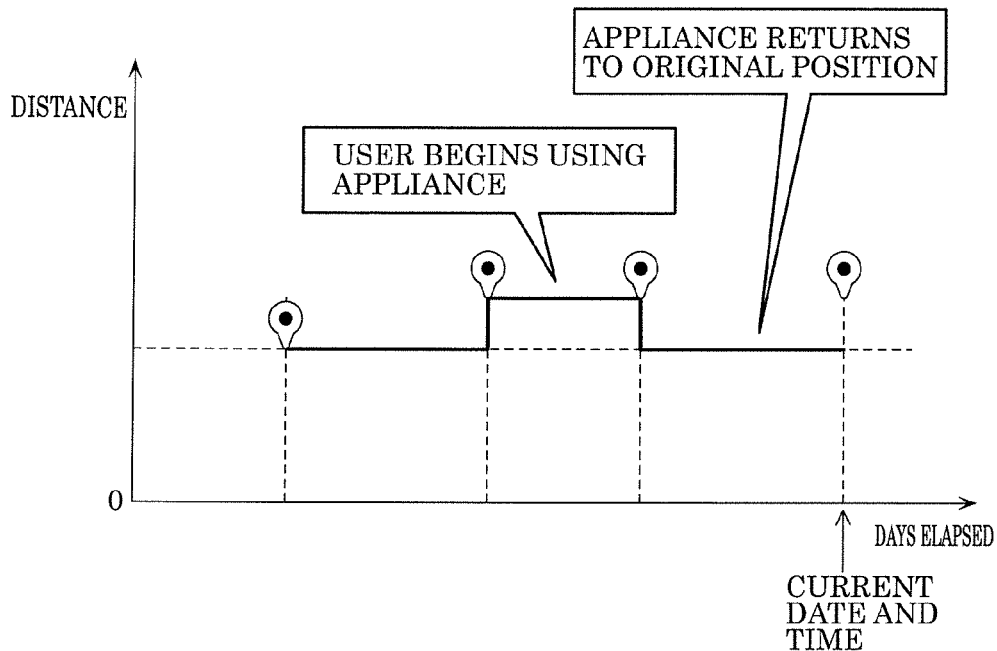

FIG. 48

| CATEGORIES | CHARACTERISTICS | DEGREE OF INFLUENCE ON DETERMINATION |
|---|---|---|
| LARGE APPLIANCES WASHING MACHINES, REFRIGERATORS, ETC. | ·TYPICALLY NOT DISCONNECTED FROM POWER ·NOT MOVED AFTER INITIAL PLACEMENT IN HOME | IN CASE OF CHANGE IN POSITION: USER HAS MOVED TO NEW RESIDENCE OR APPLIANCE HAS BEEN TRANSFERRED TO DIFFERENT USER |
| MEDIUM SIZED APPLIANCES TVs, AIR PURIFIERS, ETC. | ·MAY BE DISPLACED SMALL DISTANCES AFTER REDECORATING, ETC | IN CASE OF SIGNIFICANT CHANGE IN POSITION: POSSIBILITY THAT USER HAS MOVED TO NEW RESIDENCE OR APPLIANCE HAS BEEN TRANSFERRED TO DIFFERENT USER |
| SMALL APPLIANCES ELECTRIC SHAVERS, HAIR DRYERS, ETC. | ·MAY BE TAKEN OUT OF THE HOME ·INCLUDES RECHARGEABLE MODELS; BEHAVIOR WHEN DISCONNECTED FROM POWER MAY DIFFER FROM OTHER CASES | IN CASE OF SIGNIFICANT CHANGE IN POSITION: POSSIBILITY THAT USER HAS MOVED TO NEW RESIDENCE OR APPLIANCE HAS BEEN TRANSFERRED TO DIFFERENT USER |
| SEASONAL APPLIANCES FANS, HEATERS, ETC. | ·PLACEMENT POSITION AND CONNECTION TO POWER DEPENDS ON WHETHER ON-SEASON OFF-SEASON | SINCE PERIODS OF NO OPERATION IN UNITS OF A FEW MONTHS, PERIODS OF COMMUNICATION SILENCE OCCUR, INDIVIDUAL DETERMINATION IS DIFFICULT |

DEVICE MANAGEMENT SYSTEM AND DEVICE MANAGEMENT METHOD

CROSS-REFERENCE OF RELATED APPLICATIONS

This application is the U.S. National Phase under 35 U.S.C. § 371 of International Patent Application No. PCT/JP2019/007572, filed on Feb. 27, 2019, which in turn claims the benefit of U.S. Provisional Application No. 62/637,544, filed on Mar. 2, 2018 and U.S. Provisional Application No. 62/640,745, filed on Mar. 9, 2018, the entire disclosures of which Applications are incorporated by reference herein.

TECHNICAL FIELD

The present disclosure relates to a device management system and a device management method.

BACKGROUND ART

Recent years have seen household appliances (also referred to as devices) that connect, over a network, to an appliance control cloud (also referred to as a control cloud), which is a cloud for controlling the appliances, and operate under control by the control cloud (see Patent Literature (PTL) 1).

CITATION LIST

Patent Literature

PTL 1: Japanese Unexamined Patent Application Publication No. 2016-63520

SUMMARY OF THE INVENTION

Technical Problem

However, a user of such a device does not necessarily, for example, configure settings for connecting to a network and connect the device to the control cloud. If the device is not connected to the control cloud, the device cannot be efficiently managed by the control cloud.

In view of this, the present disclosure provides a device management system and the like, which can efficiently manage a device.

Solution to Problem

A device management system according to one aspect of the present disclosure includes: a server communicatively connected to a network; a plurality of base stations for long-distance wireless communication that are communicatively connected to the network; and a device that communicatively connects to one base station among the plurality of base stations and that sequentially transmits, to the server via the one base station, operation information indicating a current operation state of the device. Upon sequentially receiving the operation information, each of the plurality of base stations sequentially transmits, to the server, unique information which is unique to the base station together with the operation information that is sequentially received. The server: sequentially receives the operation information and the unique information, and sequentially stores, in association with each other, the operation information and the unique information that are sequentially received at a corresponding time; and when first unique information received at a first time and second unique information received at a second time after the first time are different, separately manages a plurality of items of first operation information received in a first period ending at the first time and a plurality of items of second operation information received in a second period starting at the second time.

These general and specific aspects may be implemented using a method, an integrated circuit, a computer program, or a computer-readable recording medium such as a CD-ROM, or any combination thereof.

Advantageous Effect of Invention

The device management system according to the present disclosure can efficiently manage a device.

BRIEF DESCRIPTION OF DRAWINGS

FIG. 8 is a table illustrating characteristics of communication methods (Wi-Fi, LPWA) that can be used by always-connected IoT household appliances.

FIG. 17 is a table illustrating a specific example of operation information and unique information for an appliance received by a cloud.

FIG. 47 is a diagram illustrating an exception to cases in which the user is estimated to have moved to a new residence.

FIG. 48 is a table that categorizes devices by type.

DESCRIPTION OF EXEMPLARY EMBODIMENT

Figure 1:
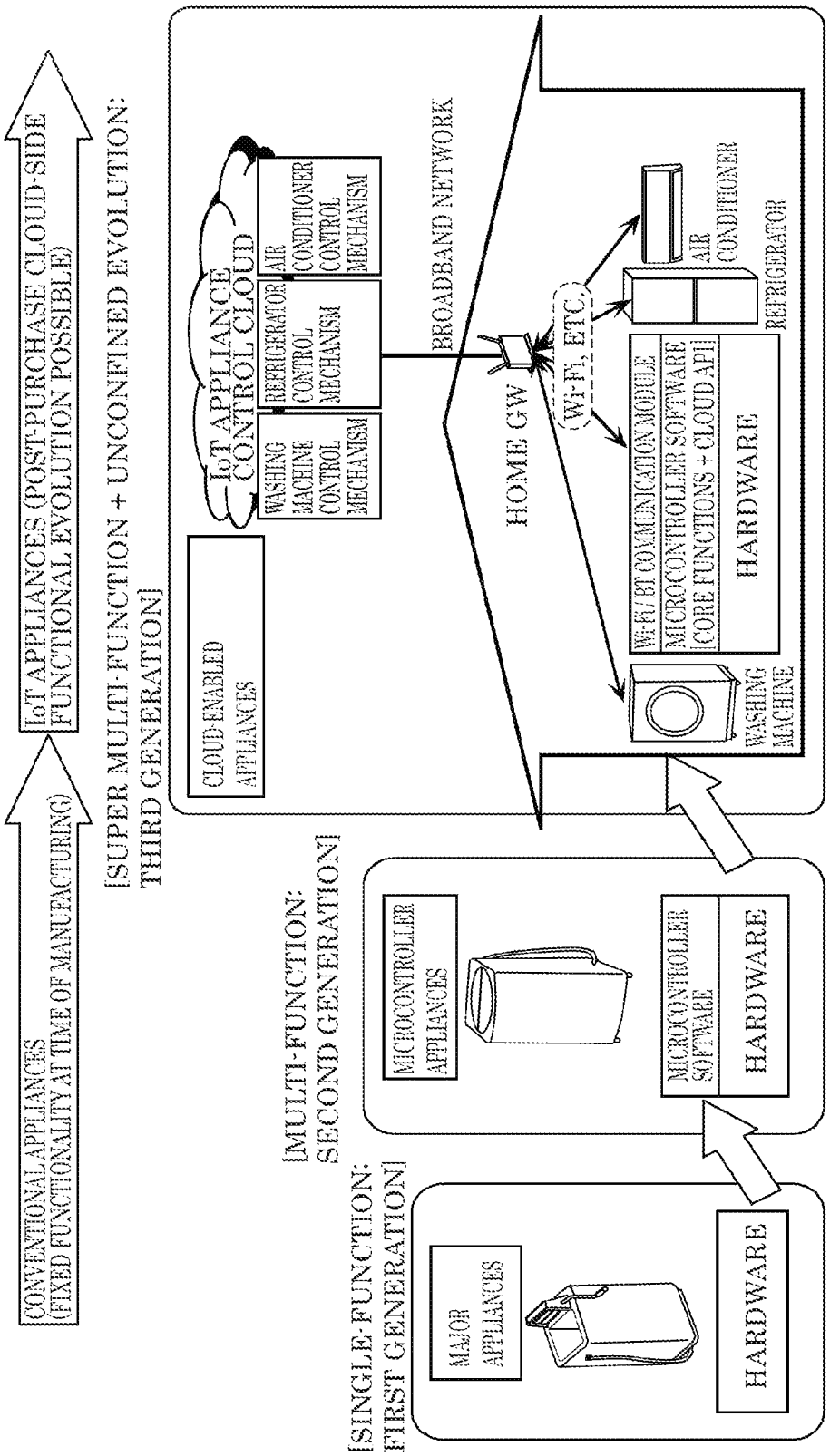
FIG. 1 is a diagram illustrating the evolution of household appliances.

A device management system according to one aspect of the present disclosure includes: a server communicatively connected to a network; a plurality of base stations for long-distance wireless communication that are communicatively connected to the network; and a device that communicatively connects to one base station among the plurality of base stations and that sequentially transmits, to the server via the one base station, operation information indicating a current operation state of the device. Upon sequentially receiving the operation information, each of the plurality of base stations sequentially transmits, to the server, unique information which is unique to the base station together with the operation information that is sequentially received. The server: sequentially receives the operation information and the unique information, and sequentially stores, in association with each other, the operation information and the unique information that are sequentially received at a corresponding time; and when first unique information received at a first time and second unique information received at a second time after the first time are different, separately manages a plurality of items of first operation information received in a first period ending at the first time and a plurality of items of second operation information received in a second period starting at the second time.

Accordingly, for example, since the server manages operation information based on usage by a current user of the device, it is possible to determine the state of the device that is appropriate for the state of usage by the user. In this way, devices can be efficiently managed since it is possible to manage the devices by excluding operation information based on usage by a user or the like other than the above-described user.

Moreover, the server may separately manage the plurality of items of first operation information and the plurality of items of second operation information by storing the plurality of items of first operation information in association with a first identifier and storing the plurality of items of second operation information in association with a second identifier different from the first identifier.

Accordingly, for example, the determination of the state of the device based on the operation information and the unique information obtained in the second period, which corresponds to the period of usage by the user, can be performed separately from the operation information and the unique information obtained in the first period. Thus, the state of the device can be determined accurately.

Moreover, the second identifier may indicate association with a user using the device in the second period, and when third unique information received at a third time after the second time is different from the second unique information, the server may determine that the device has been displaced, and transmit, to the device or a terminal possessed by the user, an inquiry as to whether the user of the device has changed to a different user.

This makes it possible to efficiently determine whether the device has been transferred to a different user or not, for example.

Moreover, when, after transmitting the inquiry, a response from the device or the terminal to the inquiry received indicates that the user of the device has changed to the different user, the server may manage a plurality of items of third operation information received in a third period starting at the third time, separately from the plurality of items of first operation information and the plurality of items of second operation information.

With this, for example, when the device has been transferred to a different user, management is performed separately from the operation information corresponding to the former user, so it is possible to determine the state of the device that is appropriate for the new user.

Moreover, when, after transmitting the inquiry, a response from the device or the terminal to the inquiry received indicates that the user of the device has not changed to the different user, the server may manage a plurality of items of third operation information received in a third period starting at the third time, together with the plurality of items of second operation information.

Accordingly, for example, when the device has not been transferred to a new user but has simply been displaced, the device can be managed without changing the user.

Moreover, the device may include a plurality of devices, and when a plurality of items of the second unique information received from the plurality of devices at the second time are identical, a plurality of items of third unique information received from the plurality of devices at a third time after the second time are identical, and the second unique information and the third unique information are different, the server may manage a plurality of items of third operation information received in a third period starting at the third time, together with the plurality of items of second operation information.

Accordingly, for example, when a plurality of devices are displaced, it is regarded that the user of the devices has not changed, and the devices can be managed.

Moreover, when the server does not receive operation information before elapse of a predetermined period starting at a fourth time after the second time, the server may change a management state of a plurality of items of the operation information received up to the fourth time to an unmanaged state.

Accordingly, since such a device is not managed, the processing load required for management can be reduced.

Moreover, when the server does not receive operation information before elapse of a predetermined period starting at a fourth time after the second time, and fourth unique information received at the fourth time is identical to any one of a plurality of items of unique information included in a unique information list that is stored in advance, the server may change a management state of a plurality of items of the operation information received up to the fourth time to an unmanaged state.

Accordingly, since such a device is not managed, the processing load required for management can be reduced.

Moreover, the second identifier may indicate association with a user using the device in the second period. The server: when third unique information received at a third time after the second time is different from the second unique information, may determine that the device has been displaced, and transmit, to a terminal possessed by the user, an inquiry as to whether the device has been stolen; and when, after transmitting the inquiry, a response to the inquiry received from the terminal indicates that the device has been stolen, may transmit a control signal to the device that locks the device to prevent usage of the device. Upon receiving the control signal, the device locks itself to prevent usage.

This makes it possible to lock the device when the device has been stolen so that another user cannot use the device.

These general and specific aspects may be implemented using a method, an integrated circuit, a computer program, or a computer-readable recording medium such as a CD-ROM, or any combination thereof.

Hereinafter, a non-limiting embodiment will be described in detail with reference to the accompanying drawings. However, unnecessarily detailed descriptions may be omitted. For example, detailed descriptions of well-known matters or descriptions of components that are substantially the same as components described previous thereto may be omitted. This is to avoid unnecessary redundancy and provide easily read descriptions for those skilled in the art.

Note that the inventor(s) have provided the accompanying drawings and subsequent descriptions to facilitate sufficient understanding of the present disclosure by those skilled in the art, and are thus not intended to limit the scope of the subject matter recited in the claims.

Hereinafter, first, underlying knowledge forming the basis of the present invention and technical problems to be overcome by the invention will be described in greater detail, followed by description of an exemplary embodiment.

(Underlying Knowledge Forming the Basis of the Present Invention)

FIG. 1 is a diagram illustrating the evolution of household appliances.

More specifically, FIG. 1 illustrates the evolution of the architecture of household appliances (for example: major appliances such as washing machines and refrigerators; air conditioners; and humidifying air purifiers).

The first generation (before 1990) of household appliances were single-function products, as the hardware, such as the compressors and motors, was implemented through control logic made with large-scale integrated (LSI) circuits.

The second generation (from 1990 to around 2010) of household appliances were equipped with microcontrollers. Complex control of these household appliances was possible due to the implementation of microcontrollers and the creation of software for the microcontrollers. This made multi-function appliances a reality. However, after shipment of the appliances, it was not possible to change or add functions by changing the microcontrollers.

The third generation (from 2012 and on) of appliances are cloud-enabled appliances equipped with communication functionality, such as Wi-Fi (registered trademark) and/or Bluetooth (registered trademark; hereinafter referred to as "BT"), which allows them to connect to an Internet of Things (IoT) appliance control cloud through a home gateway (GW) and a broadband network. Accordingly, even after shipment of the appliances, the software for the microcontrollers in the appliances can be updated from the cloud. Moreover, even after shipment, functions can be added or changed by updating the control mechanism for the appliance cloud-side, without updating the microcontroller software. As used herein, an "IoT appliance control cloud" is a cloud (aggregate of a server and a network) that controls appliances through a communication channel such as a broadband network, and is one example of a cloud-based service.

Figure 2:
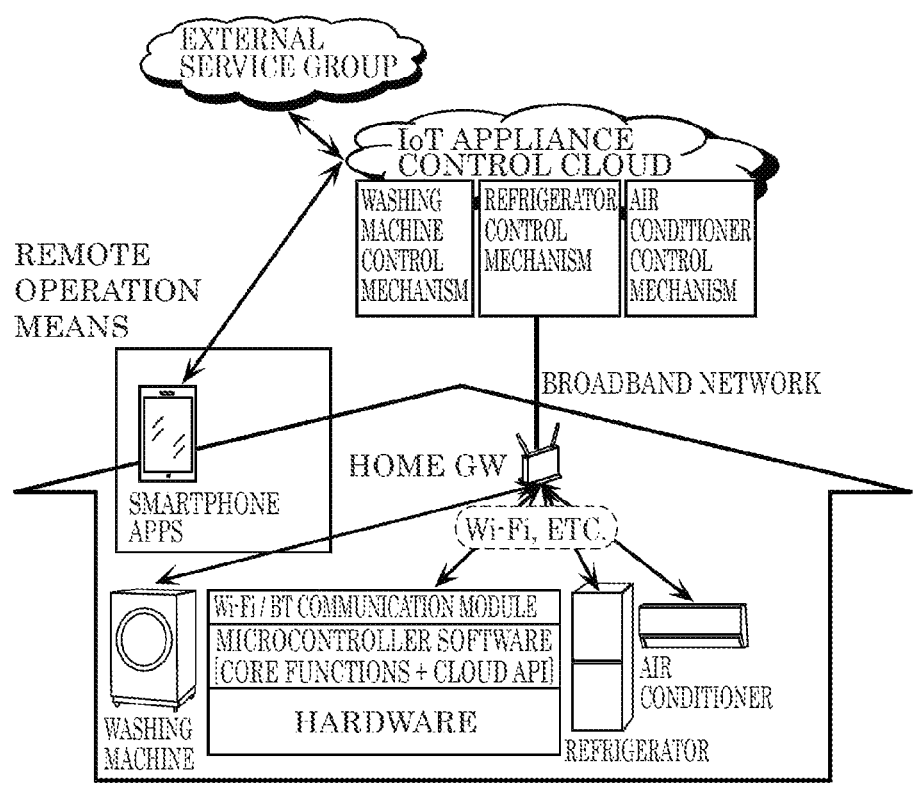
FIG. 2 is a diagram illustrating an example of third generation household appliance architecture and external service linkage.

FIG. 2 is a diagram illustrating an example of third generation household appliance architecture and external service linkage.

With third generation cloud-enabled household appliances (major appliances such as washing machines and refrigerators; air conditioners; and humidifiers), it is possible to access each household appliance in a household from smartphone applications (apps) via each household appliance control mechanism in the IoT appliance control cloud.

Accordingly, a user can, for example, remotely monitor the operation state and remotely control operations (e.g., turn on, stop, adjust temperature, dispense detergent, etc.) of each household appliance using smartphone apps. By linking an external service group such as an e-commerce service cloud or monitoring service cloud, and each household appliance control mechanism in the IoT appliance control cloud, it is possible to control household appliances through various types of cloud services, or retrieve operation information (logs, etc.) of household appliances and use this information in external services.

Figure 3:
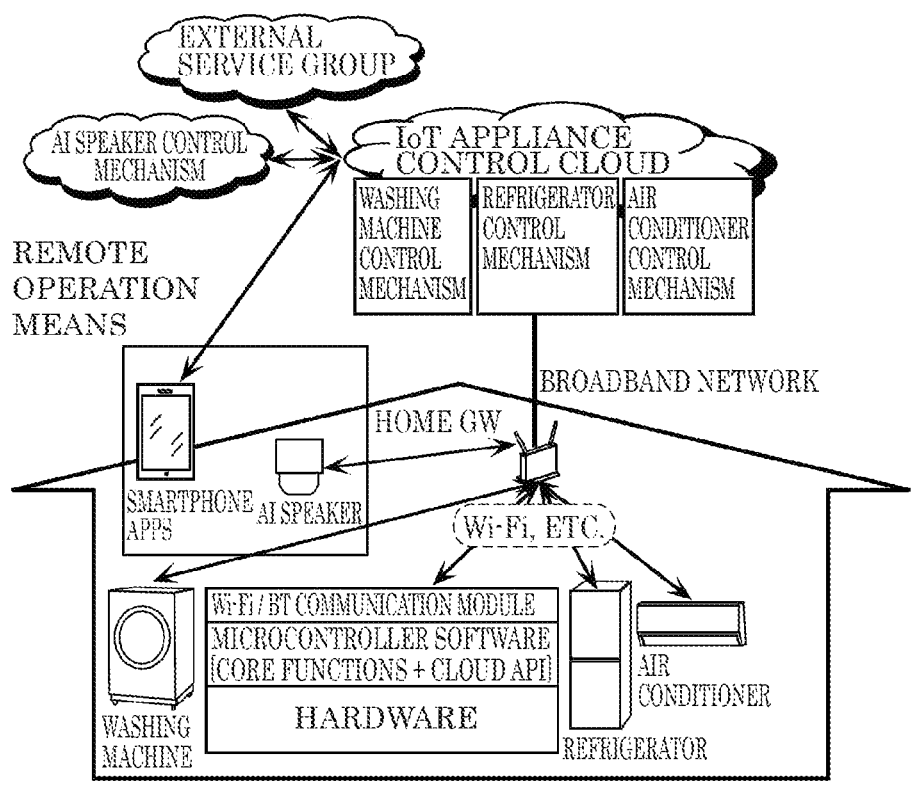
FIG. 3 is a diagram illustrating an example of third generation household appliance architecture and AI speaker linkage.

FIG. 3 is a diagram illustrating an example of third generation household appliance architecture and artificial intelligence (AI) speaker linkage.

With third generation cloud-enabled household appliances (major appliances such as washing machines and refrigerators; air conditioners; and humidifiers), it is possible for a user to remotely control each household appliance from an AI speaker through voice interaction by accessing an AI speaker control mechanism in a cloud from a voice-interactive AI speaker via a home GW, and this AI speaker control mechanism accessing each household appliance control mechanism.

(Technical Problems to be Solved)

Figure 4:
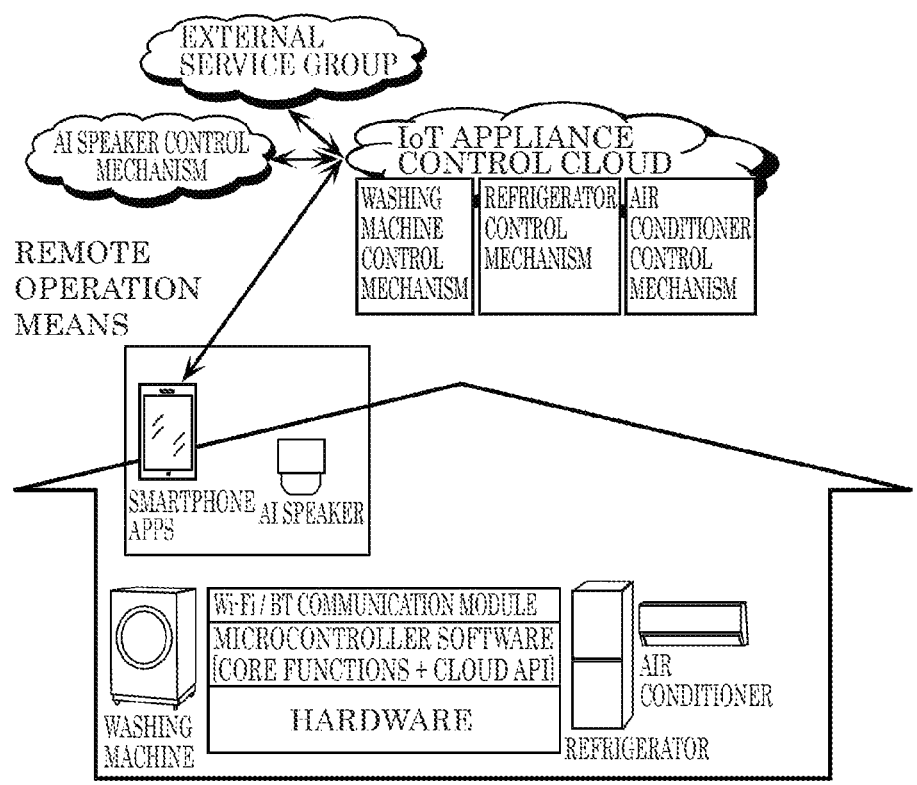
FIG. 4 is a diagram illustrating a first technical problem of third generation household appliances.

FIG. 4 is a diagram illustrating a first technical problem of third generation household appliances. The first technical problem is that it is not possible to use some functions of third generation appliances in a household without a Wi-Fi GW.

If a household does not have a home GW such as a Wi-Fi home GW and thus cannot connect to a broadband network, even if such a household purchases a third generation cloud-enabled household appliance (a major appliance such as a washing machine or a refrigerator; an air conditioner; or a humidifier), the cloud-enabled appliance cannot connect to an IoT appliance control cloud. In such cases, since the appliance cannot be accessed from the IoT appliance control cloud, it is not possible to achieve the objective set by third generation household appliances of increasing the value added to a product by post-purchase cloud-side functional advancements. Thus, in such cases, despite being an IoT appliance, the third generation household appliance can only be used as a conventional second generation household appliance (microcontroller household appliance) characterized by fixed functionality that is fixed at the time of manufacturing.

Figure 5:
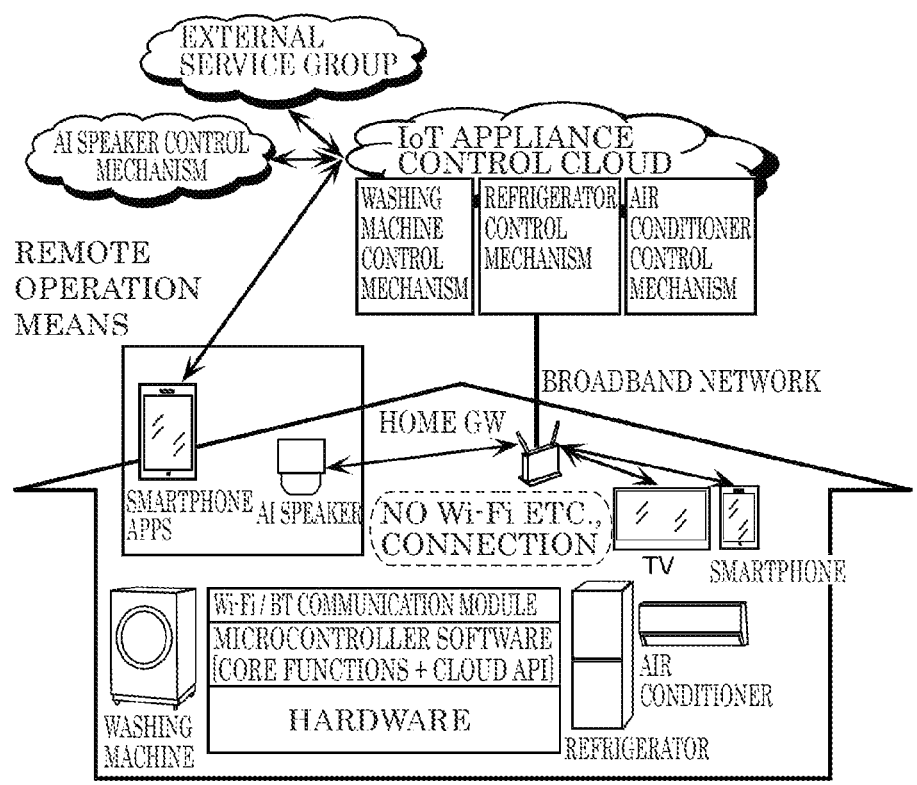
FIG. 5 is a diagram illustrating a second technical problem of third generation household appliances.

FIG. 5 is a diagram illustrating a second technical problem of third generation household appliances. The second technical problem is that despite having a Wi-Fi GW in their household, users do not connect third generation household appliances to their household Wi-Fi GW.

When information devices such as smartphones, tablets, and PCs, or AI speakers are not equipped with a function for connecting to the internet via, for example, Wi-Fi, the user is not capable of using the desired original functionality of these products. Some smartphones or AI speakers cannot even be used without connecting to the Internet and configuring user information (mail address, account, etc.). Since the user has purchased the device precisely because they want to use the functions thereof, the user will undoubtedly configure the user ID settings and/or Wi-Fi settings and connect the device to the internet.

In regard to smart TVs, as video streaming services such as Youtube, Netflix, Amazon Prime Video, etc., are becoming increasingly popular, users (or installers) often configure the Wi-Fi settings in order to be able to watch the video programming provided by such services on a large-screen TV.

In regard to cloud-enabled household appliances, users often do not initially configure the internet connections settings because they have configured tedious Wi-Fi settings and found the available internet services difficult to understand, or because they do not value the internet services enough to consider them to be an indispensable function.

Another common scenario is when the user configures the Wi-Fi settings immediately after purchasing a cloud-enabled household appliance, but finds the user friendliness of the internet services to be relatively low, and thus chooses to disconnect the appliance despite taking the time to initially connect it, or chooses not to reconnect the appliance after it happens to disconnect.

Therefore, it is possible to develop various types of cloud services for information devices and AI speakers with the assumption that they are connected to the internet, since it is possible to expect a connection rate of approximately 100%, but a connection rate of 100% cannot be expected for TVs or household appliances.

Figure 6:
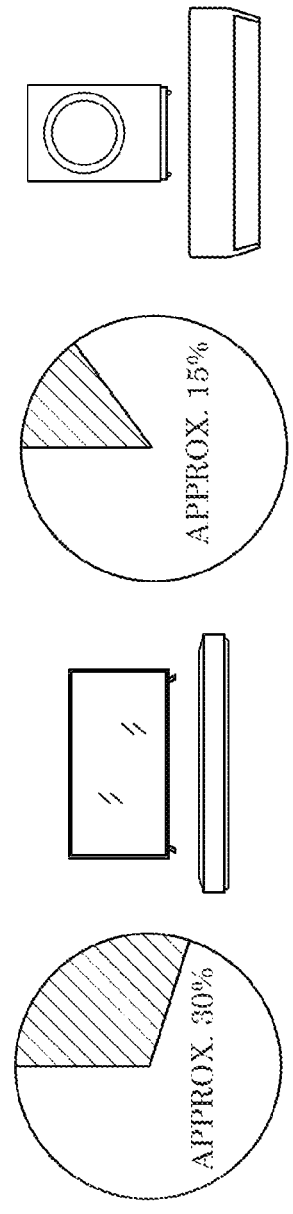
FIG. 6 is a diagram illustrating a network connection rate of appliances with a built-in network function.

FIG. 6 is a diagram illustrating a network connection rate of appliances with a built-in network function (audiovisual (AV) appliances and household appliances).

The above-mentioned cloud-enabled household appliances are capable of providing customer value that microcontroller household appliances do not provide, by connecting to an IoT appliance control cloud and using various types of cloud services, due to the cloud-based household appliance being equipped with a means of communication such as Wi-Fi or Bluetooth (hereinafter "BT"). Thus, it is possible to improve customer satisfaction, since it is possible to provide customer value that outweighs the increase in cost resulting from equipping cloud-enabled household appliances with a means of communication such as Wi-Fi.

However, a technical problem of the above-mentioned means of communication is that, in most cases such as those as described below, the user possessing the device forgoes configuring the settings, that is to say, a cloud-enabled household appliance that is not connected to the cloud is only capable of providing the same customer value as a microcontroller household appliance.

(1) In order to connect to Wi-Fi, the user needs to prepare a Wi-Fi access point in their home. However, users that only connect to the internet from their smartphone, that is to say, users that only use a communication network provided by a telecommunications carrier may not have a Wi-Fi access point in their home.

(2) Even when there is a Wi-Fi access point in the user's home, it is difficult to say that every person is capable of easily configuring the settings for connecting to Wi-Fi, due to the complexity of the connection settings of home appliances, e.g., a connection process starting off with inputting a password.

The network connection rate of cloud-enabled TVs or cloud-enabled household appliances on the Japanese market in 2017, as illustrated in FIG. 6, did not exceed 50%, meaning that many users actually used their cloud-enabled household appliances as microcontroller household appliances.

Figure 7:
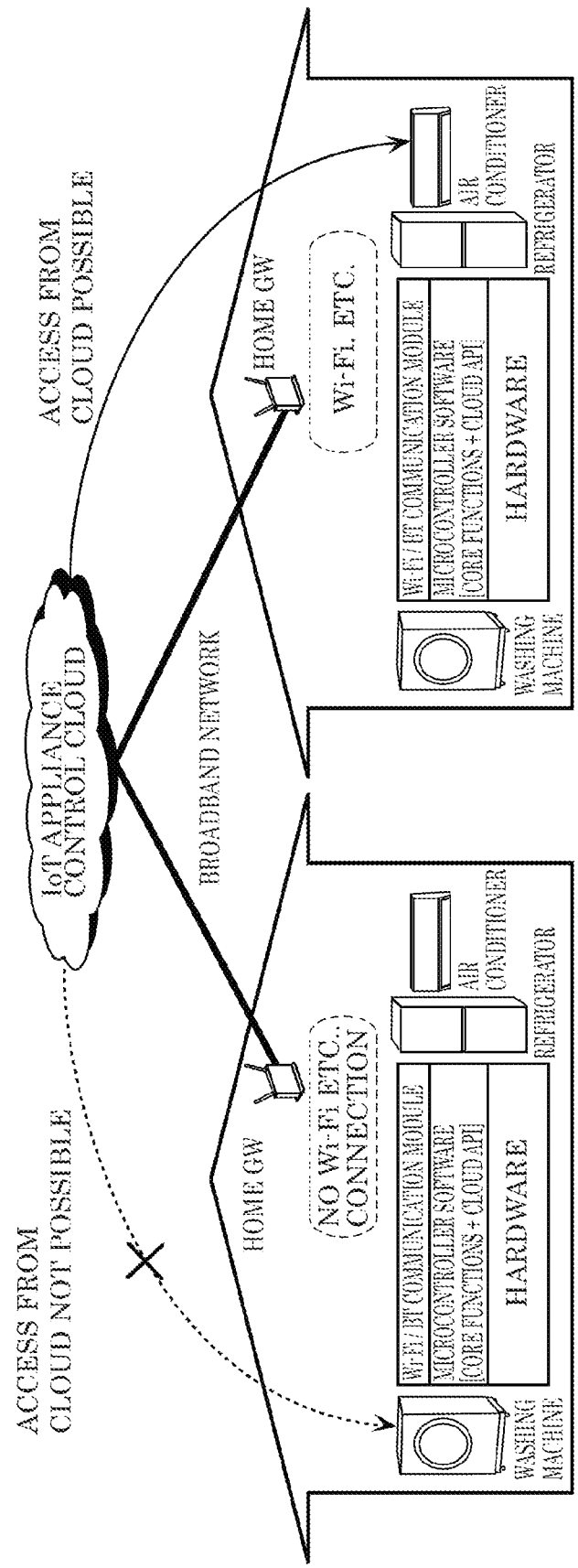
FIG. 7 is a diagram illustrating network connectivity, etc., for cloud-enabled household appliances.

FIG. 7 is a diagram illustrating network connectivity, etc., for cloud-enabled household appliances.

When a cloud-enabled household appliance is not connected to a cloud, it is not possible to access the cloud-enabled household appliance from an IoT appliance control cloud. Thus, it is not possible to enjoy the functions that increase the value added to a product by post-purchase cloud-side functional advancements, which is possible with cloud-enabled household appliances.

Therefore, despite being cloud-enabled household appliances, only those functions that are equivalent to conventional microcontroller household appliances characterized by fixed functionality that is fixed at the time of manufacturing can be used.

Cloud household appliances are originally designed to be able to take action in case of a recall, such as instructing an emergency stop of operation, remotely updating firmware, or sending a notification email to the user of the recalled appliance. However, in the current situation in which connection rates are low, manufacturers are often not capable of utilizing such functions to control cloud-enabled household appliances from these IoT appliance control clouds. Thus, with respect to all applicable cloud-enabled household appliances, functionality such as remote maintenance or recall notifications that can be implemented when remote monitoring and controlling is possible, is not sufficiently implemented.

Even in these times in which it is difficult in practice to have cloud-enabled household appliances equipped with Wi-Fi or BT communication means or the like be connected to a cloud, various other means of communication for making sensors and devices other than appliances IoT-compatible have become available.

In particular, the wireless means of communication developed for IoT applications known as low-power wide-area (LPWA) has come into practical use and is receiving attention as a communication method suitable for the IoT era.

A characteristic of LPWA wireless technology is that, compared to Long-Term Evolution (LTE), it is possible to reduce the cost of both wireless circuits and infrastructure, since it is possible to (i) reduce terminal costs through small-scale semiconductor packaging, and (ii) reduce the number of base stations by using low-rate modulation that yields an exceedingly long communication distance (up to 10 km). On the other hand, since LPWA uses a method that reduces transfer rates to improve reception sensitivity, the volume of data that can be transferred is low.

By equipping appliances with LPWA wireless technology, users are no longer required to sign up for an internet connection, appliances are directly connected to base stations, and it may be possible to greatly reduce the cost of services connected to a cloud server.

LPWA is divided into cellular LPWA and non-cellular LPWA. Cellular LPWA is provided as one cellular line (such as LTE), using a frequency band assigned by a cellular carrier (licensed band).

Non-cellular LPWA uses LPWA wireless technology by taking advantage of the fact that channel usage fees are no longer necessary when using non-licensed bands that exist in each country. Since non-licensed bands are shared between other wireless systems, restrictions preventing the channels from being monopolized are stipulated in each country's radio regulations.

Representative LPWA methods will be described below.

FIG. 8 is a table illustrating characteristics of communication methods (Wi-Fi, LPWA) that can be used by always-connected IoT household appliances.

(1) Cellular LPWA (1-1) NB-IoT

NB-IoT has its origin in GSM (registered trademark) (2G), adopts the advantages of low transfer rates and LTE communication sequences, and is dedicated to data transfer for IoT applications. By having the same channel spacing as GSM of 200 kHz, switching to operating on a GSM channel is made easy. Sensitivity is improved by having a low uplink transmission peak rate of 62.5 kbps, and receiving and storing data through repeated transmission (64 times). The maximum link budget is high at 130 dB. By limiting transmission power to 100 mW (GSM's transmission power is 2 W), it is possible to limit peak current and use NB-IoT with a single battery.

(1-2) LTE-M (Cat-M)

LTE-M (CAT-M) has its origin in LTE (4G), and performs communication using the smallest channel spacing of LTE (1.4 MHz). Since this standard is based on the slot configuration of LTE, it is possible to use the standard together with conventional LTE communication slots. Sensitivity is improved by a low uplink transmission peak rate of 1 Mbps, and receiving and storing data through repeated transmission. The maximum link budget is 130 dB.

Since transfer rates are rather high, power consumption when battery-driven is at a minimum. Transmission power is 200 mW.

(2) Non-Cellular LPWA (2-1) LoRa

LoRa uses conventional low-power wireless bands (ISM bands), but reception sensitivity is improved through ultra-low-rate modulation. Ultra-low-rate modulation is implemented by using a special spread-spectrum modulation called LoRa chirp modulation. Characteristics of LoRa chirp modulation are a low transfer rate of 250 bps, a spread bandwidth of 125 kHz, and a high sensitivity strong against interfering noise. Moreover, communication capacity is improved as it is possible to select multiple data rates in the same bandwidth and simultaneously receive this data on the same channel. The maximum link budget is 149 dB. Transmission power is 20 mW.

LoRa retains the characteristics of conventional low-power wireless technology (low power and low-current peaks), making it possible to operate with one battery for ten years or with a coin cell.

Specifications have been standardized through the LoRa Alliance, making interconnection between operators possible.

(2-2) SIGFOX

SIGFOX uses conventional low-power wireless bands (ISM bands), but reception sensitivity is improved through ultra-low-rate modulation. Ultra-low-rate modulation is implemented through narrowband FSK, and the problem of frequency error is overcome through base-station-side digital demodulation processing. SIGFOX modulation has a fixed uplink rate of 100 bps and a fixed downlink rate of 600 bps. The influence of interfering noise is avoided through multiple transmissions on different frequencies. Due to the fixed rates and simultaneous multiple receptions not being possible, communication capacity is relatively small. The maximum link budget is 158 dB. Transmission power is 20 mW.

SIGFOX retains the characteristics of conventional low-power wireless technology (low power and low-current peaks), making it possible to operate with one battery for ten years or with a coin cell.

SIGFOX has proprietary specifications, and its base stations are monopolized by SIGFOX1.

Since SIGFOX only allows one-way communication, it can be used for IoT sensors, but it is not suitable for IoT household appliances.

As illustrated in FIG. 8, a combination of LPWA and Wi-Fi technologies is considered to be appropriate for making always-connected IoT household appliances a reality. However, due to the three LPWA methods described above having different characteristics, cost increases when communication quality is prioritized, and conversely when cost is prioritized, communication quality is poor, risking the inability to ensure stable communication. Accordingly, it is difficult to select a single LPWA method for always-connected IoT appliances.

Embodiment

Hereinafter, devices capable of connecting to a control cloud and being controlled accordingly will be described.

Figure 9:
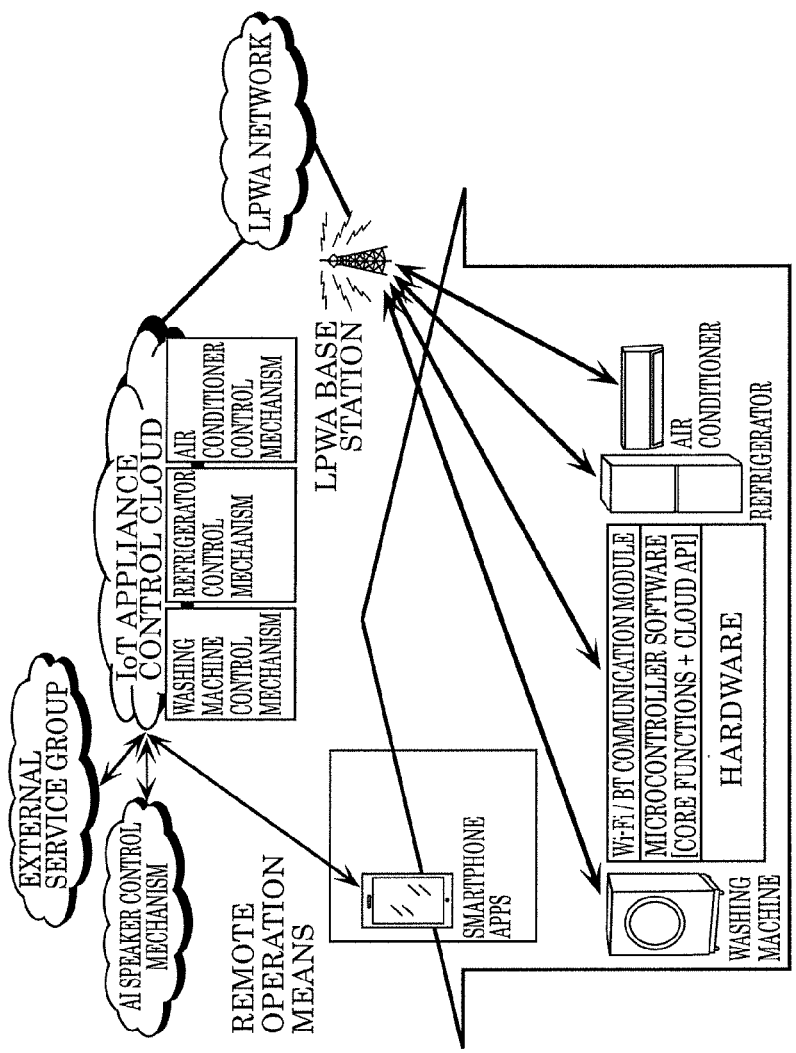
FIG. 9 is a first diagram illustrating fourth generation household appliance (always-connected IoT appliance) architecture and external service linkage.

FIG. 9 is a first diagram illustrating fourth generation household appliance (always-connected IoT appliance) architecture and external service linkage. Household appliances include, for example, major appliances such as washing machines and refrigerators, as well as air conditioners and humidifying air purifiers, and are also simply referred to as devices.

In order to overcome the technical problems associated with third generation household appliances, it was necessary for all users of household appliances to have a Wi-Fi GW, necessary to develop services that incentivized users to connect their household appliances to the internet and continue to use the services, and necessary to make Wi-Fi settings easy to configure.

However, with the emergence of various means of communication in recent years, the means of communication known as low-power wide-area (LPWA) is being advocated and garnering attention because of its capability to connect appliances to a cloud more easily than before.

LPWA is characterized by being usable without requiring users to configure any settings, an exceedingly long communication distance (up to 10 km), and invariable connectivity to a base station as long as the device has reception.

With fourth generation household appliances (always-connected IoT appliances), equipping the household appliances with LPWA technology makes cloud connection and post-purchase cloud-side expansion of functionality possible without requiring the user to have a Wi-Fi GW and configure tedious Wi-Fi settings.

Figure 10:
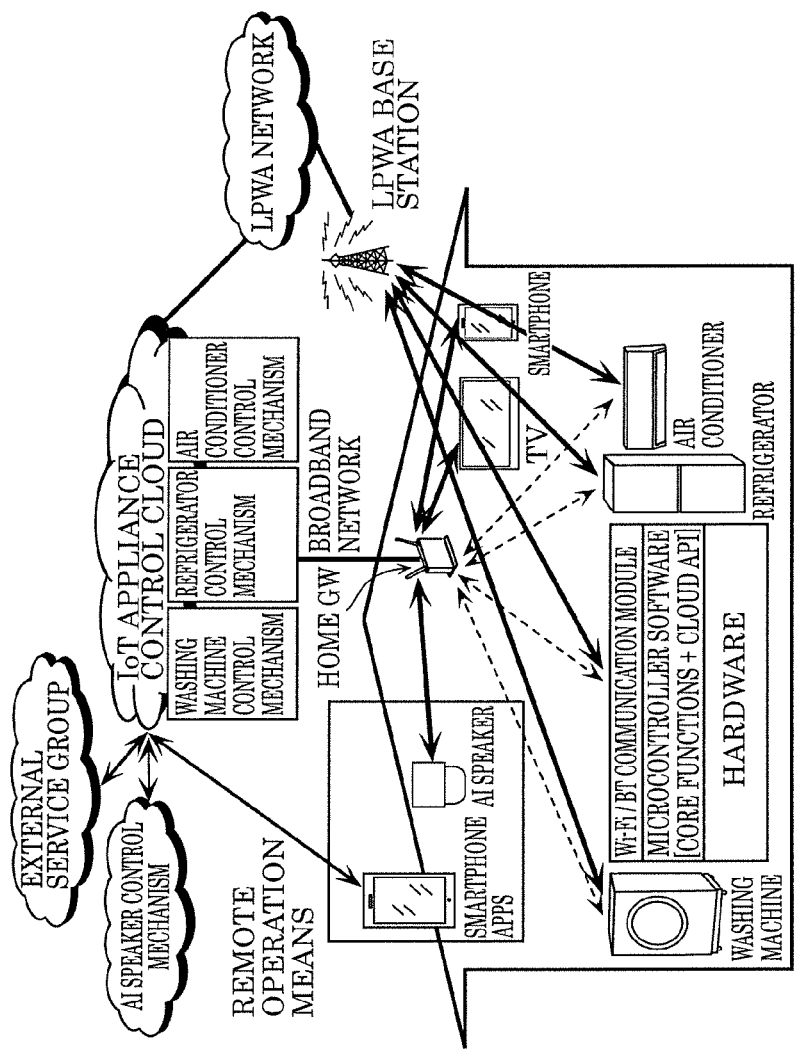
FIG. 10 is a second diagram illustrating fourth generation household appliance architecture and external service linkage.

FIG. 10 is a second diagram illustrating fourth generation household appliance architecture and external service linkage.

While LPWA has the outstanding features stated above, the volume of data that can be transferred is low compared to Wi-Fi or LTE or the like, since it utilizes a method that reduces transfer rates to improve reception sensitivity. Thus, in fourth generation household appliances (hereinafter also referred to as "always-connected IoT appliances"), using the Wi-Fi technology found in third generation household appliances along with LPWA technology enables application-appropriate communication.

Figure 11:
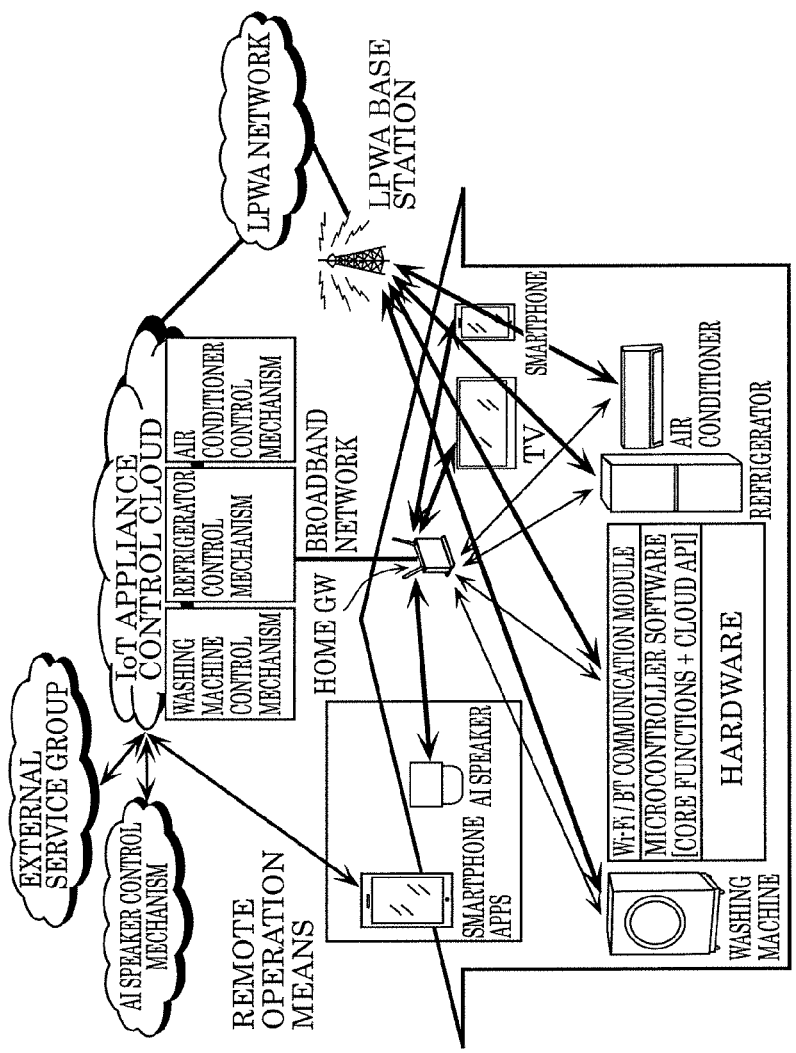
FIG. 11 is a third diagram illustrating fourth generation household appliance architecture and external service linkage.

FIG. 11 is a third diagram illustrating fourth generation household appliance architecture and external service linkage.

With regard to compelling users to configure tedious Wi-Fi settings, which was one major technical problem associated with third generation household appliances, the process of configuring Wi-Fi settings can be simplified by using LPWA, as shown via the following examples.

(1) If the Wi-Fi settings are input into a cloud, fourth generation household appliances (always-connected IoT appliances) will use LPWA to obtain the Wi-Fi settings from the cloud and connect to a Wi-Fi GW.

(2) If the Wi-Fi settings are input into a single fourth generation household appliance, the appliance will transmit the Wi-Fi settings to other devices in the home via LPWA, and the other devices will use those settings to connect to the Wi-Fi GW.

Figure 12:
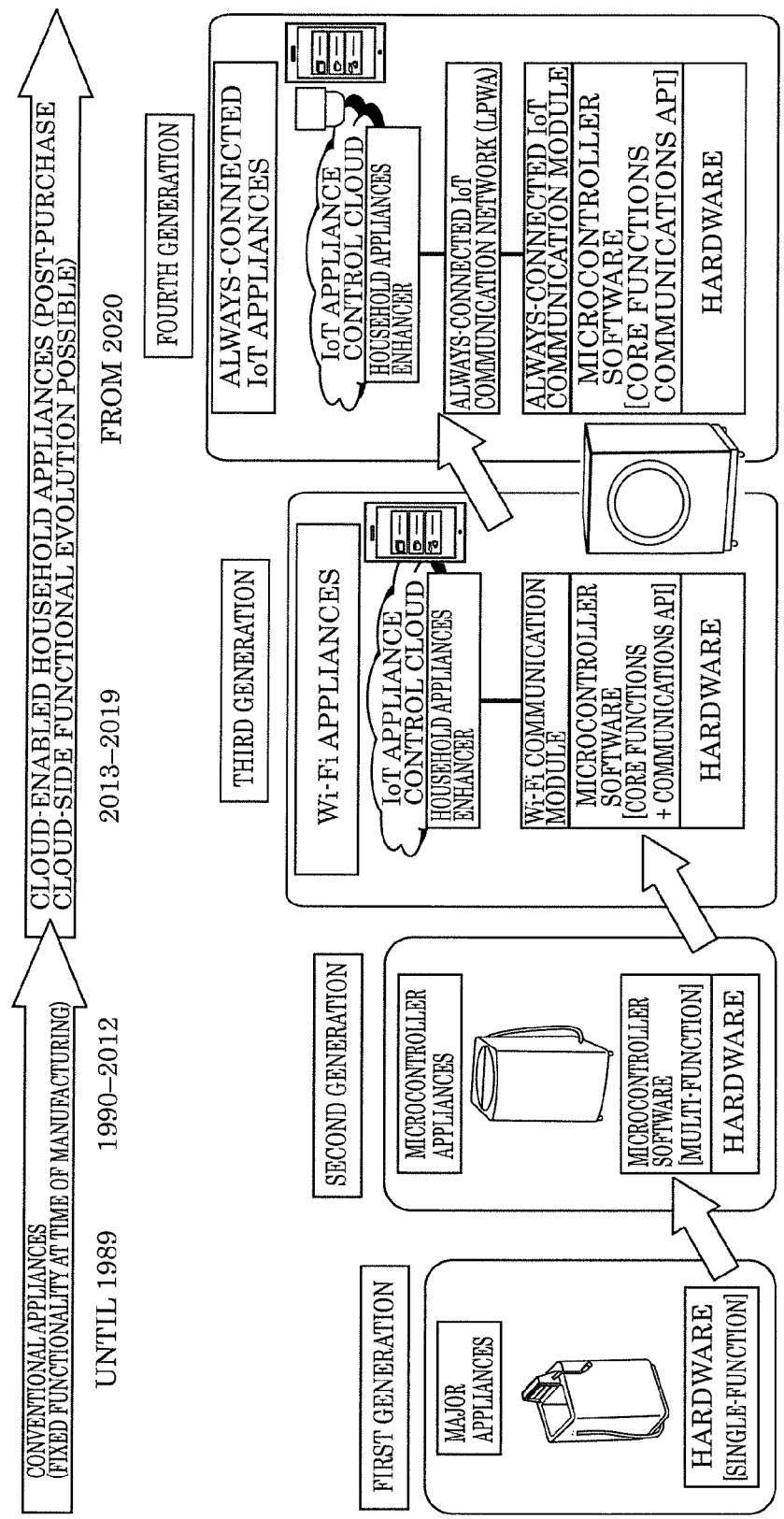
FIG. 12 is a diagram illustrating the evolution of household appliance architecture.

FIG. 12 is a diagram illustrating the evolution of household appliance architecture.

The first generation (before 1990) of household appliances were single-function products configured of mechanical parts such as the compressor and motor, and control logic.

The second generation (up until around 2010) of household appliances were equipped with microcontrollers. Complex control of these household appliances was possible through causing the microcontrollers to execute microcontroller software. Accordingly, the second generation of household appliances were multi-function. However, with the second generation of household appliances, after shipment of the household appliances, it was difficult to update and add functions by updating the microcontroller software.

The third generation (from 2012 and on) of appliances were cloud-enabled appliances equipped with a communication function, such as Wi-Fi and/or Bluetooth (hereinafter referred to as "BT"), which allowed them to connect to an IoT appliance control cloud through a GW and a broadband network. Accordingly, even after shipment, functions in cloud-enabled appliances could be added or updated by updating the microcontroller software in the appliance from an IoT appliance control cloud and by updating the control mechanism for the appliance cloud-side, without updating the microcontroller software. However, with, for example, Wi-Fi, it is difficult to connect all shipped products, and in many cases, cloud functions cannot be used.

The fourth generation (2020 and after) of appliances are always-connected IoT appliances having an always-connected feature achieved through, for example, LPWA. Accordingly, since all shipped products can be connected, it is believed that all products will be able to use cloud functions.

Figure 13:
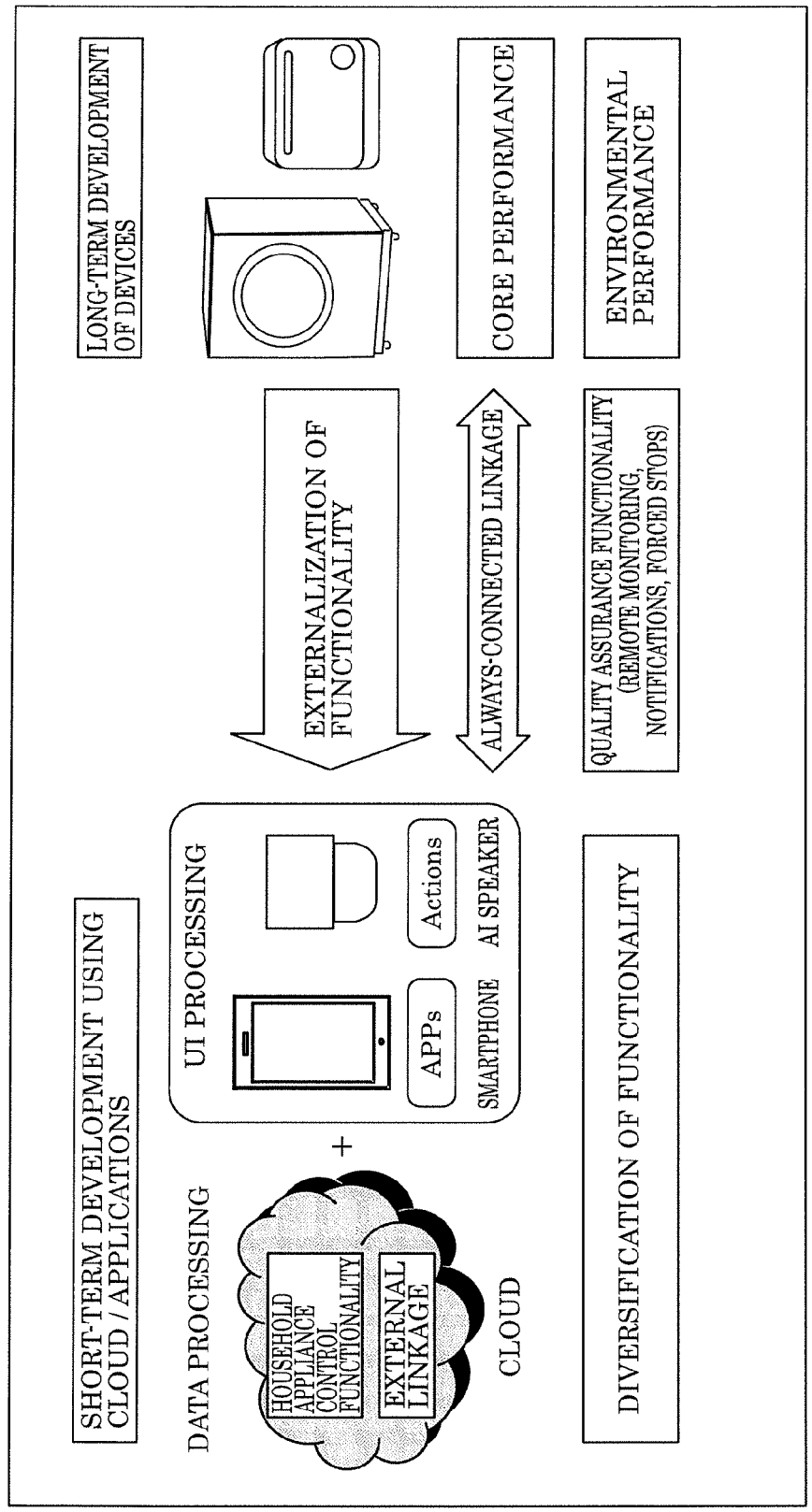
FIG. 13 is a diagram illustrating the division of functions (externalization of functions) in fourth generation household appliances.

FIG. 13 is a diagram illustrating the division of functions (externalization of functions) in fourth generation household appliances.

With fourth generation cloud-enabled household appliances (major appliances such as washing machines and refrigerators; air conditioners; and humidifying air purifiers), by a cloud (server) and a UI device such as a smartphone being always connected, it is possible to divide functions among the cloud, the smartphone, and a device such as a household appliance (i.e., it is possible to externalize functions). Accordingly, even after shipment of the device, the functions and performance of the household appliance can be improved by updating and/or adding functions cloud-side.

Moreover, with fourth generation cloud-enabled household appliances, since it is easy for all shipped products to be always-connected, remote monitoring and remote control of all products after shipment is also possible. Accordingly, vastly improved quality assurance functionality is anticipated. Moreover, even if a product is unfortunately recalled or the like, since the device is connected to a cloud even after shipment, the device can be traced via the cloud, making it possible to, for example, announce the malfunction of a recalled product and/or force it to shut down. This will significantly reduce costs associated with product recall.

Figure 14:
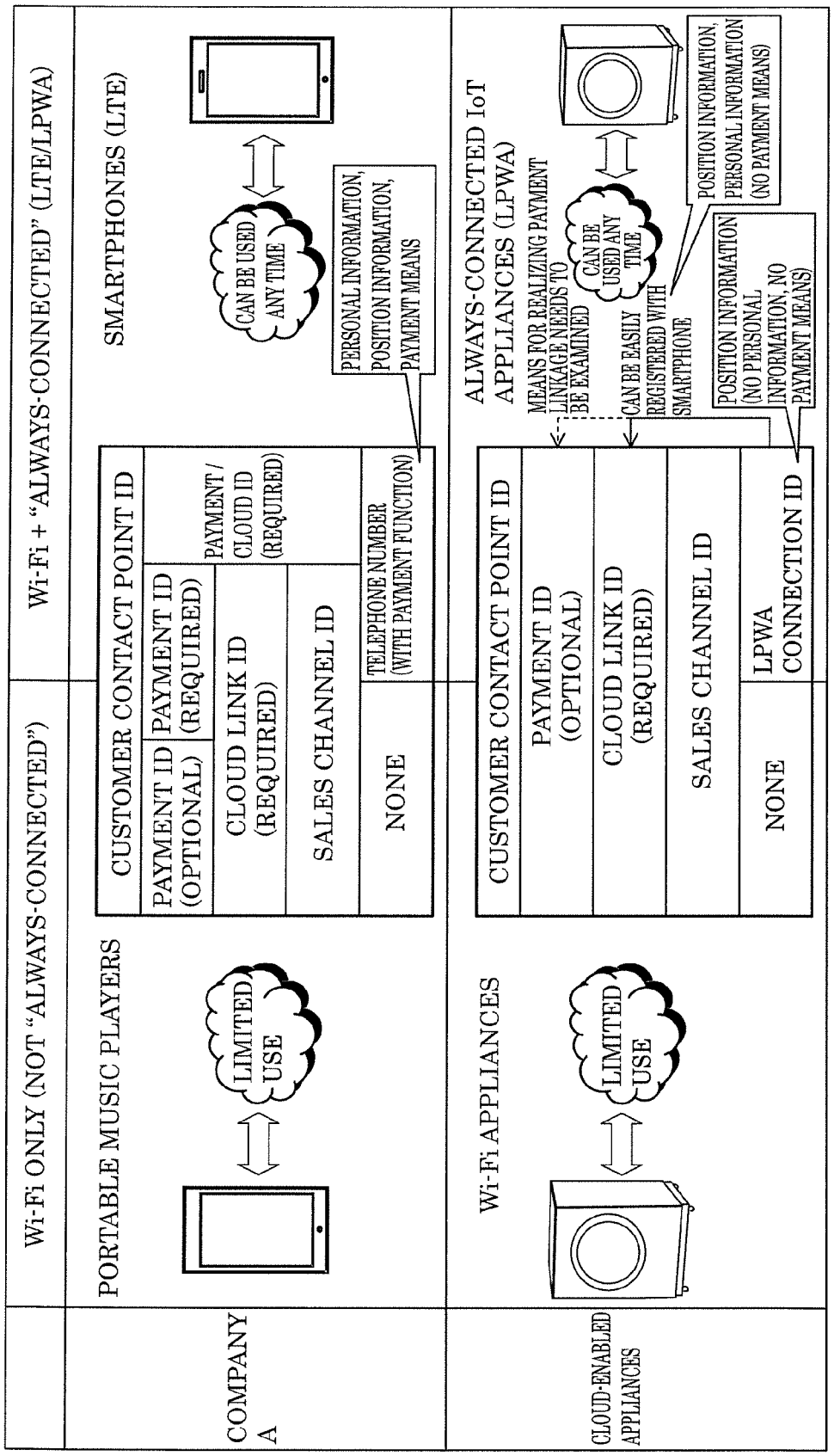
FIG. 14 is a diagram illustrating the relationship between the four tiers of customer contact and always-connected IoT appliances.

FIG. 14 is a diagram illustrating the relationship between the four tiers of customer contact points and always-connected IoT appliances.

Mobile carriers constructed a complete platform (device ID, personal information, position information, means of payment, etc.) with feature phones.

Next, with the emergence of mobile audio players, smartphones, and the like, cloud-service-side was taken over, and the ecosystem constructed by mobile carriers destabilized.

In the future, with the emergence of fourth generation IoT appliances that are equipped with always-connected functionality, by securing a device ID (cloud link ID) that enables the device to be always connected to a cloud, it is believed that this can be utilized in the establishment of customer contact points.

Figure 15:
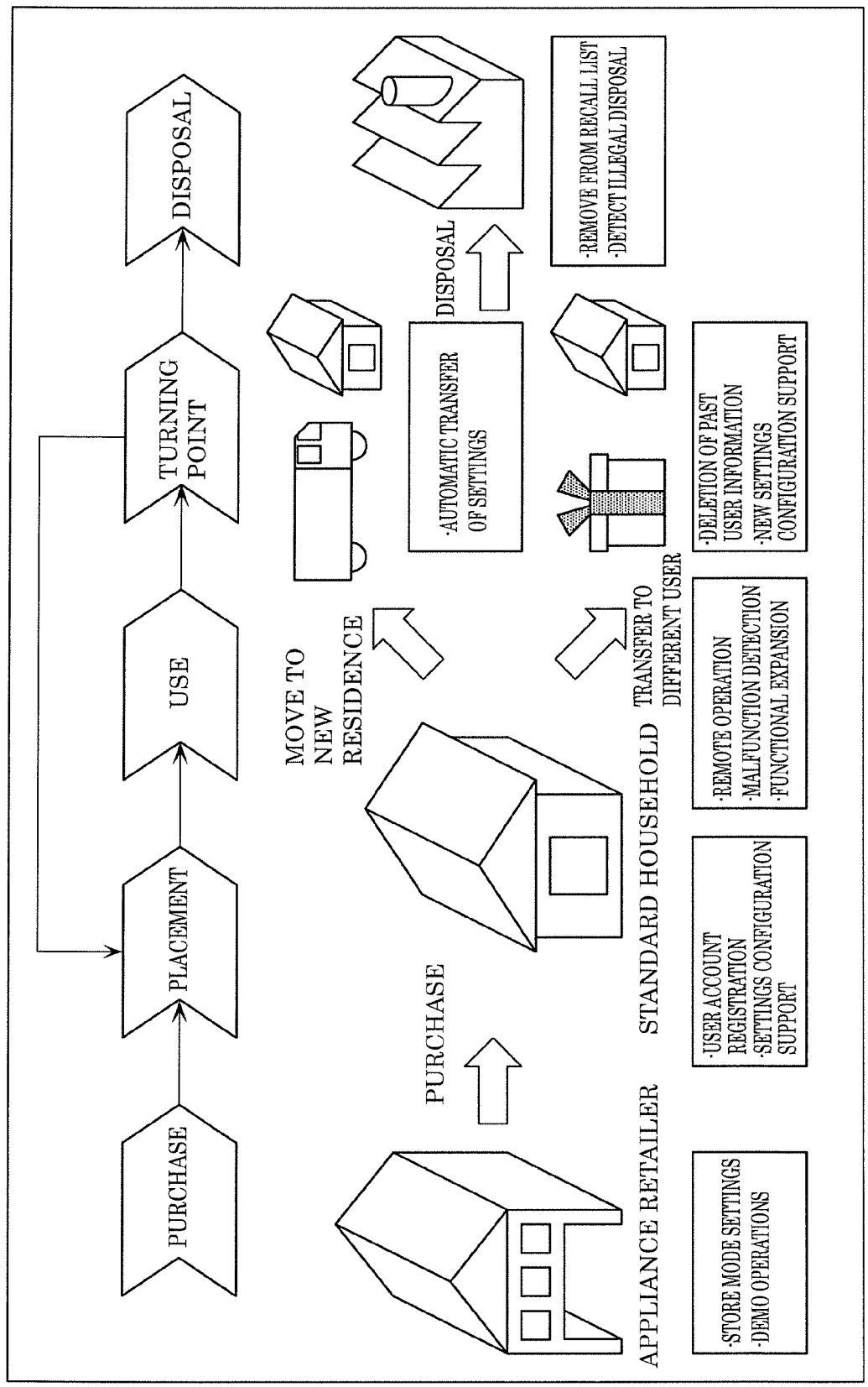
FIG. 15 is a diagram illustrating appliance lifetime management.

FIG. 15 is a diagram illustrating appliance lifetime management.

Two features of LPWA technology are as follows.

First, the user can communicate with a cloud without having to configure any settings. In other words, by causing all IoT appliances to connect to a cloud and managing the device unique IDs and communication module IDs, the cloud can know the operation states of the appliances.

Second, it is possible to obtain approximate position information of the appliance via the above-described ID management information and information obtained over a communication network. In other words, a cloud can know where the IoT appliance is being used.

In this way, by adopting LPWA technology, a cloud can know the operation states and position information of all IoT appliances, making lifetime management of the appliances possible. With this lifetime management, it is possible to provide functions suited to various application usage situations, from purchase and initial placement, to turning points, such as moving, and disposal.

In this way, the present disclosure relates to a method of determining what kind of state an appliance is in, and functions provided in accordance with the states.

There are two conceivable models for the communication module in an always-connected IoT appliance. The first is an unfitted model in which the communication module is not fitted with a battery, and the second is a fitted model in which the communication module is fitted with a battery.

The first model communication module starts communicating when the device is powered on. At this time, information on, for example, position, use frequency, and settings menu configurations is uploaded to a cloud. Then, the cloud estimates, from the uploaded information, what kind of state the device is in, such as whether it is an appliance displayed as a demo model in a store, whether it is placed and being used in the home of a user, whether the user has moved to a new residence or just been resold, or whether it has not been used for a long time.

Since the second model communication module includes a battery, it can communicate with a cloud even without power from an external power source. Accordingly, for the second model, a cloud can estimate states that would be impossible or difficult to estimate with the first model. For example, with the first model, in a state in which the communication module is not receiving power from an external power supply, a cloud has difficulty estimating whether the device has been discarded or just has not been used for a long time. Since the battery allows the second model to communicate even when the communication module is not receiving power from an external power supply, more cases can be estimated with the second model than the first model. For example, if the position information last transmitted by the second model indicates that the device is in an incinerator plant or recycle station, a cloud can estimate that the device has been discarded. In another example, if the position information indicates that the device is in the same position as when the device was used in the past and the use frequency indicates 0 continuously, with the second model, a cloud can estimate that the device is in a state in which it has not been used for a long time. Moreover, if the second model communication module is equipped in an appliance, a cloud can also detect cases in which the appliance has been illegally discarded.

As shown, since a cloud can obtain various information from always-connected IoT appliances, the cloud can estimate various states of an appliance based on the obtained information, and provide situational functionality, for the "lifetime of the appliance", from initial use to disposal.

As a result of an appliance being always connected to a cloud, even if the product were recalled or the like, the cloud can communicatively connect to the appliance, even after shipment, and trace the state of the appliance. Accordingly, for products subject to a recall, the cloud can execute measures such as announcing the malfunction or forcing the appliance to shut down. As a result of being able to trace their products, the manufacturer can accurately know the progress of the recall measures, and substantially reduce costs related to handling devices whose states are unknown. Moreover, regarding the expansion and development of functions after shipment, such as software updates for providing new functions and/or improving usability, with third generation devices, due to the low rate of connectivity to the cloud, it was difficult to deepen customer value with such features, but as fourth generation devices can be always connected, this value added can be properly provided to customers.

Figure 16:
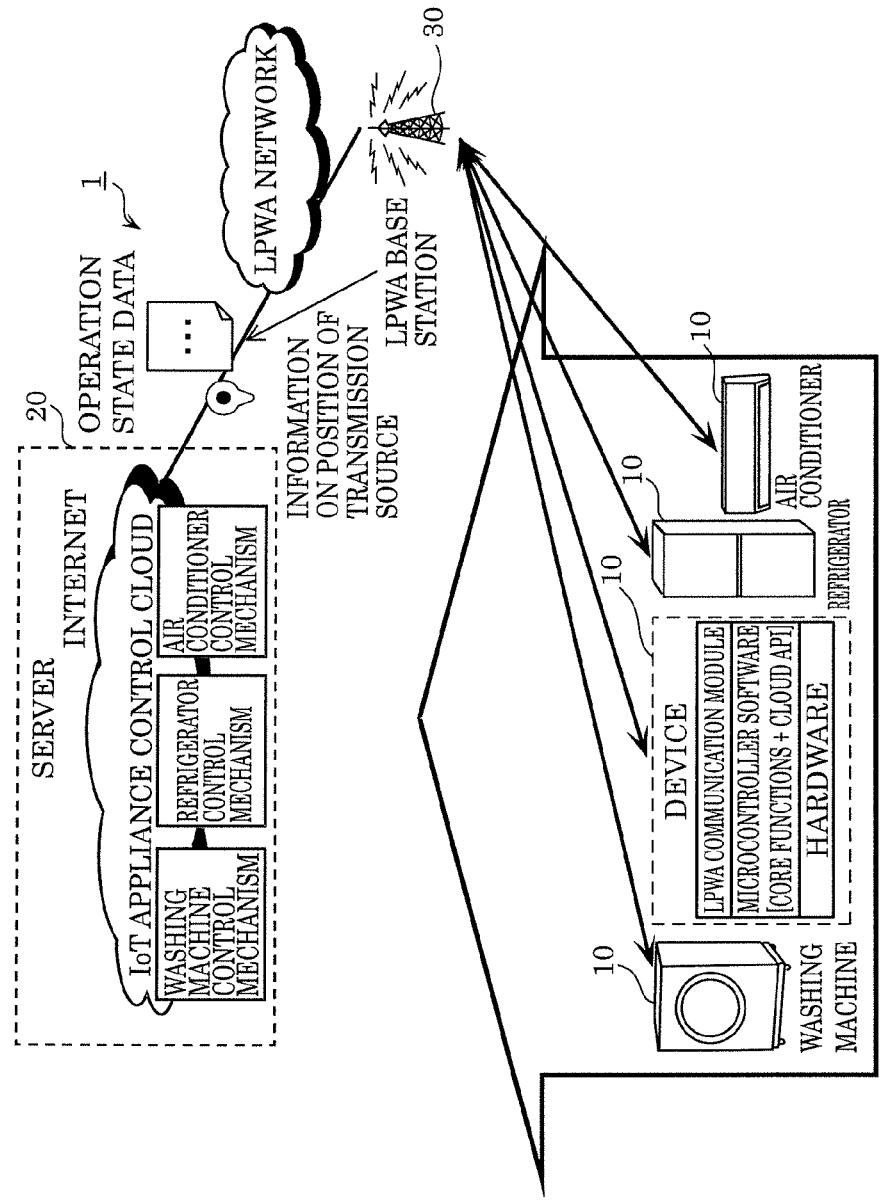
FIG. 16 is a diagram illustrating a workflow of collecting data indicating operation states of appliances in a device management system.

FIG. 16 is a diagram illustrating a workflow of collecting data indicating operation states of appliances in a device management system. FIG. 17 is a table illustrating a specific example of operation information and unique information for an appliance received by a cloud.

As illustrated in FIG. 16, device management system 1 includes server 20, base station 30, and devices 10.

Server 20 is communicatively connected to a network, such as the internet, and functions as an IoT appliance control cloud. Functions performed by server 20 will be described in greater detail later.

Base station 30 is, for example, an LPWA base station, and is used in long-distance wireless communication that allows IoT appliances to be always connected to a network. Although only one base station 30 is illustrated in the example in FIG. 16, device management system 1 may include a plurality of base stations 30.

Each device 10 is a fourth generation household appliance described above, that is to say, an always-connected IoT appliance. Moreover, each device 10 communicatively connects to one base station 30 among a plurality of base stations 30. Each device 10 sequentially transmits, to server 20 via the one base station 30, operation state data (hereinafter also referred to as "operation information") indicating a current operation state of the device 10, using an LPWA communication module included in the device 10.

Note that as illustrated in FIG. 17, operation information includes the data fields "device unique ID", "communication module ID", "communication module type", "transmission date and time", "power state", "counting start date and time of operation count", "operation count", etc. Other than these data fields, the operation information may include software version information, information in which difference information for when, for example, a change is made to a component, is managed, menu settings configurations, mode settings, etc. With this, server 20 can more accurately manage what kind of states each device 10 is operating in. Moreover, the data fields included in the operation information may be set with a priority level or transmission rate of occurrence. The amount of data transmitted can be reduced by, for example, applying different settings to different fields, such as setting a field to be written each time data is transmitted, setting a field to be written weekly, and setting a field to be written only when there is a change. In cases in which the communication module operates off an internal battery rather than an external power source in particular, it is beneficial to transmit only important data fields in order to save power.

Next, upon sequentially receiving the operation information, base station 30 sequentially transmits, to server 20, unique information which is unique to base station 30, together with the sequentially received operation information. Here, when base station 30 forwards the operation information, the unique information that is transmitted together with the operation information is position information indicating the position at which base station 30 that transmitted the unique information is disposed, as indicated in the bottom row in the table in FIG. 17. The unique information is not limited to position information, and may be an identifier that identifies base station 30.

Next, the configuration of device 10 and the configuration of server 20 will be described.

Figure 18:
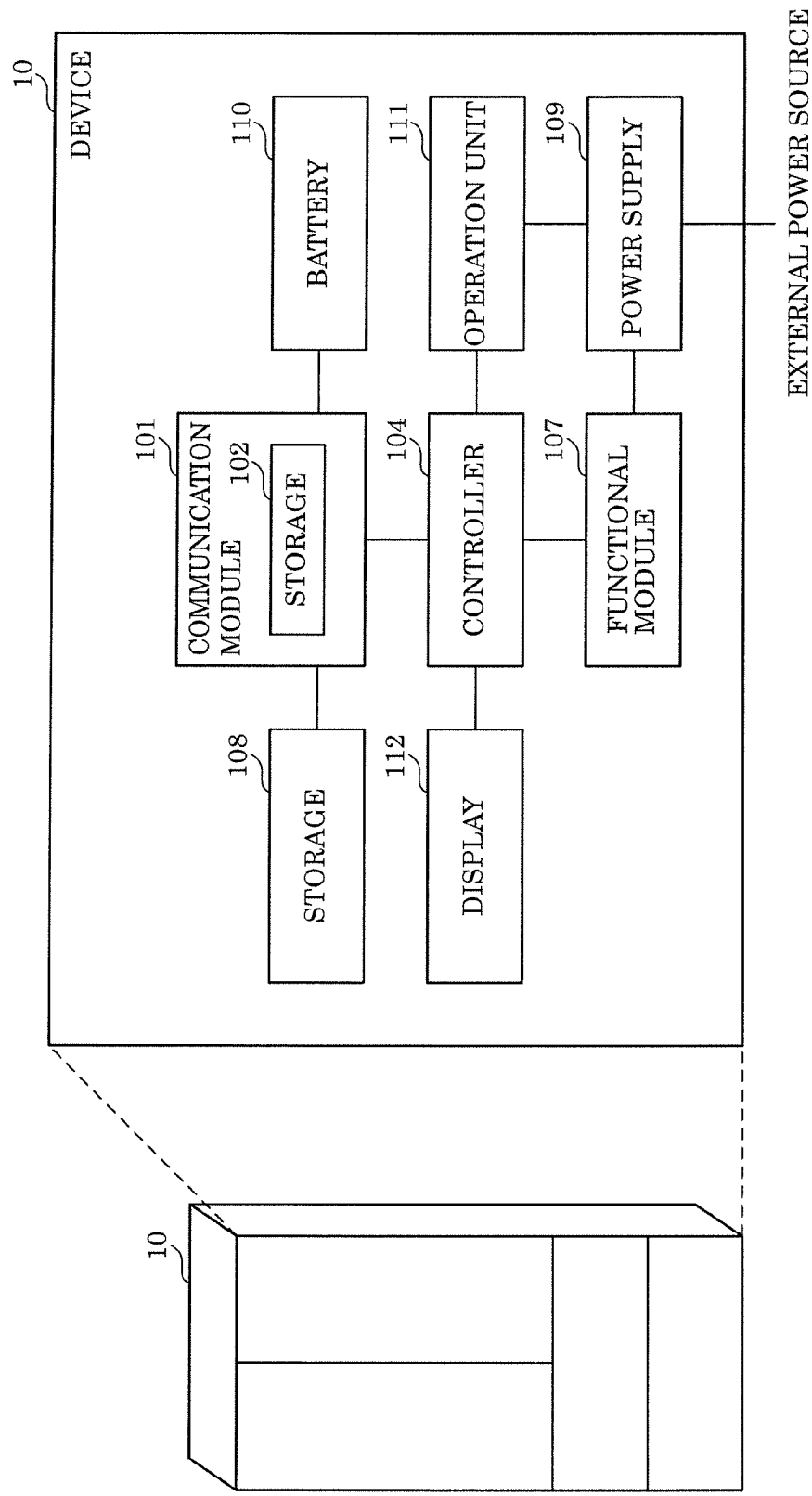
FIG. 18 illustrates a block diagram of a device which is an IoT appliance.

FIG. 18 illustrates a block diagram of device 10, which is an IoT appliance.

As illustrated in FIG. 18, device 10 includes communication module 101, controller 104, functional module 107, storage 108, power supply 109, battery 110, operation unit 111, and display 112.

Communication module 101 connects to server 20 that manages device 10 through a plurality of mutually different networks. Communication module 101 is, for example, a communication module for performing long-distance wireless communication, such as an LPWA communication module. Note that communication module 101 may include a communication module that performs, among the three methods of LPWA and Wi-Fi described with reference to FIG. 8, communication through at least one method of LPWA. In other words, communication module 101 may include a plurality of communication modules that respectively perform communication through different methods of LPWA, and may include a plurality of communication modules that respectively perform communication through LPWA and Wi-Fi. Communication module 101 includes storage 102 that stores the module ID of the communication module. When communication module 101 includes a plurality of communication modules that use different communication methods, storage 102 stores module IDs for each of the plurality of communication modules.

Controller 104 generates operation information for device 10, and transmits the generated operation information to server 20 using communication module 101. More specifically, controller 104 may generate operation information including a power state indicating whether power supply 109 of device 10 is powered on or off, by obtaining the power state, may generate operation information including an operation count indicating the number of times device 10 has been operated, by counting the number of operations, and may generate operation information including function information indicating the function being fulfilled by functional module 107. The operation information may include the various data fields described in FIG. 17. Moreover, controller 104 may cause display 112 to display an image based on the information received from server 20 via communication module 101.

Functional module 107 is a module that fulfills a function of device 10.

Storage 108 is a storage device that stores the unique ID of each device 10.

Power supply 109 receives power from an external power source, and supplies power to each component in device 10.

Battery 110 is a battery that supplies power to, for example, communication module 101. Battery 110 may be a primary cell or a secondary cell.

Operation unit 111 is an input device that receives an operation input made by a user to operate device 10. When device 10 has a door or lid that opens and closes, like on a refrigerator, microwave oven, or rice cooker, operation unit 111 may be the door or lid.

Display 112 is a display device that displays a variety of information as images.

Next, the configuration of device 10 will be described in greater detail, using a refrigerator as an example.

Even though device 10, exemplified here as a refrigerator, is connected to a network as an IoT device, device 10 is still used as an appliance. Accordingly, device 10 includes a variety of modules for realizing its original functionality as an appliance. In the example of a refrigerator, these modules include, for example, the compressor for cooling the inside of the refrigerator, lighting for illuminating the inside of the refrigerator when the door is opened, and a sensor for measuring the inside temperature or humidity. Each of these modules corresponds to functional module 107. Moreover, large appliances such as refrigerators or air conditioners typically connect to an external power source via power supply 109.

Moreover, recent appliances are typically equipped with controller 104 using a microcomputer or processor, to control various convenient functions. In the example of a refrigerator that includes an ice-making function, a sensor provided in a specialized tray for storing the ice senses the presence or absence of ice and performs operations for making new ice accordingly. In order to carry out such precise operations, control is performed via a microcomputer or processor and software executed by the microcomputer or processor.

Furthermore, device 10 includes display 112 for presenting various information to the user, or operation unit 111 for the user to make complex operational inputs.

Displays included in conventional devices use limited methods to create displays via lamps or a few numeral digits, and only display the minimum amount of required information, such as indication of an error or indication that the power is on or off. Moreover, conventional devices are characterized by simple operations performed using only a few buttons, such as instructing quick freezing or a reset operation for when there is an error.

In contrast, device 10 includes a small touch panel display functioning as operation unit 111 and display 112, making it possible to display more complex states and configure multiple settings.

The component that gives device 10 its IoT appliance characteristics is communication module 101. Communication module 101 enables connection to the internet using one or more schemes from among the various means of communication, such as Wi-Fi or LTE. If device 10 includes a plurality of communication modules, each communication module may be assigned with a separate communication module ID. Depending on the communication method used, the communication module ID functions as a communications identifier like a telephone number does in LTE, for example. By connecting to the internet, various information collected by controller 104 can be transmitted to server 20, and, conversely, information required for controlling device 10 can be obtained from server 20. Furthermore, a technology known as LPWA has emerged in recent years. Although transmission speed is low with LPWA, network connection is possible with little power consumption. By equipping device 10 with an internal battery 110 aside from the external power supply, a minimum level of communication is possible with LPWA even when device 10 is not connected to an external power supply. Moreover, depending on the type of communication, it may be necessary to specify a particular appliance when carrying out control, so device 10 is also expected to include storage 108 that stores a unique ID of device 10.

Figure 19:
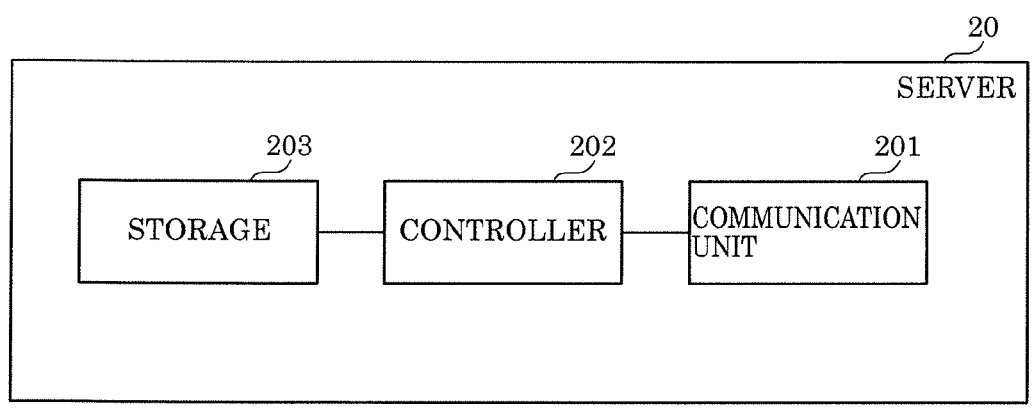
FIG. 19 illustrates a block diagram of server 20, which is an IoT appliance control cloud.

FIG. 19 illustrates a block diagram of server 20, which is an IoT appliance control cloud.

As illustrated in FIG. 19, server 20 includes communication unit 201, controller 202, and storage 203.

Communication unit 201 sequentially receives the operation information and position information sequentially transmitted by device 10, by communicatively connecting to a network such as the internet. Communication unit 201 may transmit a processing result of controller 202 to device 10 via a network and base station 30.

Controller 202 sequentially stores, in storage 203, in association with each other, the operation information and position information that are sequentially received at a corresponding time by communication unit 201. Controller 202 may transmit, to device 10 via communication unit 201, a processing result of processing using the operation information or the position information stored in storage 203, by executing a predetermined program.

Controller 202 is implemented as nonvolatile memory that stores a predetermined program and a processor that executes the predetermined program. Controller 202 may be implemented as a dedicated circuit that implements the above functions.

Storage 203 stores the operation information and the position information received by communication unit 201. Storage 203 may store the processing result of controller 202. Storage 203 is implemented as, for example, a hard disk drive (HDD) or solid state drive (SSD).

Next, an example in which server 20 collects daily position information from device 10 through the always-connected feature achieved through LPWA.

Figure 20:
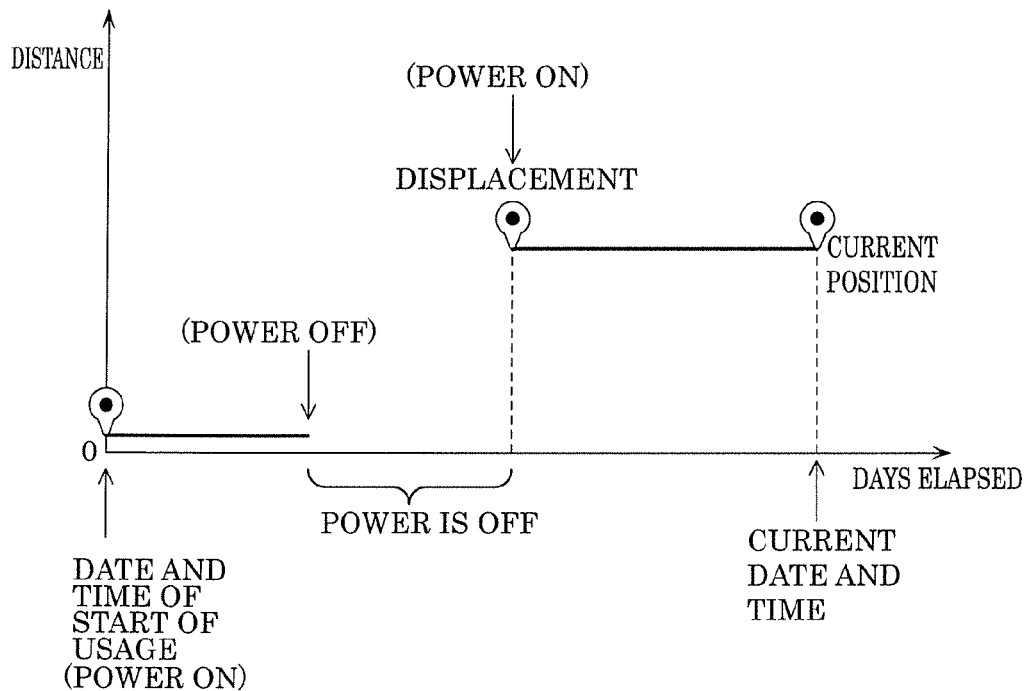
FIG. 20 is a graph of an example of distance displaced from a position at start of use to a position at the current point in time.
Figure 21:
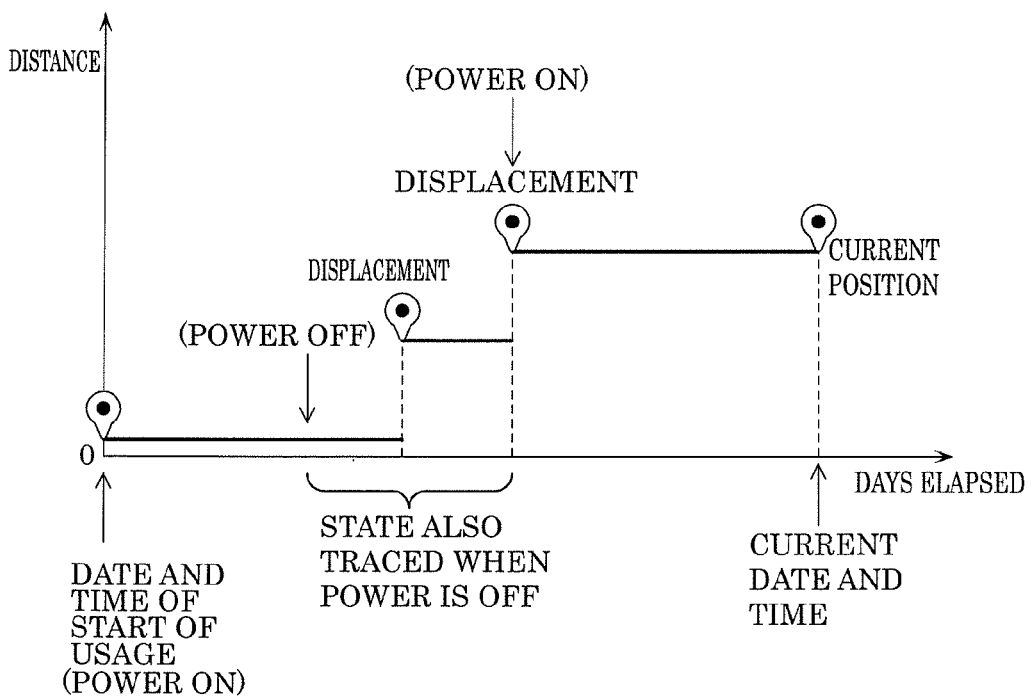
FIG. 21 is a graph of an example of distance displaced from a position at start of use to a position at the current point in time.

FIG. 20 and FIG. 21 are graphs of examples of distance displaced from a position at start of use to a position at the current point in time.

Position information collected by server 20 from device 10 as a result of device 10 being always-connected through LPWA is an important element for making it possible to estimate states, which was not possible with how appliances up until now connected to a network. Moreover, when device 10 is powered on, communication module 101 sequentially transmits operation information to server 20. Accordingly, in server 20, among the data that has been sequentially transmitted and collected up until the current date and time, the data having the oldest transmission date and time can be determined to be the date and time that the user began using device 10 (hereinafter also referred to as "use start date and time").

In the graphs in FIG. 20 and FIG. 21, calculated distance between the position information corresponding to the use start date and time of device 10 and the position information corresponding to the data transmission date and time is represented on the vertical axis, and the number of days elapsed from the use start date and time is represented on the horizontal axis. In the graph of FIG. 20, sections without a line indicate a state in which the appliance is powered off. In FIG. 20 and FIG. 21, lines parallel to the horizontal axis indicate that the appliance is in the same location, and vertical lines indicate displacement. Since appliances are typically used within the home, the detection of displacement is an important aspect in state estimation.

FIG. 21, on the other hand, illustrates an example of a graph when the appliance is equipped with a battery for the communication module. With this, since the communication module can transmit operation state data to a cloud regardless of the power state of the appliance, it is possible to trace the displacement of the appliance even when the appliance is powered off.

Next, an example in which daily operation count of device 10 is collected through the always-connected feature achieved through LPWA.

Figure 22:
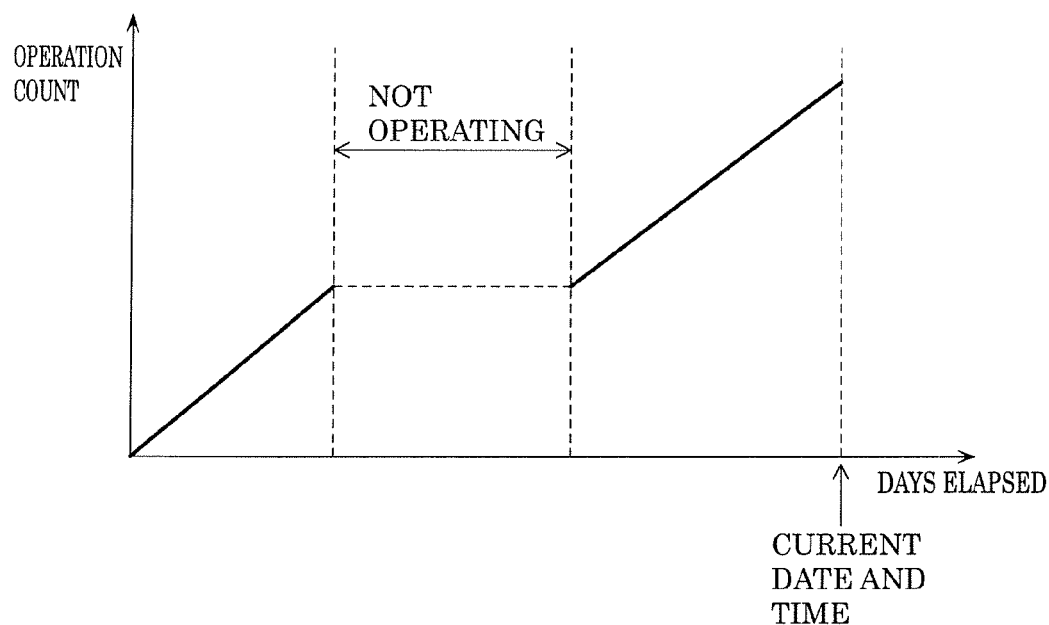
FIG. 22 is a graph illustrating a cumulative aggregation of the operation count.
Figure 23:
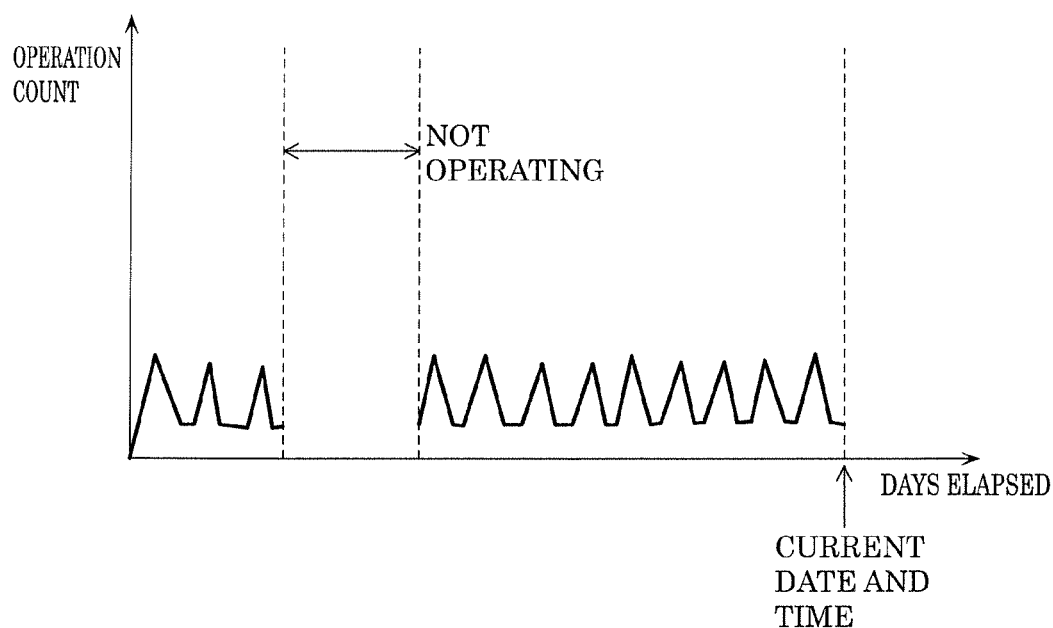
FIG. 23 is a graph illustrating a day-by-day aggregation of the operation count.

FIG. 22 is a graph illustrating a cumulative aggregation of the operation count. FIG. 23 is a graph illustrating a day-by-day aggregation of the operation count.

The daily operation count collected as operation information by server 20 as a result of device 10 being always-connected through LPWA is one important element for making it possible to estimate states, which was not possible with appliances and network connection methods up until now. As a result of it being easier than ever to know the state of an appliance and being possible to apply this to every appliance, under this premise, estimation of states of appliances is possible.

In the graph in FIG. 22, a cumulative operation count of device 10 is represented on the vertical axis, and the number of days elapsed from the use start date and time is represented on the horizontal axis. In the graph of FIG. 22, sections without a line and lines parallel to the horizontal axis indicate a state in which the appliance is not operating. The purpose of this graph is for checking changes in operation count over a long period of time.

In the graph in FIG. 23, a day-by-day operation count of device 10 is represented on the vertical axis, and the number of days elapsed from the use start date and time is represented on the horizontal axis. In the graph of FIG. 23, sections without a line and a value of 0 indicate a state in which device 10 is not operating. The purpose of this graph is for checking patterns in the increase and decrease in operation count over a short or medium period of time.

With the always-connected feature achieved through LPWA, server 20 can know the position information and operation status of all devices 10, from initial use to disposal, making it possible to different functions for each state of the appliance, using this information. Specific examples of such provision of functions include providing support for connecting to Wi-Fi at the time of setting up the appliance after purchase, providing advertisements directly after a user moves residences or inhabitants of a household increase, and deeming an appliance no longer subject to recall upon detecting that the appliance has been discarded.

Next, the method of estimating the state of an appliance, such as estimating that the appliance is placed in a standard household, will be described.

Figure 24:
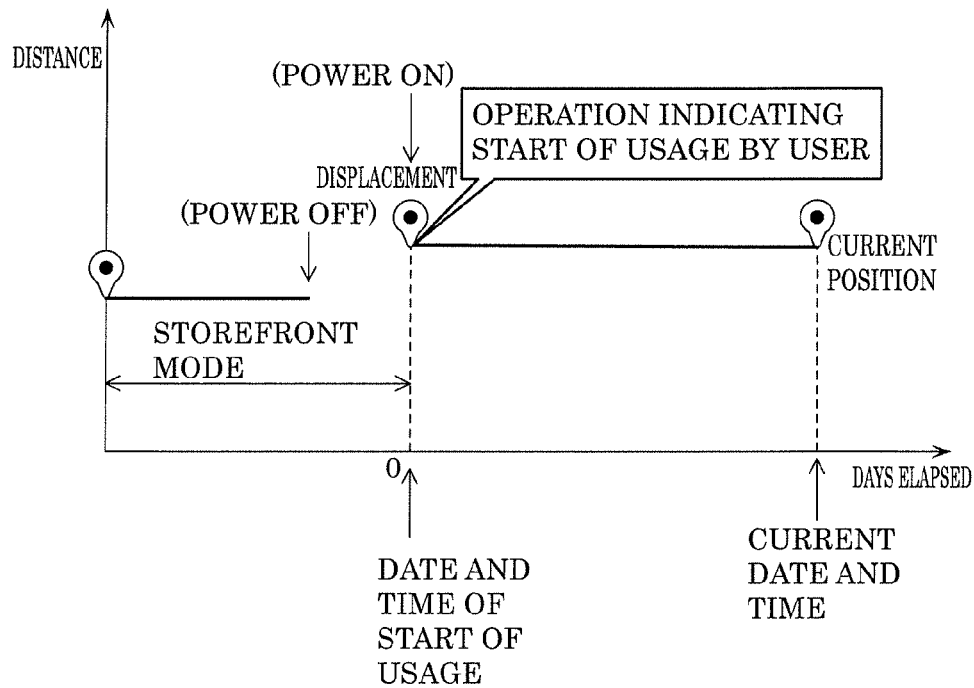
FIG. 24 is a graph for illustrating a method of detecting that a device is placed in a standard household.
Figure 25:
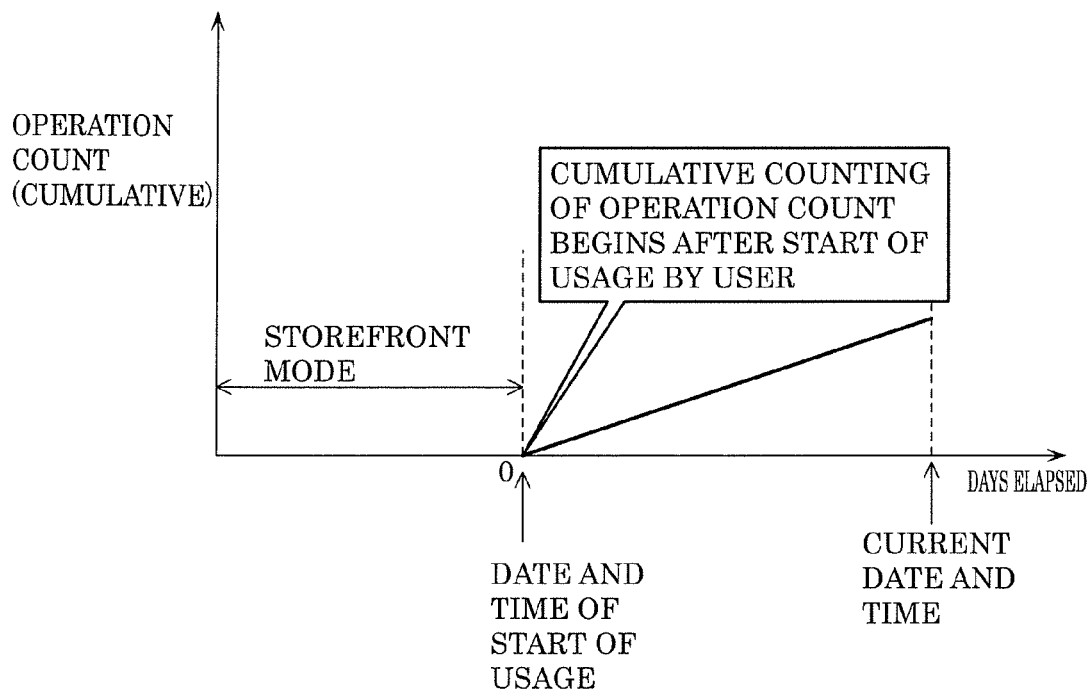
FIG. 25 is a graph for illustrating a method of detecting that a device is placed in a standard household.

FIG. 24 and FIG. 25 are graphs for illustrating a method of detecting that device 10 is placed in a standard household.

The relationship between the user and device 10 begins with the purchase of device 10 and placement in a standard household. In other words, the timing at which device 10 is placed in a standard household can be considered to be the start of use of device 10 by the user, so detecting this timing is extremely important.

There are a plurality of conceivable methods for detecting the timing at which device 10 is placed in a standard household.

For example, server 20 may determine that device 10 is placed in a standard household by confirming this with the user when device 10 is initially powered on. In such cases, a user interface (UI) for confirming with the user that device 10 has been placed in a standard household may be displayed on display 112, and whether device 10 has been placed in a standard household or not can be confirmed by receiving an input from operation unit 111. When such a method is used, since it is conceivable that device 10 may be initially powered on in an appliance retailer, a question such as "start using the device?" may be displayed, and when "no" is selected, "is the device being used in a store?" may be displayed, whereby usage in a store and usage in a standard household can be distinguished according to the answers to the displayed questions. Moreover, operation information, including, for example, start date of use and operation count information, is accumulated from the point in time of usage by the user, and information from when the device was being used in a store can be reset.

In other words, controller 202 in server 20 determines whether, among a plurality of items of sequentially received unique information, first unique information received at a first time and second unique information received at a second time after the first time are different or not, and when the first unique information and the second unique information are different, the plurality of items of first operation information received in a first period ending at the first time and the plurality of items of second operation information received in a second period starting at the second time are managed separately. Stated differently, the first period indicates a period before the user purchases device 10, and the second period indicates a period in which the user possesses device 10 after purchasing device 10.

Specifically, controller 202 may separately manage the plurality of items of first operation information and the plurality of items of second operation information by storing the plurality of items of first operation information in association with a first identifier in storage 203 and storing the plurality of items of second operation information in association with a second identifier different from the first identifier in storage 203. The first identifier is, for example, an identifier indicating that the device is located in, for example, an appliance retailer, before being sold. The second identifier indicates association with a user using the one or more devices in the second period. For example, the second identifier indicates that the device is placed in a standard household of the user after being purchased by the user. Note that the plurality of items of first operation information may be deleted from storage 203 after the start of use by the user has been detected.

Note that the first identifier may indicate possession by a first user, and the second identifier may indicate possession by a second user different from the first user.

Moreover, for example, when operation unit 111 in device 10 receives a specific operation indicating usage from the user, server 20 may determine that device 10 is placed in a standard household. A specific operation indicating usage is, more specifically, when device 10 is a washing machine, the detection of water entering the washing machine, and when device 10 is a rice cooker, the detection of steam when rice has started to be cooked. In this way, a specific operation indicating usage is preferably an operation that would not typically be performed before the device is sold. Additionally, when the device is a device that requires installation, such as an air conditioner, a specific operation indicating usage may be determined to have been performed when it is detected that part of the installation processes by an installer has been performed.

Figure 26:
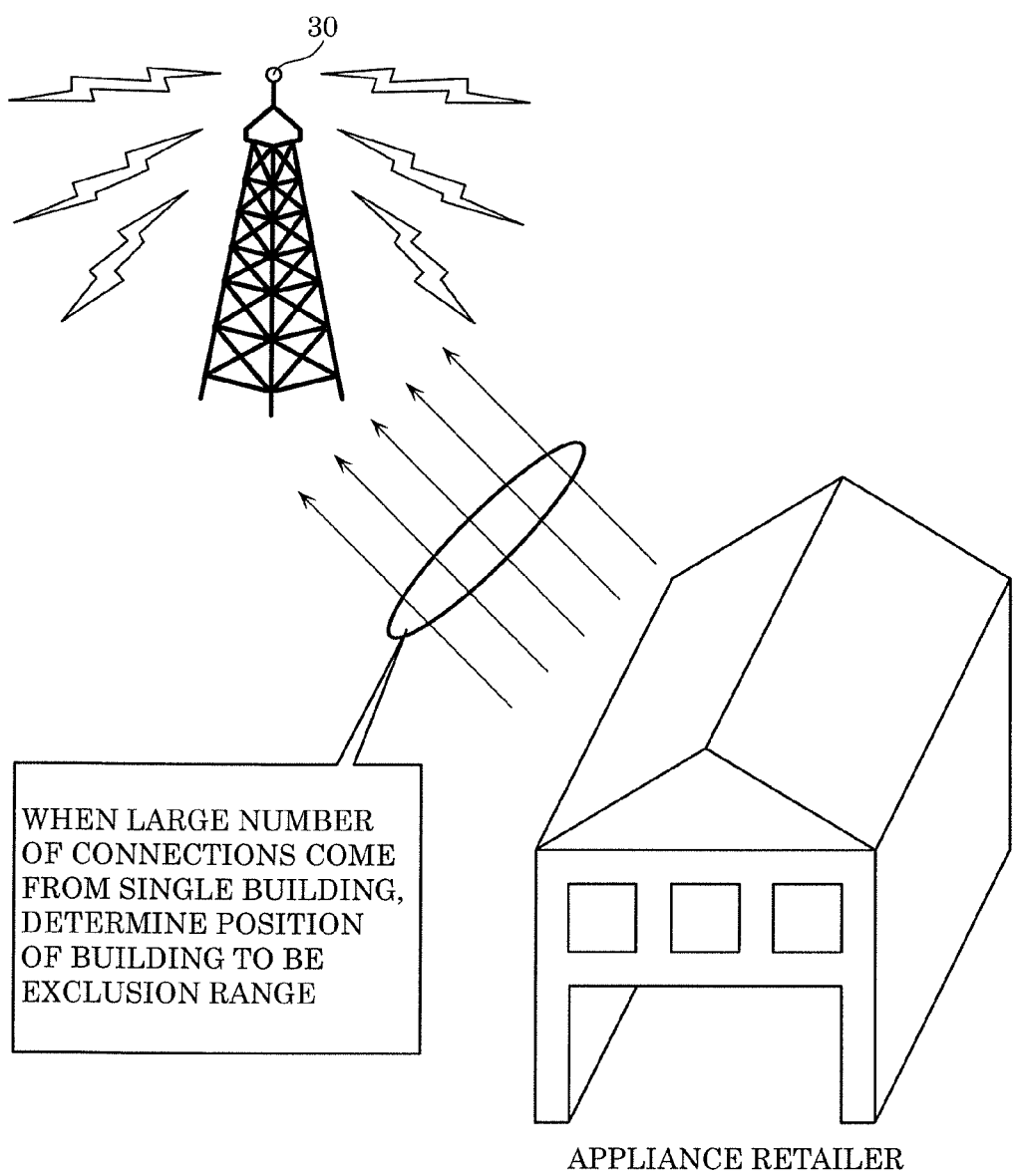
FIG. 26 illustrates an example of determining the exclusion range using the operation information and the position information transmitted from a plurality of devices.

Moreover, for example, server 20 may determine device 10 to be placed in a standard household when, using the sequentially received position information, the indicated position is outside an exclusion range, such as an appliance retailer or transit warehouse. Information indicating the exclusion range may be stored in advance in storage 203, and, alternatively, may be obtained from an external device by communication unit 201. Note that in urban areas, use of only this determination method is not sufficient, but since there are no false positives with this method (i.e., erroneously determining that the device is placed in a standard household), usage is preferable. Note that as illustrated in FIG. 26, the exclusion range is not limited to a predefined range; if devices 10 are devices that include a communication module including an internal battery, an exclusion range may be a location at which there is a large collection of devices 10 that are not powered on. With this, it is possible to continuously define the most current exclusion range at no cost. FIG. 26 illustrates an example of determining the exclusion range using the operation information and the position information transmitted from a plurality of devices.

When server 20 according to this embodiment determines that first unique information received at a first time and second unique information received at a second time after the first time are different, server 20 separately manages the plurality of items of first operation information received in a first period ending at the first time and the plurality of items of second operation information received in a second period starting at the second time. Accordingly, since server 20 manages operation information based on usage by a current user of the device, it is possible to determine the state of the device that is appropriate for the user's usage. In this way, devices can be efficiently managed since it is possible to manage the devices by excluding operation information based on usage by a user or the like other than the above-described user.

Moreover, the determination of the state of the device based on the operation information and the unique information obtained in the second period, which corresponds to the period of usage by the user, can be performed separately from the operation information and the unique information obtained in the first period. Accordingly, the state of the device can be determined accurately.

Next, one example of processes performed at the appliance purchasing and placement points within the lifetime management of device 10 will be given.

Upon initiation of usage in a standard household, the transmission of a log of, for example, the operation information by device 10 may be problematic from a privacy protection viewpoint. The log of device 10 is not classified as personal information under Japanese law so long as it is not linked to an ID of the user, but this may leave a feeling of unease in the user. Accordingly, upon determining that usage in a standard household has initiated, device 10 preferably refrains from transmitting the log to server 20 for the time being. However, when device 10 includes display 112 that can display a message, the user may be informed that a log will be transmitted to server 20 and asked for consent, and when the user consents, device 10 may proceed with transmitting the log.

Figure 27:
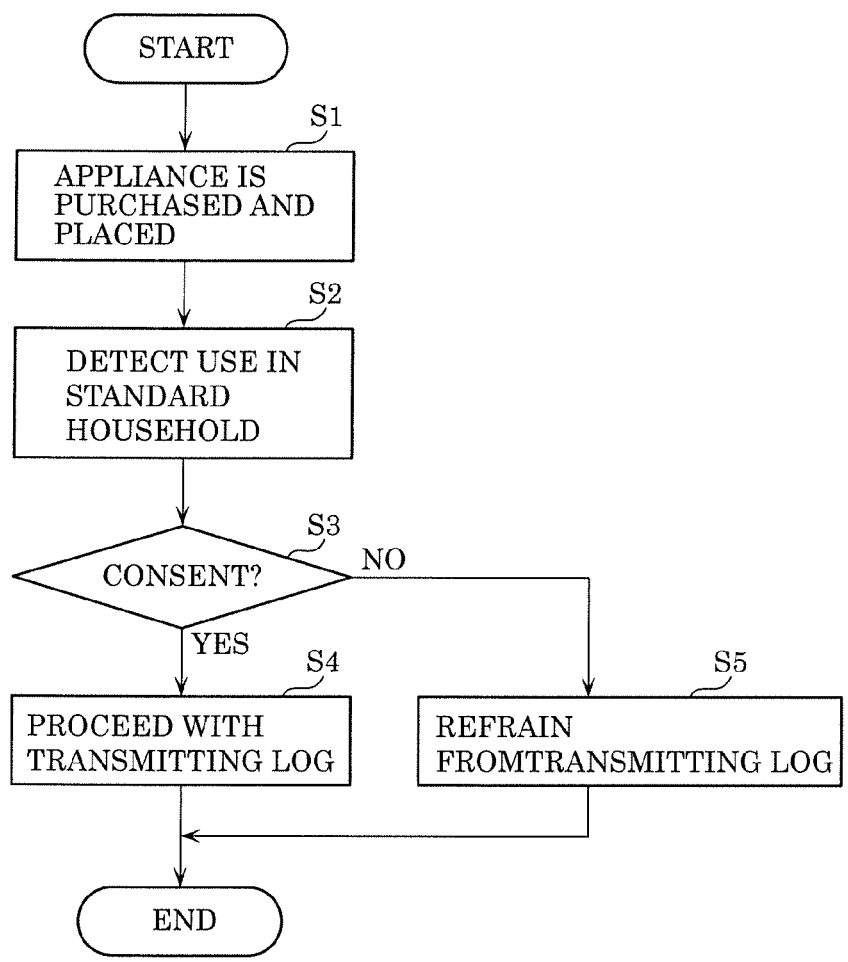
FIG. 27 is a flowchart illustrating processes for receiving consent for transmitting a log upon setting up a device.

FIG. 27 is a flowchart illustrating processes for receiving consent for transmitting a log upon setting up device 10.

Note that since device 10 includes communication module 101 in this example, it is not necessary to configure settings for connecting device 10 to a network.

First, device 10 is purchased and placed in a home of the user (S1). Here, since device 10 has been displaced from a store to the user's home, different unique information is transmitted to server 20.

With this, server 20 uses the method described with reference to FIG. 24 and FIG. 25 to detect usage in a standard household (S2). Note that rather than server 20 detecting the usage of device 10 in a standard household, the usage may be detected via device 10 receiving a specific operation indicating usage.

Server 20 inquires whether the user consents to the transmission of the log or not (S3). Here, server 20 transmits information for making the inquiry to device 10, device 10 receives the information, and displays the information for making the inquiry on display 112. Alternatively, device 10 may make the inquiry when device 10 detects usage of device 10 in a standard household.

When consent is obtained by operation unit 111 of device 10 receiving the corresponding input (yes in S3), device 10 proceeds with transmitting the log (S4). With this, for example, when device 10 is a refrigerator, server 20 can detect a malfunction based on, for example, data such as power consumption data and temperature conditions in the geographical region of use. Moreover, server 20 can similarly detect a malfunction based on transitions in amount of charge of a lithium ion battery or transitions in amount of generated photovoltaic power. By collecting such information, it is also possible to provide a function of notifying the user when it is time to repurchase a new device.

On the other hand, when consent is not obtained by operation unit 111 of device 10 receiving the corresponding an input (no in S3), device 10 refrains from transmitting the log (S5).

Note that even when device 10 refrains from transmitting the log for the time being, if, upon linking device 10 to the user, the user's consent is obtained, device 10 may proceed with transmitting the log.

Even when consent to transmit the log is not obtained, server 20 may continue to store information about the device, and server 20 may transmit notifications and commands to device 10. Since such a function is for protecting the safety of the user, such as notifying the user of recall information when the device has been recalled and displaying an indicator prompting a firmware update, this function may be kept from being disabled.

Figure 28:
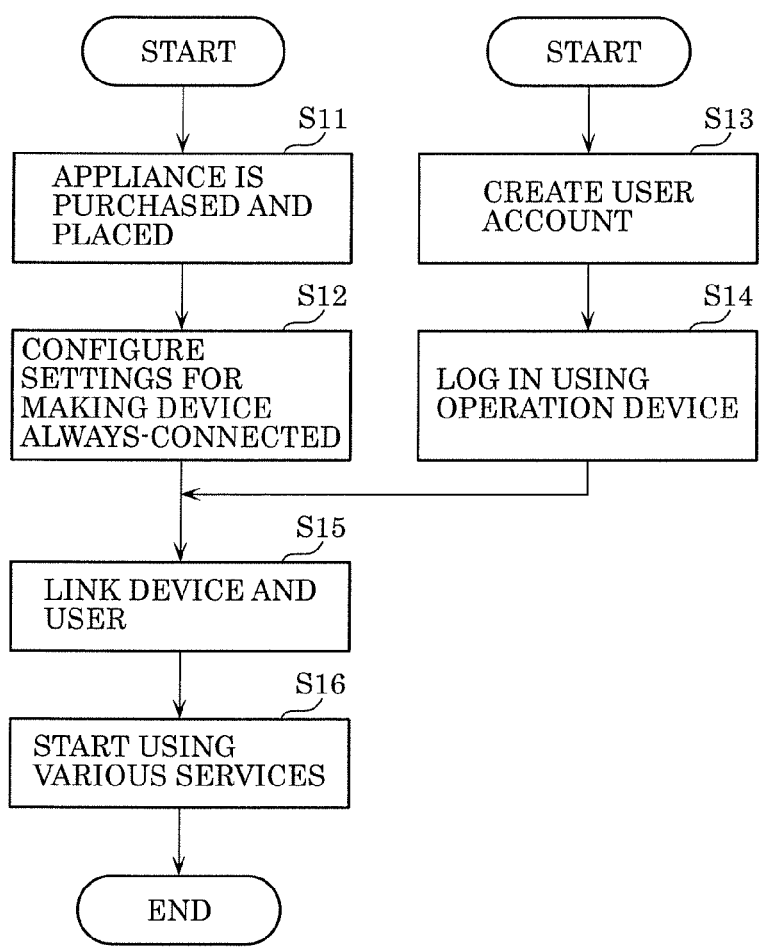
FIG. 28 is a flowchart illustrating one example of a sequence of processes performed up through usage of IoT appliance services.

FIG. 28 is a flowchart illustrating one example of a sequence of processes performed up through usage of IoT appliance services.

First, after device 10 has been purchased by a user from, for example, an appliance retailer, the user or retailer transports device 10 to the user's home and sets up device 10 (S11). When device 10 is a large appliance, such as an air conditioner, installation may be required. Since large appliances typically operate on external power, power is supplied when the appliance is plugged into an outlet, and the device begins operating as an appliance.

Next, the settings for making device 10 always-connected are configured (S12). With Wi-Fi technology that is currently in wide use, device 10 may be always-connected by being connected to a Wi-Fi access point in the household. In order to accomplish this, settings such as the name of the Wi-Fi access point and, when necessary, the password for encrypted communication must be configured. Note that when connecting to a telecommunications carrier network such as LTE, this configuring for making device 10 always-connected can be eliminated by setting up the appliance in advance before being shipped from the factory.

In this way, when the configuring of the settings for making device 10 always-connected is complete, device 10 can transmit operation information to server 20. One conceivable example is the transmission of history data such as a log indicating operation conditions to server 20. However, at this stage, for security reasons, the user cannot yet externally operate device 10.

Next, the user creates a user account for operating device 10 (S13). In typical cases, the user account is created using an operation device to navigate to the home page of the IoT appliance service in a web browser and set up the user ID and password.

The user then logs into the created user account via the operation device (S14). Conceivable examples of an operation device include a smartphone, a tablet, and additionally a virtual private assistant (VPA) such as a smart speaker.

In this way, after the user has logged in via the operation device, device 10 and the user ID are linked (S15). This linking enables subsequent operation of device 10 from the operation device on which the user has logged into his or her account.

Thereafter, various services that use the IoT appliance can be used (S16). In recent years, there are cases in which installers or servicers who visit for repairing the device assist in configuring the Wi-Fi settings or user account settings as well.

As one example of the various services that use device 10, in a refrigerator, assuming there is a camera installed in the refrigerator, if the user logs in via a smartphone, even when away from the home, the user can use an application for the IoT appliance to view an image captured by the camera to check what items are in the refrigerator. Note that since the IoT appliance can only be operated from user accounts that are linked, there is no concern of an unrelated third party accessing and viewing the video inside the refrigerator.

Devices 10 not linked with a user account cannot use a variety of the services, that is to say, are functionally restricted. Accordingly, in order to provide the user with the full range of functions, one conceivable option is prompting the user with a display of a notification to link a user account at the point in time that device 10 is powered on.

Figure 29:
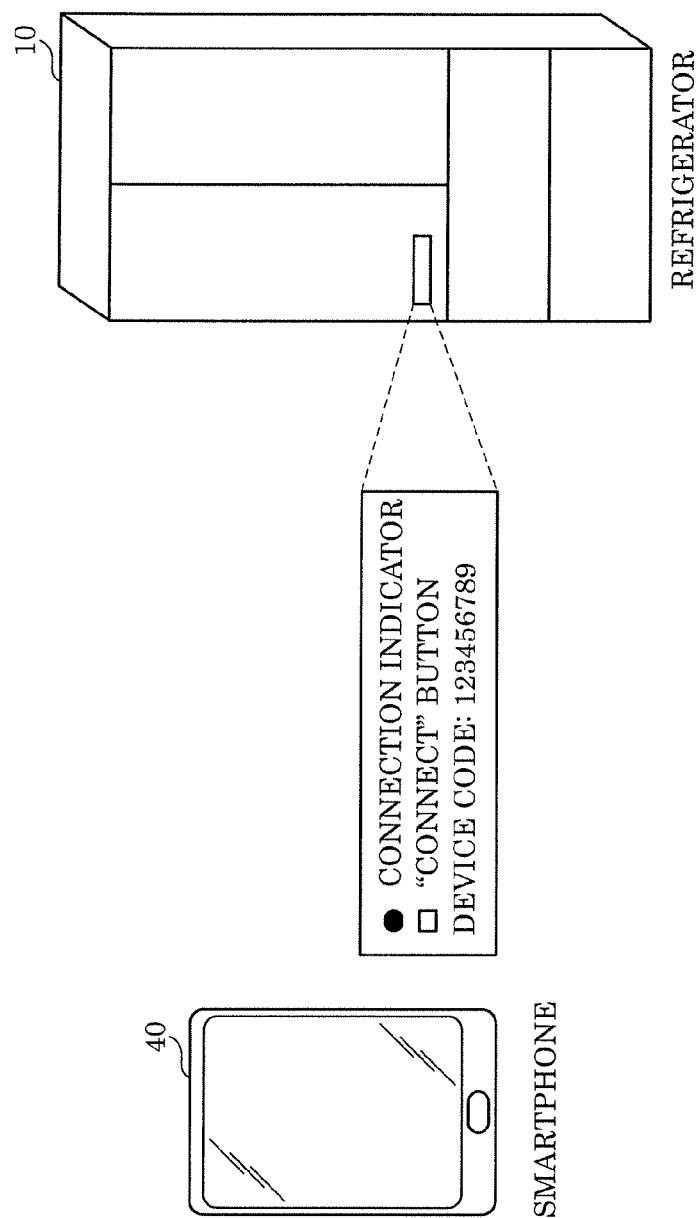
FIG. 29 illustrates a first example of a procedure for linking a device and a user.
Figure 30:
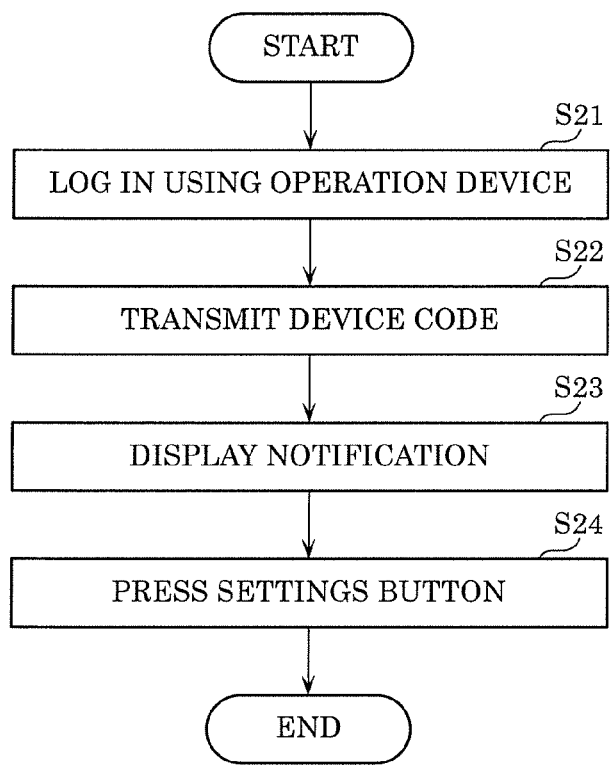
FIG. 30 is a flowchart of a first example of a procedure for linking a device and a user.

FIG. 29 illustrates a first example of a procedure for linking device 10 and a user. FIG. 30 is a flowchart of the first example of a procedure for linking device 10 and a user.

In the first example, first, the user logs in by inputting a user ID and a password into operation device 40, one example of which is a smartphone (S21).

Next, the user uses operation device 40 to input a device code assigned to device 10, and device 10 transmits the inputted device code to server 20 (S22). In this example, the device code is displayed on device 10. Note that instead of being displayed on device 10, the device code may be written on something that is packaged together with device 10, such as the warranty or operation manual. Moreover, in order to prevent input of a mistyped device code, the device code may be captured using the camera of the smartphone, and the text may be recognized by the smartphone or server-side. The device code need not be a character string such as a string of numbers; the device code may be a two-dimensional barcode, for example.

Once device 10 transmits the device code to server 20, server 20 notifies the device 10 specified by the device code. Note that the manufacturer of device 10 is required to create a correspondence table that associates the device code with communication address information for communication performed by the communication module when the settings are configured in the factory. With this, server 20 can refer to the correspondence table to identify the communication address that corresponds to the specified device code to notify the device 10.

When device 10 receives the notification from server 20, device 10 indicates on display 112 included in device 10 that a notification has been received (S23). For example, device 10 may cause an indicator lamp to flash to notify the user of the reception of the notification.

After the notification of the receipt, the user makes the input via operation unit 111 of device 10, and information indicating that the input has been made by the user is transmitted to server 20 (S24). With this, server 20 links the device ID and the user ID to complete the linking of device 10 and the user. For example, operation unit 111 may be an input button, and the input may be made by pressing the button.

Figure 31:
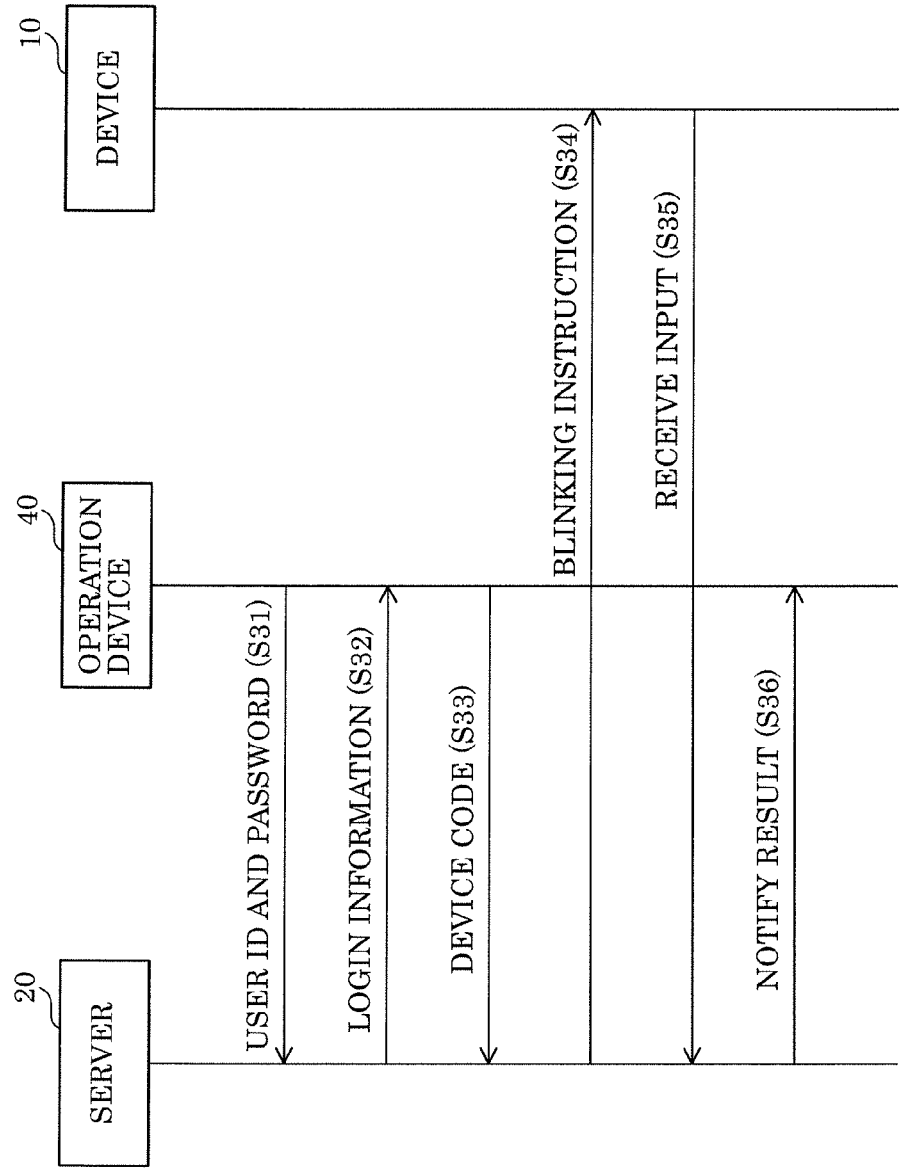
FIG. 31 is a sequence diagram of a first example of a procedure for linking a device and a user.

FIG. 31 is a sequence diagram of the first example of a procedure for linking device 10 and a user.

Operation device 40 receives the input user ID and password, and transmits the user ID and password to server 20 (S31). Server 20 confirms whether the password is correct or not based on user information managed in advance in server 20. When the password is incorrect, since there is a chance that a third party is spoofing, subsequent processing is not continued.

When the password is correct, server 20 transmits login information to operation device 40 (S32). Login information is, for example, an ID for identifying a session and key data to be used in subsequent communication.

Next, operation device 40 transmits the device code obtained using the method indicated in FIG. 29 and FIG. 30 to server 20 (S33). Note that in FIG. 29 and FIG. 30, the device code is transmitted as-is, but in actual usage, a result of processing that uses the login information is preferably transmitted. One conceivable method for this processing is appending the ID for identifying the session to the device code and encrypting this appended data with the key data described above. Moreover, it is preferable to protect the overall communication by encrypted communication such as SSL.

Server 20 converts the obtained device code into a communication address of the corresponding device 10 based on device information managed in advance server-side. If the obtained device code can be converted into the communication address, server 20 transmits a control signal instructing device 10 to blink a light on display 112 (S34). Note that a mechanism needs to be in place to prevent spoofing by server 20 for this control signal that instructs the blinking. If measures are not in place for preventing spoofing, a disguised server could be used to link a malicious third party user account and device 10. In order to prevent spoofing, for example, it is preferable that a public key for server 20 be stored in advance in device 10, and after adding a time-varying element, the blinking instruction be notified from server 20, and a signature be added by a private key for server 20.

When device 10 receives the instruction to blink, device 10 causes display 112 to blink. Thereafter, when the user makes an input via operation unit 111, device 10 transmits the input to server 20 (S35).

When server 20 receives an input, server 20 completes the linking of the user account and device 10, and transmits a notification of the completion to operation device 40 (S36). Note that it is preferable that a standby period for waiting for the input be set in advance in server 20. Typically, around one minute is required for the standby period. When server 20 does not receive an input after transmitting the control signal indicating the blinking, starting to count the timer for the standby period for waiting for the input, and the standby period elapses, a notification of completion indicating that the linking failed may be transmitted to operation device 40.

Operation device 40 displays the received notification of completion.

Figure 32:
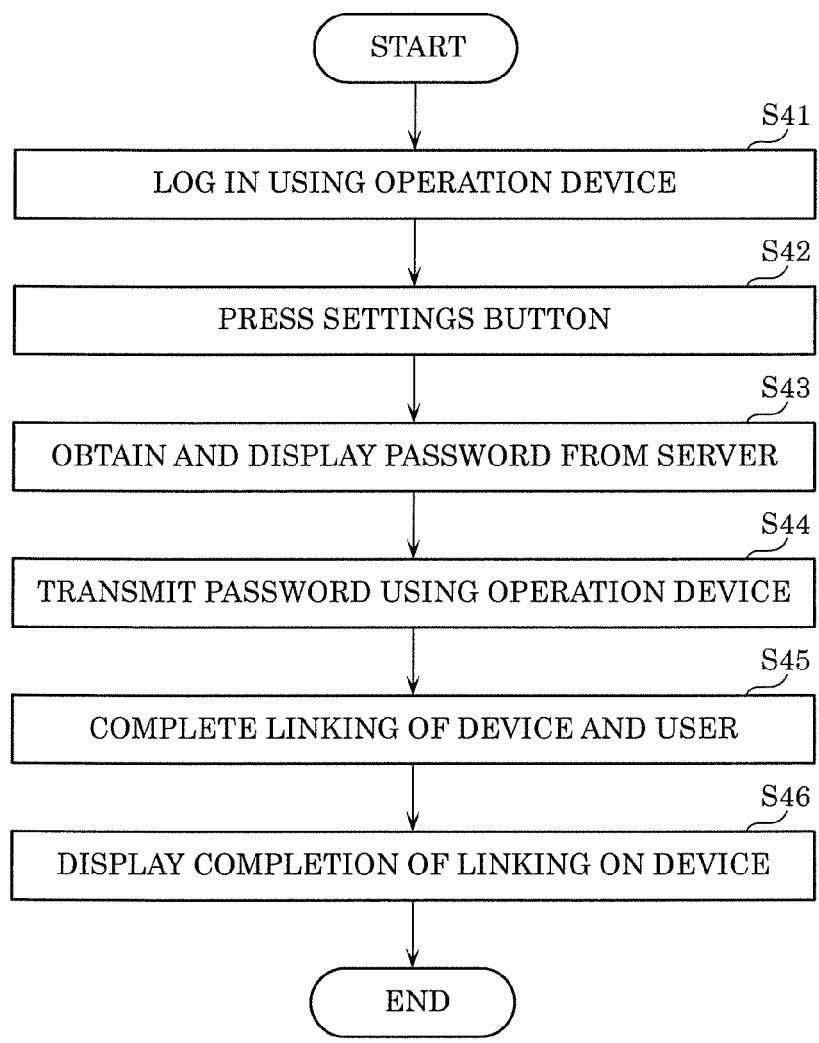
FIG. 32 is a flowchart of a second example of a procedure for linking a device and a user.

FIG. 32 is a flowchart of a second example of a procedure for linking device 10 and a user.

In the first example, first, the user logs in (S41) by inputting a user ID and password into operation device 40, one example of which is a smartphone, waits to be logged in, and then presses a settings button for device 10 (S42).

In response to the settings button being pressed, device 10 requests a password for linking device 10 and the user account from server 20. Here, server 20 preferably issues a one-time password or time-limited password. Device 10 receives the password from server 20 and displays the password on display 112 (S43).

The user inputs the password displayed on display 112 into operation device 40, and operation device 40 transmits the input password to server 20 (S44). In this example, the password is exemplified as a character string of numbers, for example, but the password may be a two-dimensional barcode, a pattern flashed by an LED, or audio data such as a Morse code signal. When the password is a two-dimensional barcode or a pattern flashed by an LED, the password can be captured by using the camera of operation device 40. When the password is audio data such as a Morse code signal, the password can be input by collecting the audio using a microphone of the operation device 40.

Upon receiving the password from operation device 40, server 20 links device 10 that requested the link with the user account that transmitted the password (S45), and transmits a notification indicating the completion of the linking to device 10.

When device 10 receives the notification of the completion of the linking from server 20, device 10 indicates on display 112 included in device 10 that a notification has been received (S46). For example, device 10 may cause an indicator lamp to flash to notify the user of the reception of the notification.

Figure 33:
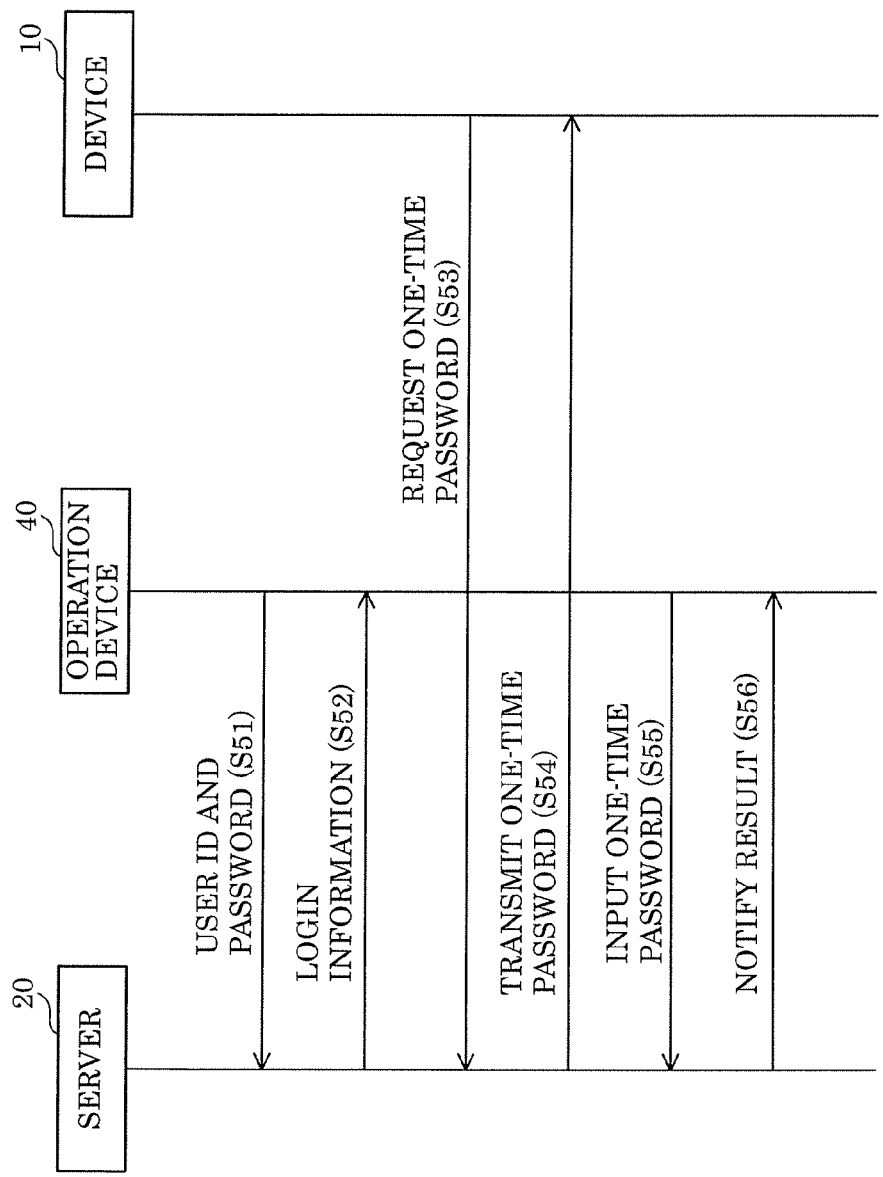
FIG. 33 is a sequence diagram of a second example of a procedure for linking a device and a user.

FIG. 33 is a sequence diagram of the second example of a procedure for linking device 10 and a user.

Operation device 40 receives the input user ID and password, and transmits the user ID and password to server 20 (S51). Server 20 confirms whether the password is correct or not based on user information managed in advance in server 20. When the password is incorrect, since there is a chance that a third party is spoofing, subsequent processing is not continued.

When the password is correct, server 20 transmits login information to operation device 40 (S52). Login information is, for example, an ID for identifying a session and key data to be used in subsequent communication.

Next, upon receiving the input from the user, device 10 requests a one-time password from server 20 (S53). Note that when making this request, device 10 transmits its own device ID to server 20 together with the request. Alternatively, server 20 may obtain the device ID corresponding to device 10 from device information managed in advance in server 20, based on address information of device 10 obtained in the transmission.

In response to the request, server 20 transmits a one-time password to device 10 (S54). The issued one-time password is displayed on display 112 of device 10.

Operation device 40 receives an input of the one-time password displayed on display 112 from the user, and transmits the input one-time password to server 20 (S55). Note that in FIG. 33, the one-time password is transmitted as-is, but in actual usage, a result of processing that uses the login information is preferably transmitted. One conceivable method for this processing is appending the ID for identifying the session to the device code and encrypting this appended data with the key data described above. Moreover, it is preferable to protect the overall communication by encrypted communication such as SSL.

Server 20 confirms whether the one-time password received from operation device 40 matches the issued one-time password, and upon confirming a match, links the user account and the device ID. Server 20 transmits a notification of the completion of the linking to operation device 40 (S56). Note that it is preferable that a standby period for waiting for the input be set in advance in server 20. Typically, around one minute is required for the standby period. When server 20 does not receive an input after transmitting the one-time password, starting to count the timer for the standby period for waiting for the input, and the standby period elapses, a notification of completion indicating that the linking failed may be transmitted to operation device 40.

Operation device 40 displays the received notification of completion.

Next, the state estimation of device 10 will be described. First, a case will be described in which it is estimated that the user is currently using device 10 and has been since initial usage of device 10.

Figure 34:
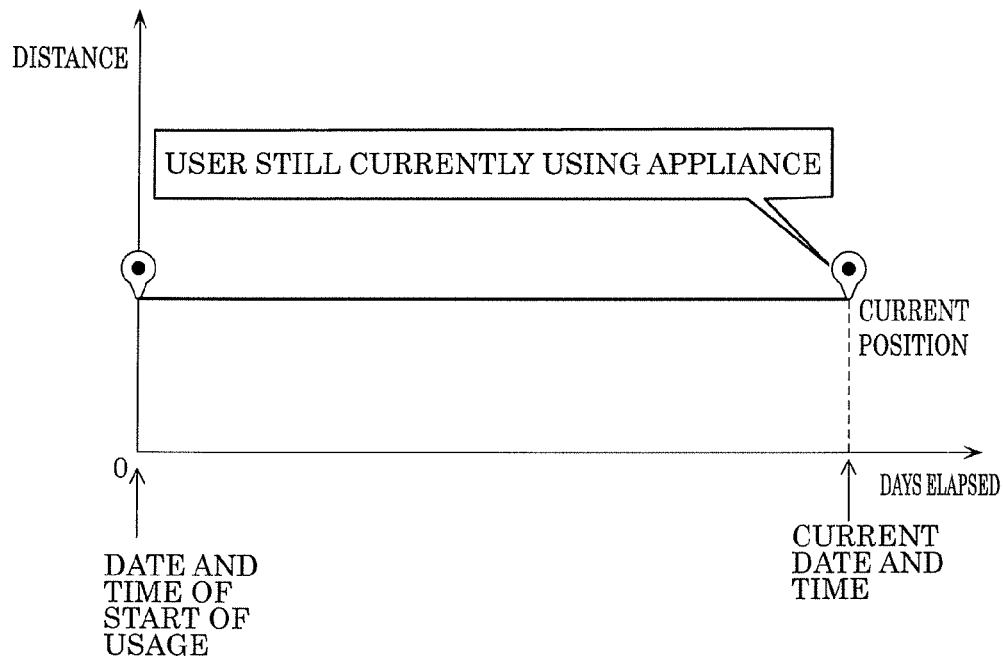
FIG. 34 is a graph illustrating one example of a case in which it is estimated that the user is currently using the device.
Figure 35:
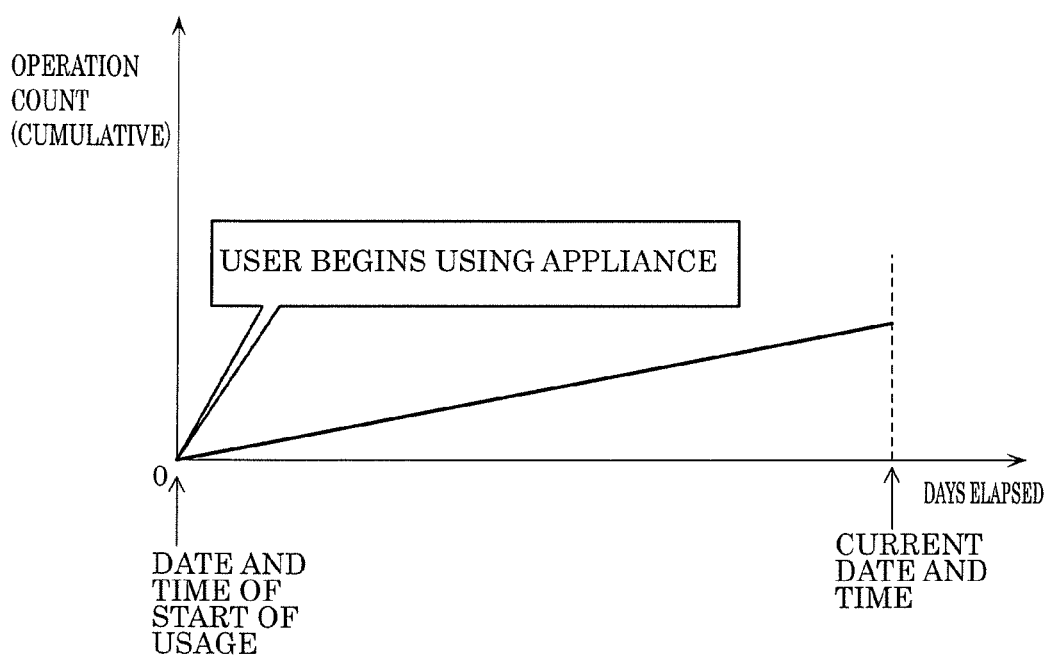
FIG. 35 is a graph illustrating one example of a case in which it is estimated that the user is currently using the device.

FIG. 34 and FIG. 35 each illustrate one of example of a graph of a case in which it is estimated that the user is currently using device 10.

This example is of a case in which it is estimated that device 10 has been shipped from the manufacturing plant, and the user has begun using device 10 and is still currently using device 10. When the number of days that has elapsed from the date of initial use of device 10 by the user exceeds the service life or service use frequency of the product, server 20 may notify the user via, for example, an LED or display on the appliance, or transmit a control signal to device 10 that forcefully disables device 10 from operating under control from server 20. Note that the notification may be transmitted to operation device 40 possessed by the user. By transmitting, to device 10 or the user's operation device 40, information prompting the changing of consumables such as a filter or information prompting inspection of device 10, such as prompting the user to clean a washing machine drum, based on the operation count like illustrated in FIG. 35, server 20 can facilitate continued usage of the product in its top condition.

Next, the period, in the lifetime management of an appliance, in which the appliance is being used by a user will be described.

Figure 36:
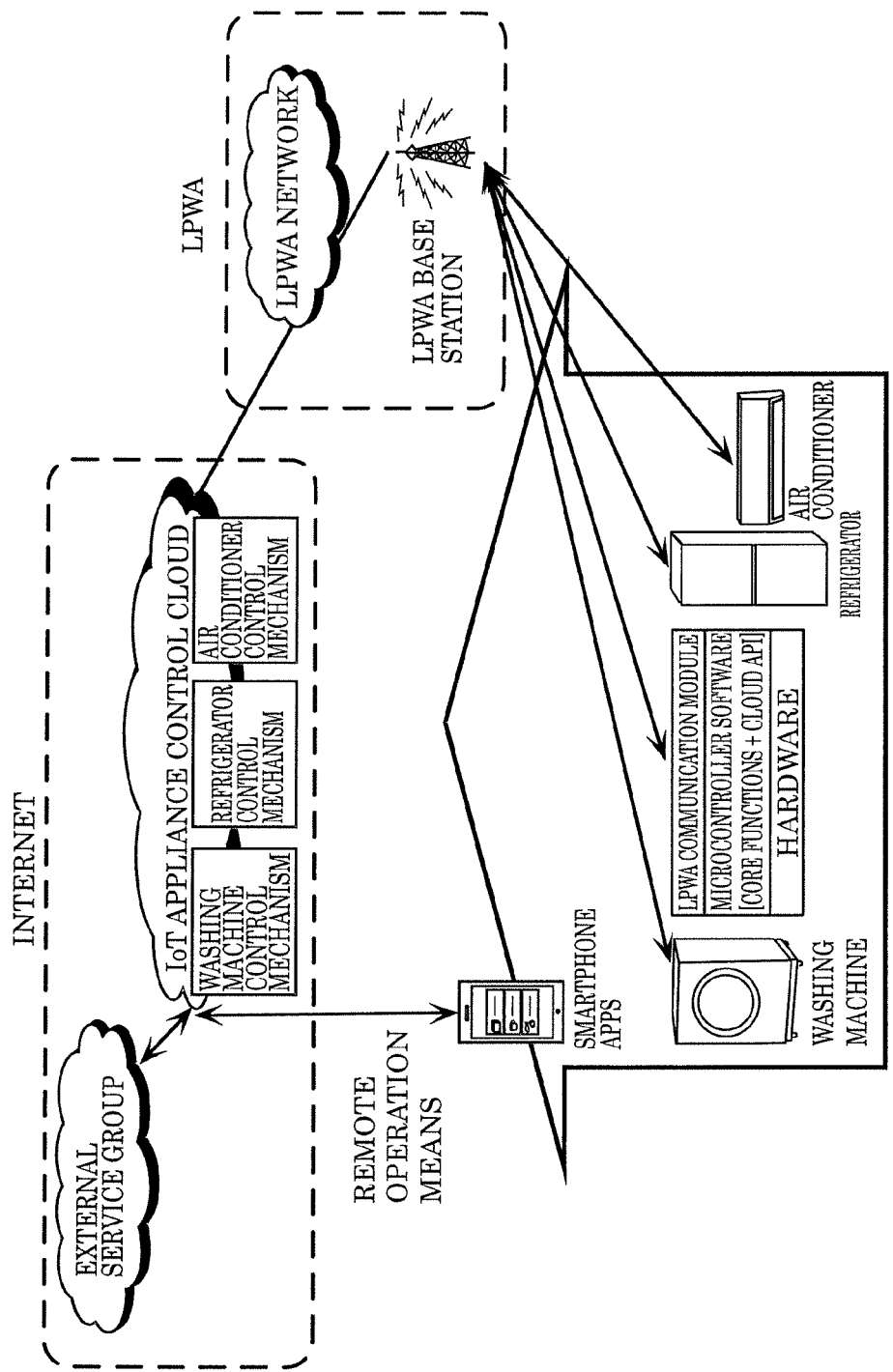
FIG. 36 illustrates one example of an IoT appliance that is always-connected through LPWA.

FIG. 36 illustrates one example of an IoT appliance that is always-connected through LPWA.

In this example, appliances can be remotely operated from a smartphone through an IoT appliance control cloud or LPWA network, even when the appliances are in an environment lacking a Wi-Fi GW. Furthermore, the provision of services from an external service group that lacks LPWA functionality can be accomplished through the IoT appliance control cloud.

Moreover, apart from control implemented from the IoT appliance control cloud, logs notifying of the state of an appliance may be transmitted to the IoT appliance control cloud through the LPWA network appliance-side as well. Server 20 can also provide customer service after purchase. For example, when server 20 detects an appliance malfunction based on the transmitted log, server 20 can notify the user.

Figure 37:
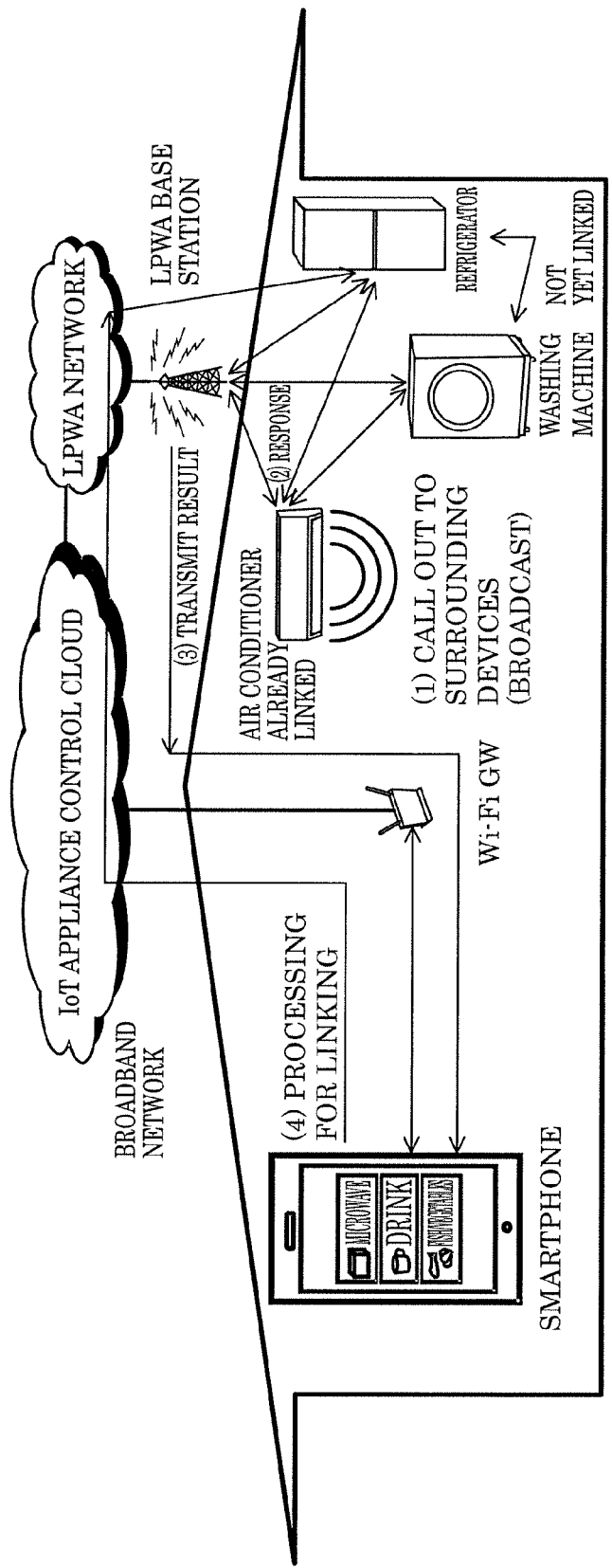
FIG. 37 is a diagram illustrating a function for supporting the linking of an appliance and a user using LPWA.

FIG. 37 is a diagram illustrating a function for providing support for linking an appliance and a user using LPWA.

The method for linking an appliance and a user is as described above. This example illustrates a link support function using LPWA for a case in which there are a plurality of appliances in a home, some of which have been linked and some of which have not. In the example illustrated in FIG. 37, the air conditioner is linked, whereas the washing machine and the refrigerator are not linked.

At the point in time of completion of linking the air conditioner, the operation device, such as a smartphone, used to perform the linking is prompted to inquire, for example "are there any other devices that are not yet linked?". When, as a result of the inquiry, the operation device receives an input of "yes", the air conditioner calls out to surrounding devices using LPWA, as illustrated in (1) in FIG. 37.

The method used to call out involves, for example, the air conditioner operating as a software access point operating as a base station, and calling out via broadcast. The content of the call is, for example, "is there any device which is not linked?". As illustrated in (2) in FIG. 37, devices that are not linked to the user respond to the call, and the air conditioner that receives the responses determines which of the devices are believed to be in the same home. One conceivable method for determining this is by using, for example, a received signal strength indicator (RSSI) of the response or a communication delay time of the response.

When there is a device that is determined to be in the same home, the air conditioner sends an inquiry to the operation device inquiring, for example, "do you own this device?", as illustrated in (3) in FIG. 37. When the user owns the presented device, the user can begin processing for linking the device by selecting the device, as illustrated in (4) in FIG. 37. Since, in this linking processing, the device code of the device desired to be linked is already known, this processing is introduced after the transmission of the device code among the processes illustrated in FIG. 29 and FIG. 30. Additionally, since the two conditions of (i) the user and the air conditioner are linked and (ii) the device is in the same home as the air conditioner have been satisfied, the linking registration may be performed summarily. For example, when a device presented on the operation device is selected, appliance-side, the linking with the operation terminal may enter stand-by, and the linking may be completed when a button is pressed on the device. This button may be, for example, the simultaneous pressing of a plurality of buttons. Another useful method is having the operation device specify the button(s) to be pressed for completing the linking.

In the example in FIG. 37, the user is prompted to perform linking for another device at the point in time the linking of the air conditioner is complete, but another conceivable option is to prompt linking via a push notification on the operation device inquiring "do you own this device?" at some other timing. For example, at a point in time that a device which is not linked is switched on, the device may inquire, via LPWA, whether a device that is linked to the user is in the vicinity. When a linked device is determined to be in the same home, the operation device may be prompted to perform the linking, via the appliance that is already linked.

Figure 38:
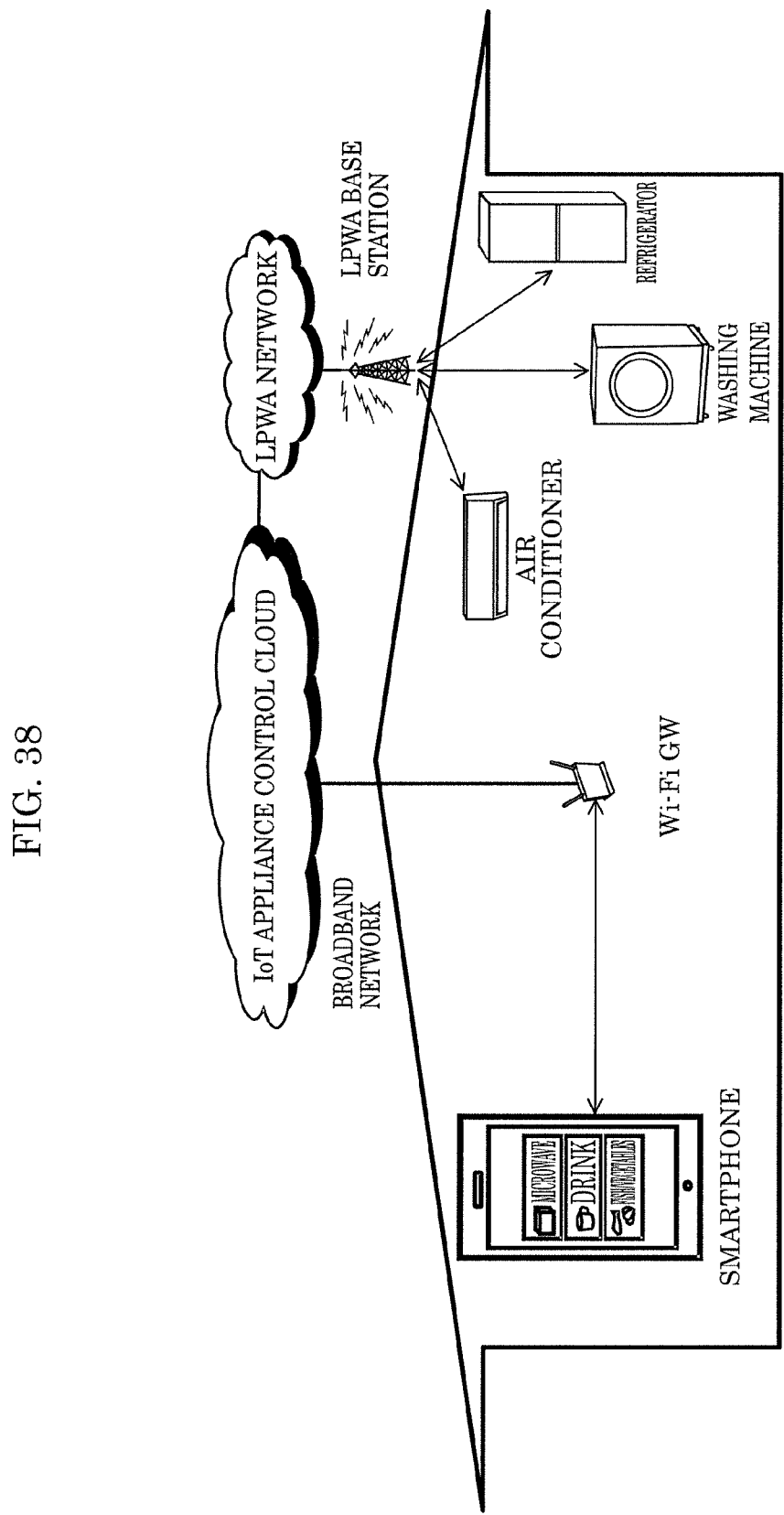
FIG. 38 is a diagram illustrating a function for providing support for connecting to Wi-Fi that makes use of the always-connected feature of LPWA.

FIG. 38 is a diagram illustrating a function for providing support for connecting to Wi-Fi that makes use of the always-connected feature of LPWA.

Three methods that use the always-connected feature of LPWA for providing support for connecting an IoT appliance to a Wi-Fi GW will be presented.

The first method is sharing connection settings inside the home. The second method is setting the Wi-Fi connection remotely. The third method is linking the user account using BSSID information of the Wi-Fi GW.

Each of these methods presupposes that the IoT appliance has both LPWA and Wi-Fi modules and that the IoT appliance is connected to the IoT appliance control cloud using LPWA, and presupposes that the user has a user account that allows them to log into the IoT appliance control cloud using an operation device such as a smartphone.

In FIG. 38, the refrigerator, washing machine, and air conditioner, which are examples of the devices, are each connected to the IoT appliance control cloud using LPWA, and the smartphone, which is an example of the operation device, is logged into the IoT appliance control cloud, which is an example of server 20, through the Wi-Fi GW.

Next, each of the first through third methods will be described sequentially.

Figure 39:
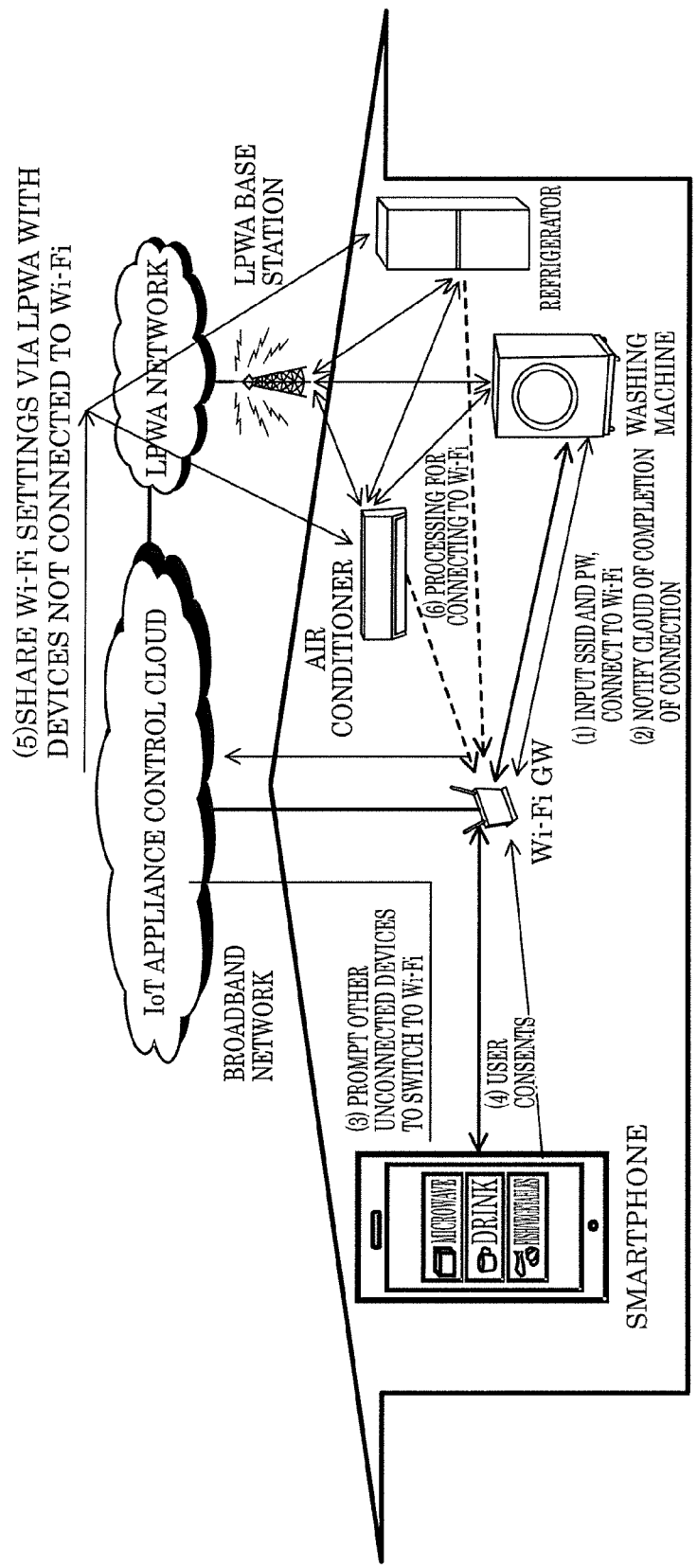
FIG. 39 is a diagram illustrating a first method of the function for providing support for connecting to Wi-Fi that makes use of the always-connected feature of LPWA.

FIG. 39 is a diagram illustrating the first method of the function for providing support for connecting to Wi-Fi that makes use of the always-connected feature of LPWA.

The first method is a method that shares connection settings information by establishing lateral links, by first configuring the Wi-Fi connection settings for a first IoT appliance and then notifying, using LPWA, other IoT appliances in the home that are not connected to Wi-Fi, of the connection settings information. In the example in FIG. 39, the Wi-Fi connection settings are configured for the washing machine as the first IoT appliance.

(1) When configuring the connection settings for the first IoT appliance, in the washing machine, connection to the Wi-Fi GW is completed by selecting an SSID and inputting a password, and the inputted SSID and password information are stored. This connects the washing machine to the Wi-Fi GW.

(2) Next, the washing machine connected to the Wi-Fi GW transmits a notification to the IoT appliance control cloud indicating that the Wi-Fi connection is complete.

(3) Having received the notification, the IoT appliance control cloud notifies the user whose user account is linked to the washing machine that the Wi-Fi connection of the washing machine is complete, and prompts the user to connect another device to Wi-Fi by displaying, on the smartphone, the message "would you like to connect other IoT appliances of yours that are not yet connected to Wi-Fi?".

(4) When the user replies "yes", the washing machine transmits the recorded Wi-Fi connection information to the IoT appliance control cloud.

(5) The IoT appliance control cloud transmits, via LPWA, the received Wi-Fi connection information to IoT appliances not connect to Wi-Fi.

(6) Each IoT appliance not connected to Wi-Fi that receives the Wi-Fi connection information performs processing for connecting to the Wi-Fi GW using the received Wi-Fi connection information.

Figure 40:
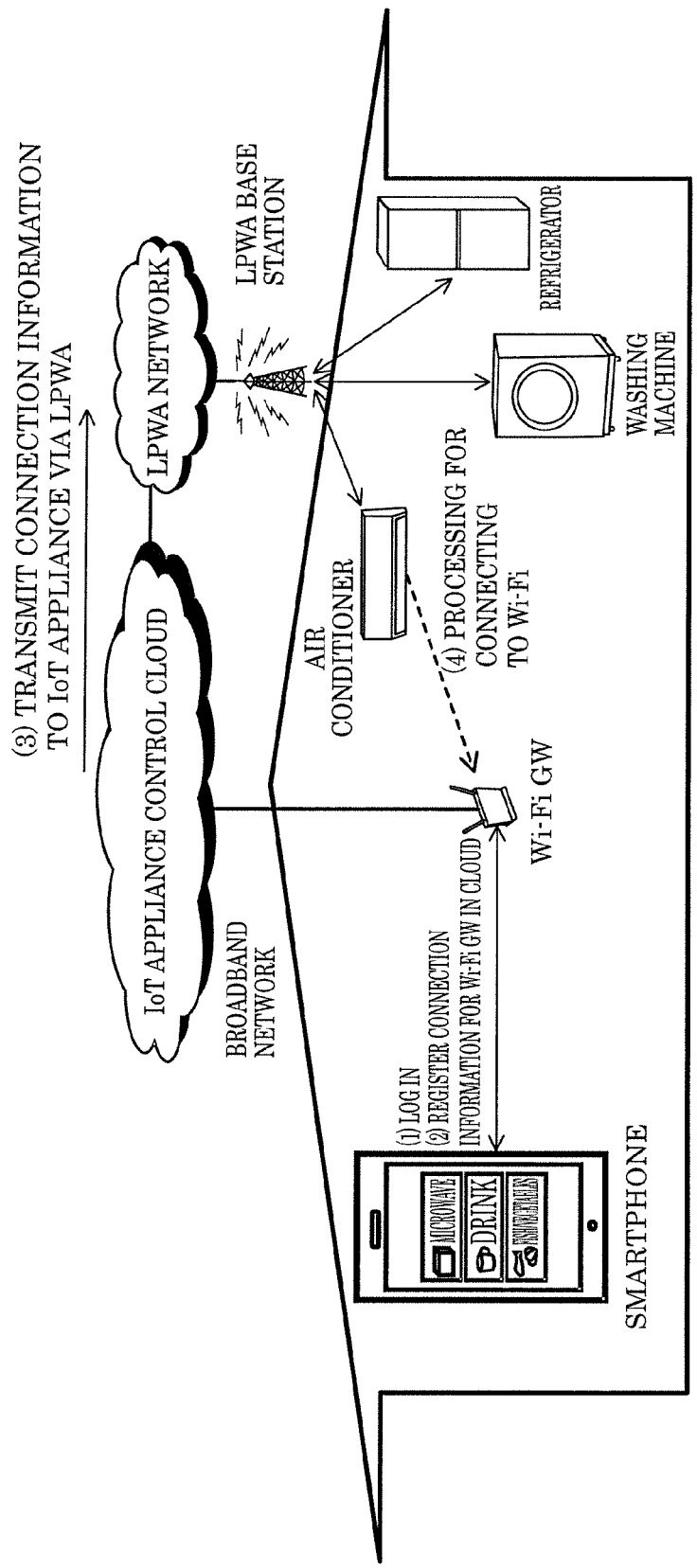
FIG. 40 is a diagram illustrating a second method of the function for providing support for connecting to Wi-Fi that makes use of the always-connected feature of LPWA.

FIG. 40 is a diagram illustrating the second method of the function for providing support for connecting to Wi-Fi that makes use of the always-connected feature of LPWA.

The second method executes connection processing by transmitting a Wi-Fi settings command using LPWA to IoT appliances possessed by the user linked to the user account.

(1) The user launches an application on a smartphone, and logs into the IoT appliance control cloud on the launched application.

(2) Next, the user inputs SSID and password information for the Wi-Fi GW on the application on the smartphone, in order to register the Wi-Fi GW connection information into the IoT appliance control cloud.

(3) The IoT appliance control cloud transmits, via LPWA, the connection information registered in (2) to an IoT appliance linked to the user account.

(4) The IoT appliance that receives the connection information performs processing for connecting to the Wi-Fi GW using the received connection information.

Figure 41:
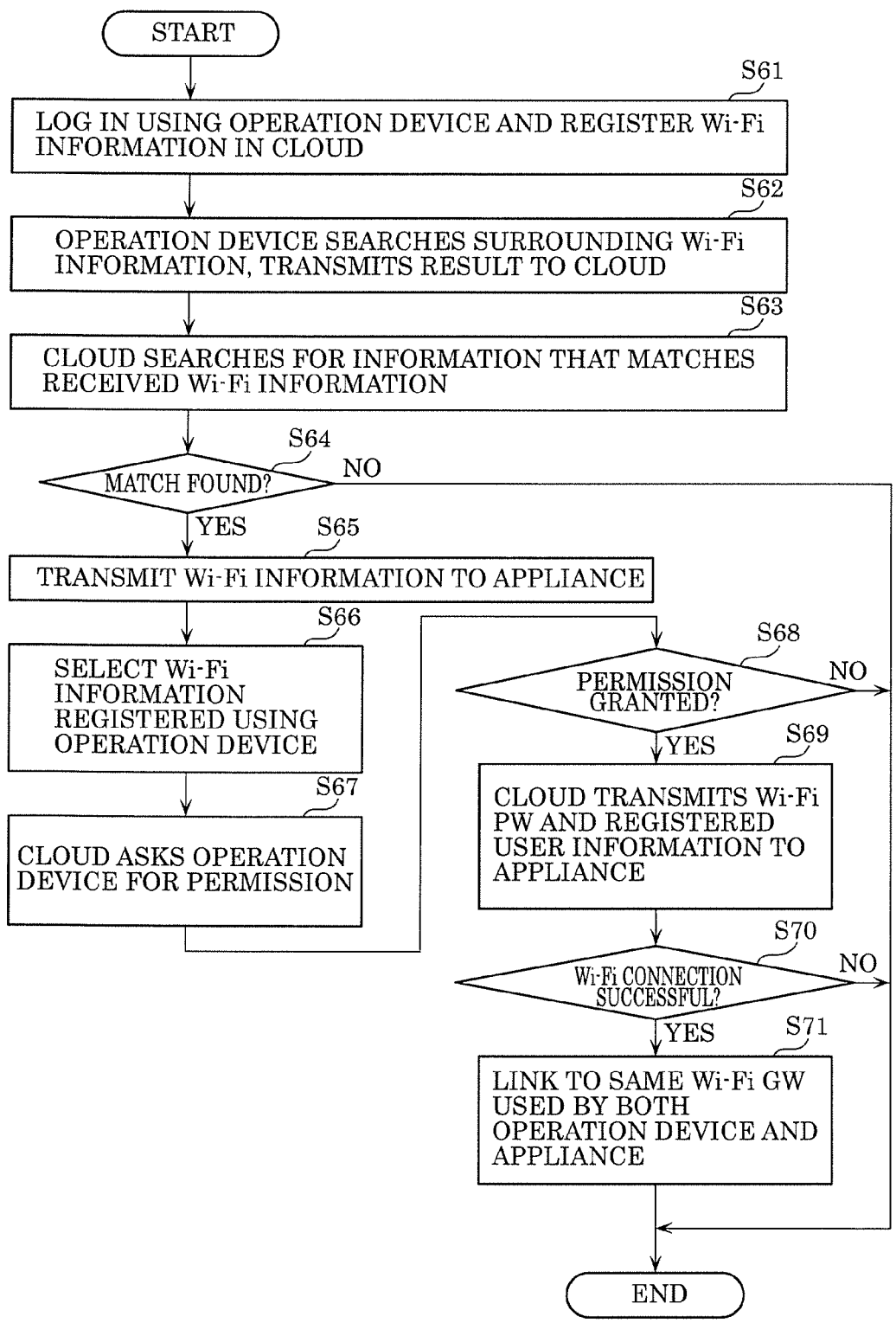
FIG. 41 is a diagram illustrating a third method of the function for providing support for connecting to Wi-Fi that makes use of the always-connected feature of LPWA.

FIG. 41 is a diagram illustrating the third method of the function for providing support for connecting to Wi-Fi that makes use of the always-connected feature of LPWA.

The third method differs from the first and second methods in which an IoT appliance is already linked to the user account in that both (i) the linking of the IoT appliance and the user account and (ii) the Wi-Fi connection processing are performed simultaneously.

The user launches an application on a smartphone, logs into the IoT appliance control cloud on the launched application, and registers information required for Wi-Fi connection (S61). Here, the information inputted by the user is the SSID and password for the Wi-Fi GW to which the smartphone is connected. Moreover, when registering the information in the IoT appliance control cloud, the smartphone obtains the BSSID from SSID information in the application, and registers both the SSID and BSSID. As a result, on the IoT appliance control cloud, the user account and the Wi-Fi connection information including the SSID, BSSID, and password are registered.

After powering on, the IoT appliance performs a Wi-Fi search, obtains Wi-Fi information for the vicinity, and creates a BSSID list. The IoT appliance transmits the created BSSID list to the IoT appliance control cloud using LPWA (S62).

The IoT appliance control cloud searches for a match using the received BSSID and the registered BSSID (S63), and when there is a match (yes in S64), transmits an SSID list to the IoT appliance (S65).

The IoT appliance selects, from among the received SSID list, the SSID of the Wi-Fi that the smartphone is connected to (S66).

The IoT appliance control cloud asks for permission to connect to the smartphone that registered the SSID (S67).

The smartphone receives a selection from the user of a grant or denial of permission on the application (S68).

When permission is granted (yes in S68), the IoT appliance control cloud transmits, to the IoT appliance, user information including the user account that registered the Wi-Fi GW password and SSID (S69).

When the Wi-Fi connection processing is performed and the connection is successful (yes in S70), the IoT appliance is connected to the same Wi-Fi GW as the smartphone that registered the SSID. Accordingly, the IoT appliance links the user account and the IoT appliance by performing linking processing between the smartphone application and the IoT appliance using the user account received from the IoT appliance control cloud (S71).

Next, among state estimations of device 10, a method for determining an event at the time device 10 is displaced or the user of device 10 is changed will be described.

Figure 42:
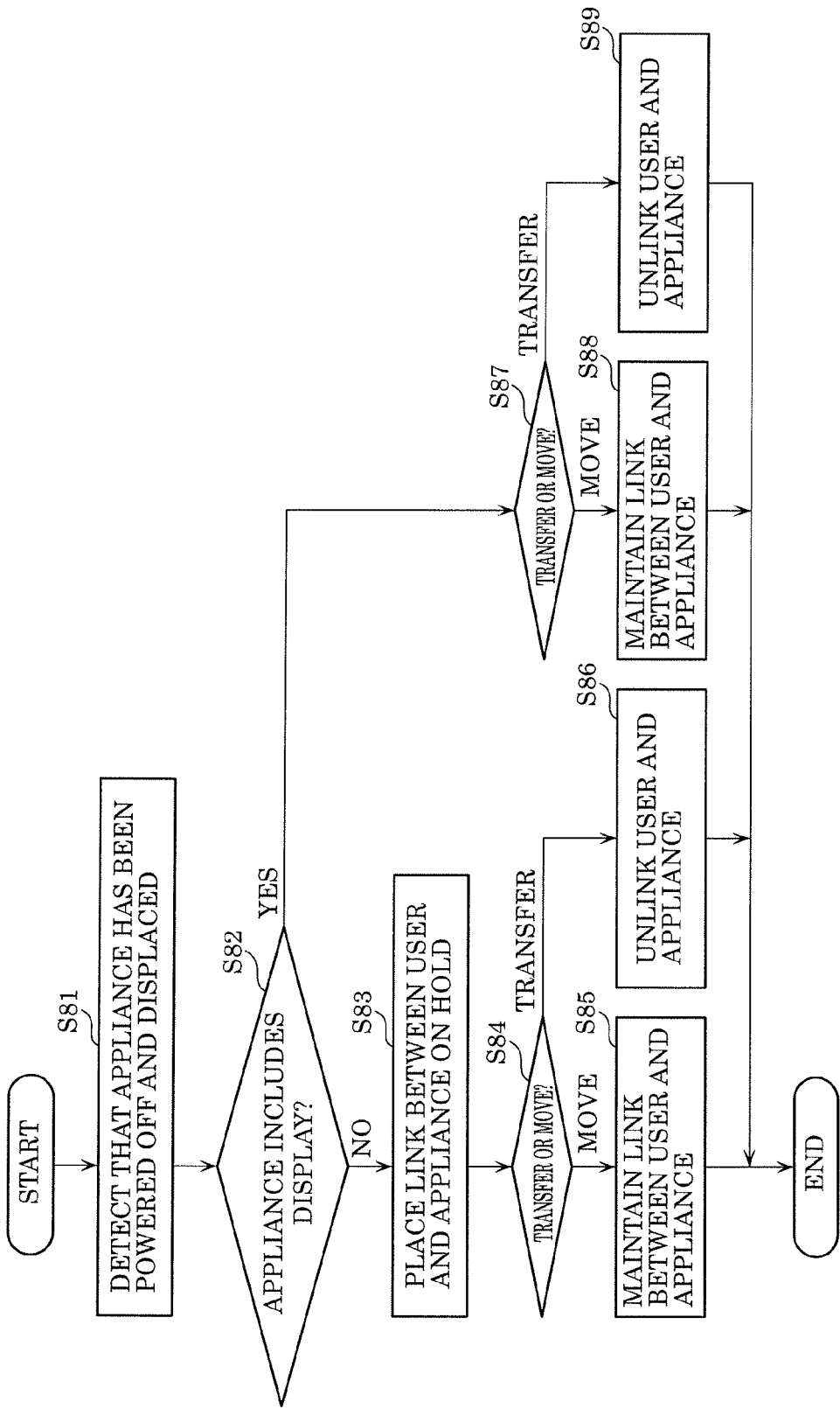
FIG. 42 is a flowchart illustrating one example of processes for distinguishing between whether the user has moved to a new residence or has transferred the device to a different user.

FIG. 42 is a flowchart illustrating one example of processes for distinguishing between whether the user has moved to a new residence or has transferred the device to a different user.

After being purchased, device 10 may conceivably be transferred to a different user. A problem arises in particular when, after a user has been linked to device 10, that user transfers device 10 to a different user. If no countermeasure is put in place, even after transferring device 10 to a different user, the previous user can view the log of device 10 and operate device 10. If the user and device 10 are unlinked by, for example, resetting device 10, this problem can be avoided. However, since operations for unlinking the user and device 10 are not necessary with conventional appliances, it is doubtful whether the new user can correctly reset device 10 or not.

In view of this, server 20 preferably determines whether an IoT appliance has been transferred to a different user or not using the operation information and the position information received from the IoT appliance. Upon transferring an appliance to a different user, typically the appliance is powered off, displaced to a different location, and usage of the appliance is once again started. Server 20 is capable of detecting whether the IoT appliance is powered on or off using the operation information, and is capable of recognizing that the IoT appliance has been displaced using the position information described previously. By combining these two, server 20 can determine the possibility that device 10 has been transferred to a different user.

For example, server 20 uses the operation information and the position information to detect that device 10 has been powered off and has been displaced (S81). For example, server 20 can determine that device 10 has been powered off by determining whether the power state indicated in the operation information is "off" or not. Moreover, when the position information changes from the previous position information, server 20 can detect that device 10 has been displaced.

However, with this alone, it is impossible to determine whether the user remains the same but the user has simply moved to a new residence, or the device as transferred to a new user. In view of this, if the device includes a display, the user may be presented with an inquiry as to whether it is necessary to change the linking settings via the display.

In other words, server 20 determines whether device 10 includes a display or not (S82). Server 20 may determine whether device 10 includes a display or not by referring to information about device 10, or when information on whether device 10 includes a display or not is included in the operation information, server 20 may determine whether device 10 includes a display or not based on the operation information.

When device 10 does not include a display (no in S82), as a precaution, for the time being, server 20 puts the link between the user and the device on hold (S83). On top of this, server 20 asks the user whether they transferred the device to a different user or moved to a new residence, by transmitting a message to the operation device, such as a smartphone, that performed the linking, confirming whether the user transferred the device to a different user or moved to a new residence (S84). If it can be confirmed through this inquiry that the user has moved to a new residence, the hold placed on the link is removed, and the link between the user and device 10 is maintained (S85). If it can be confirmed that the user transferred the device to a different user, the former user and the device are unlinked (S86).

When device 10 does include a display (yes in S82), the above-described inquiry is presented using the display (S87). If it can be confirmed through this inquiry that the user has moved to a new residence, the hold placed on the link is removed, and the link between the user and device 10 is maintained (S88). If it can be confirmed that the user transferred the device to a different user, the former user and the device are unlinked (S89).

In this way, the user to which the device was transferred can appropriately perform a reset operation as a result of the unlinking. Conversely, when the user of the device has not changed and the user has simply moved to a new residence, server 20 can determine that it is unnecessary to change the link settings, and the user can continue using device 10 as they always have.

As described above, when the third unique information received at the third time after the second time differs from the second unique information, controller 202 may determine that device 10 that transmitted the third unique information has been displaced, may transmit, using communication unit 201, an inquiry as to whether the user of device 10 has changed to a different user, to device 10 or to a terminal, such as a smartphone, possessed by the user. Note that the third time corresponds to the time of the detection in step S81.

When, after the transmission of the inquiry, the response to the inquiry received from device 10 or the terminal indicates that the user of device 10 has changed to a different user, controller 202 manages the plurality of items of third operation information received in the third period starting at the third time separately from the plurality of items of first operation information and the plurality of items of second operation information. Specifically, controller 202 manages the plurality of items of third operation information separately from the plurality of items of first operation information and the plurality of items of second operation information by storing the plurality of items of third operation information in association with a third identifier that is different from the first and second identifiers in storage 203. This makes it possible to efficiently determine whether device 10 has been transferred to a different user or not. Moreover, when device 10 has been transferred to a different user, management is performed separately from the operation information corresponding to the former user, so it is possible to determine the state of device 10 that is appropriate for the new user.

On the other hand, when, after the transmission of the inquiry, the response to the inquiry received from device 10 or the terminal indicates that the user of device 10 has not changed to a different user, controller 202 manages the plurality of items of third operation information received in the third period starting at the third time together with the plurality of items of second operation information. Specifically, controller 202 stores the plurality of items of third operation information in association with the second identifier in storage 203. Accordingly, for example, when device 10 has not been transferred to a new user but has simply been displaced, device 10 can be managed without changing the user.

Figure 43:
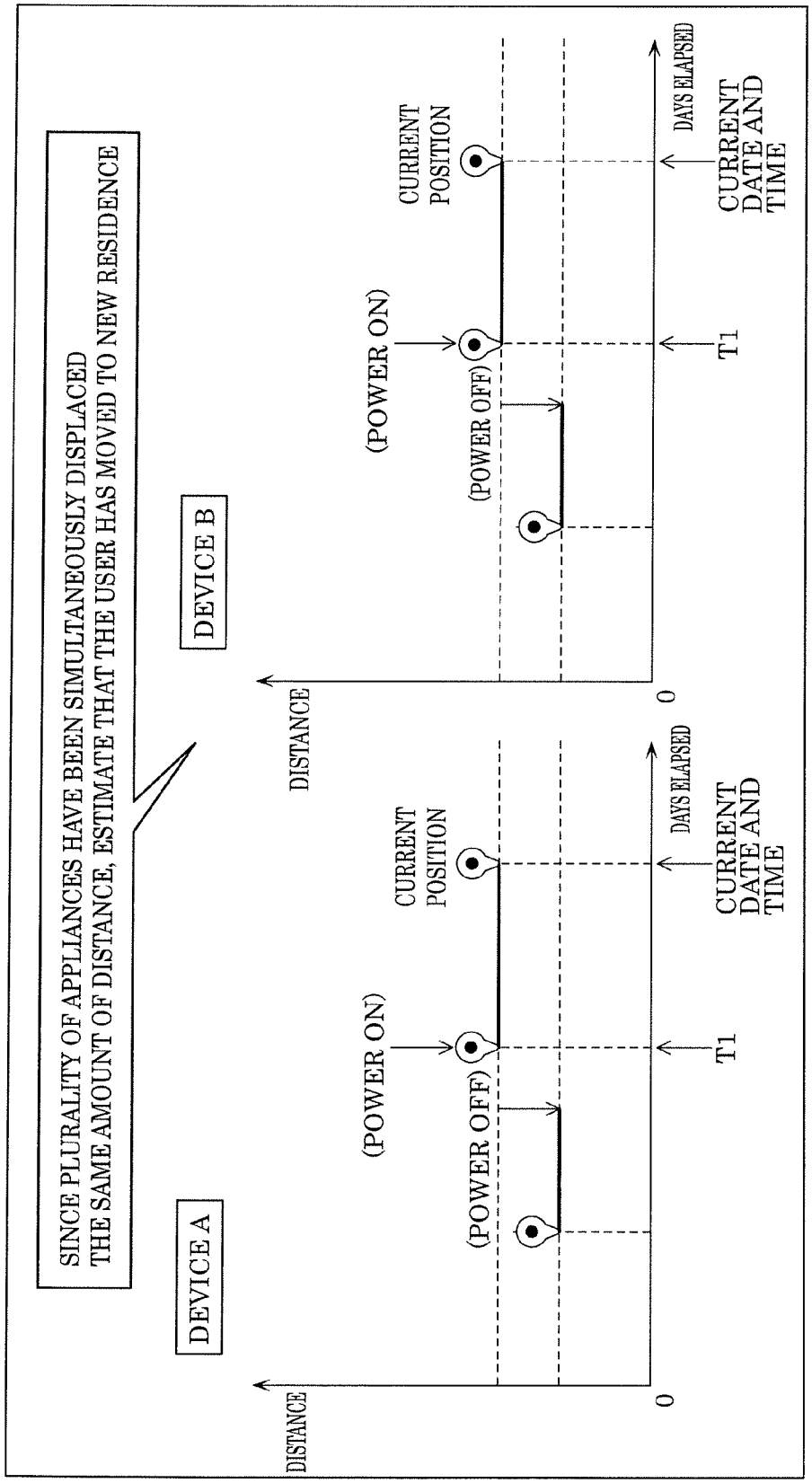
FIG. 43 is a diagram illustrating another example of processes for distinguishing between whether the user has moved to a new residence or has transferred the device to a different user.
Figure 44:
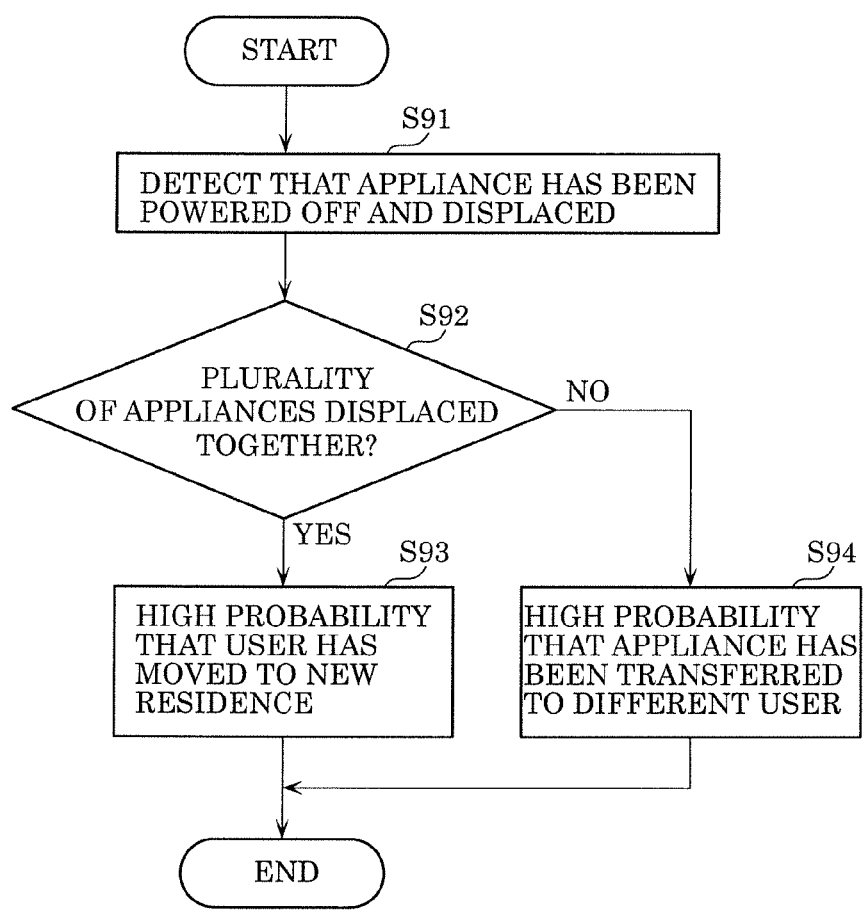
FIG. 44 is a flowchart illustrating another example of processes for distinguishing between whether the user has moved to a new residence or has transferred the device to a different user.

FIG. 43 is a diagram illustrating another example of processes for distinguishing between whether the user has moved to a new residence or has transferred the device to a different user. FIG. 44 is a flowchart illustrating another example of processes for distinguishing between whether the user has moved to a new residence or has transferred the device to a different user.

The method for distinguishing between whether the user has moved to a new residence or has transferred the device to a different user may include, in addition to powering off the device and detecting the displacement of the device described above, determining more accurately the possibility of whether the user has moved to a new residence or has transferred the device to a different user using a combination of other information. FIG. 43 illustrates an example of position information for when a plurality of devices (device A and device B) are displaced simultaneously at time T1. When a plurality of devices are simultaneously displaced like in this example, it is conceivable that the user has moved to a new residence. Accordingly, it is possible to improve the determination accuracy by linking position information for a plurality of devices possessed by the user. For example, when the positions of a refrigerator, a washing machine, and an air conditioner possessed by a user are displaced at the same time, there is a high probability that the user has moved to a new residence. On the other hand, when only the washing machine is displaced, there is a high probability that the user has not moved to a new residence.

Here, based on the operation information and the position information, server 20 detects the powering off and displacement of a device (S91).

Next, server 20 determines whether a plurality of devices have been displaced together (S92). In other words, server 20 determines whether a plurality of devices have been displaced from a first location to a second location.

When server 20 determines that a plurality of devices have been displaced together (yes in S92), server 20 determines that there is a high probability that the user moved to a new residence (S93).

When server 20 determines that a plurality of devices have not been displaced together (no in S92), that is, when only a single device has been displaced, server 20 determines that there is a high probability that the device has been transferred to a new user (S94).

In this way, when (i) a plurality of items of second unique information received from a plurality of devices 10 at a second time before time T1 are the same, (ii) a plurality of items of third unique information received from the plurality of devices at a third time after the time T1 after the second time are the same, and (iii) the second unique information and the third unique information are different, controller 202 may manage a plurality of items of third operation information received in a third period starting at the third time together with the plurality of items of second operation information. Thus, when a plurality of devices are displaced, it is regarded that the user of the devices has not changed, and the devices can be managed accordingly.

Figure 45:
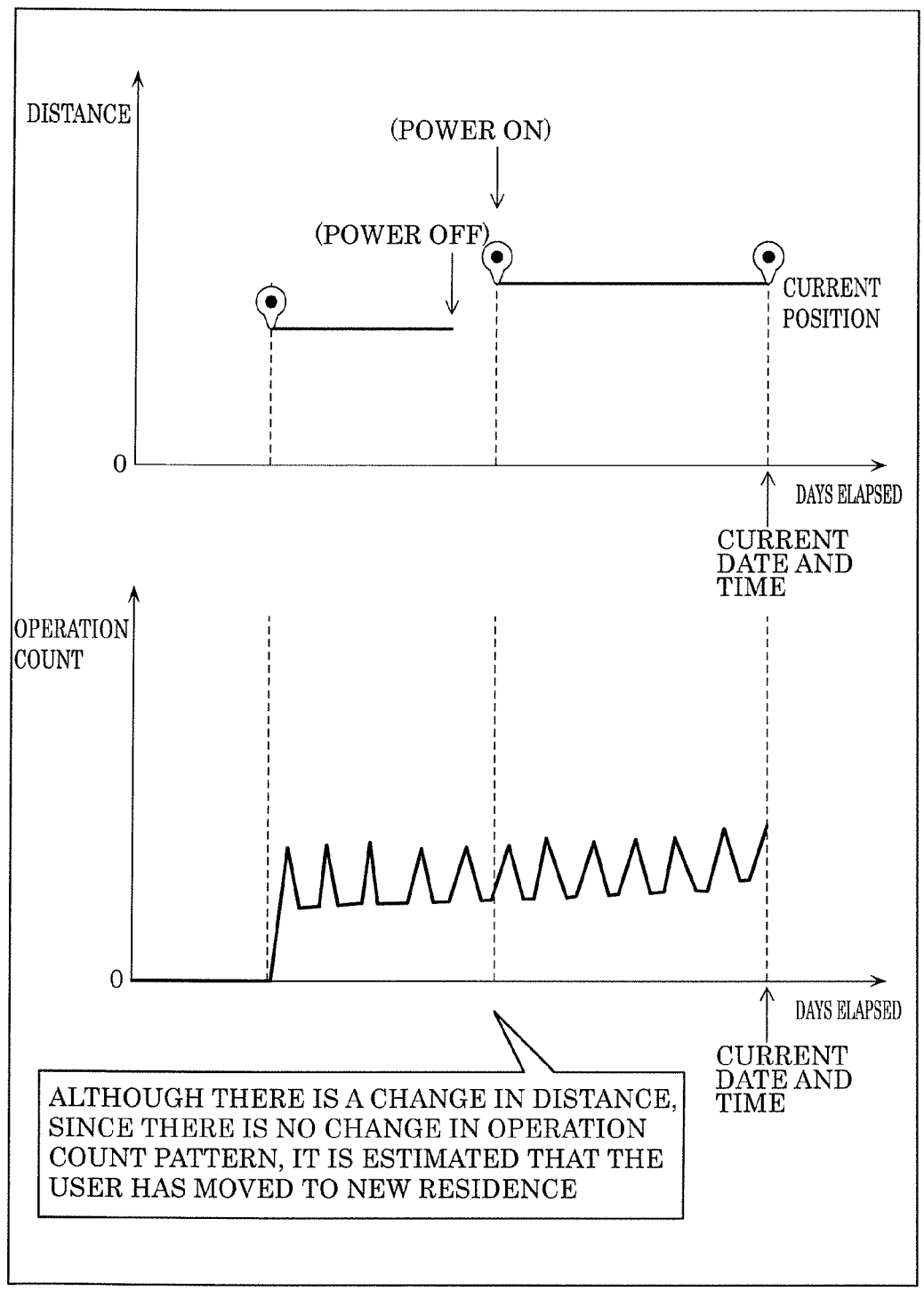
FIG. 45 is a diagram illustrating another example of processes for distinguishing between whether the user has moved to a new residence or has transferred the device to a different user.
Figure 46:
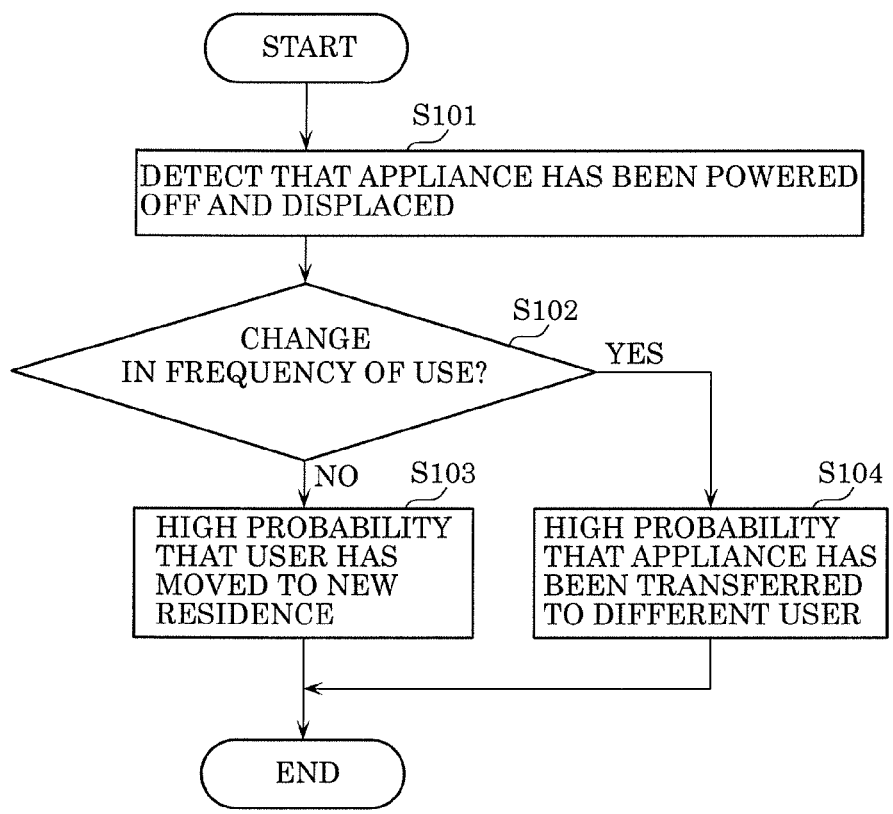
FIG. 46 is a flowchart illustrating another example of processes for distinguishing between whether the user has moved to a new residence or has transferred the device to a different user.

FIG. 45 is a diagram illustrating another example of processes for distinguishing between whether the user has moved to a new residence or has transferred the device to a different user. FIG. 46 is a flowchart illustrating another example of processes for distinguishing between whether the user has moved to a new residence or has transferred the device to a different user.

Server 20 may, in addition to powering off the device and detecting the displacement of the device as described above, use day-by-day operation count information to determine whether the user has moved to a new residence or has transferred the device to a different user. This makes it possible to improve the accuracy of the determination.

In FIG. 45, the position information changes, but there is little variation in the operation count pattern. In this way, even if there is a change in the position information, when (i) the period before the change in the position information and (ii) the pattern of the variation of a per unit time operation count in a period after the change in the position information satisfy a predetermined degree of correlation (i.e., when they are similar), server 20 may determine there to be a high possibility that the user has moved to a new residence.

As illustrated in FIG. 46, the processes performed by server 20 in such cases differ from those illustrated in FIG. 44 in that step S92 is replaced with step S102. The processing in steps S101, S103, and S104 are the same as the processing in steps S91, S93, and S94, respectively.

In step S102, server 20 determines whether the frequency of use has changed or not. Whether the frequency of use has changed or not is determined by determining whether the pattern of the variation of the operation count satisfies a predetermined degree correlation or not, as described above.

As illustrated in FIG. 45, a change in day-by-day operation count indicates a high possibility that the user of the appliance has changed, meaning there is a high possibility that the device has been transferred to a different user. Conversely, no change in day-by-day operation count indicates no change from the past in frequency of use, and thus, it is conceivable that the same user is using the device in a different location, i.e., the user has moved to a new residence. However, this determination method cannot be applied as-is to appliances that are carried and used outside of the home, such as an electric shaver or hair dryer.

FIG. 47 is a diagram illustrating an exception to cases in which the user is estimated to have moved to a new residence. FIG. 48 is a table that categorizes devices by type.

As described above, it is possible to determine whether the user moved to a new residence or transferred the device to a different user based on changes in the position information of device 10, but for small devices that are carried out of the home, there are instances in which, even if the position information changes, the user is merely using the device outside of the home. In other words, even when a change in position information is detected by server 20, there are instances in which the user has neither moved to a new residence nor transferred the device to a different user. For example, as illustrated in FIG. 47, with small appliances that may conceivably be taken out of the home, such as electric shavers or hair dryers, the location changes when the user takes the appliance out of the home. In such cases, it is assumed the user will return home at some point. Accordingly, server 20 can determine that the user has neither moved to a new residence nor transferred the device to a different user, but that the device is continuing to be used by the user, by detecting the return of the device to the original location. In other words, in these cases, server 20 maintains the link between the user and the device.

In this way, determination accuracy can be improved by changing the degree of influence that whether the appliance is a large appliance that is typically not unplugged in everyday life, such as a refrigerator or washing machine, or a small appliance that may conceivably be taken out of the home, such as an electric shaver or hair dryer, has on determining that the user has moved to a new residence. Note that, as illustrated in FIG. 48, appliances may be categorized depending on, for example, the size of the device or the season in which the device is used, and server 20 may change the determination of the state of the device depending on characteristics associated with these categories.

Next, among state estimations of device 10, cases in which device 10 has been estimated to have been transferred to a different user, resold, or stolen will be described.

Figure 49:
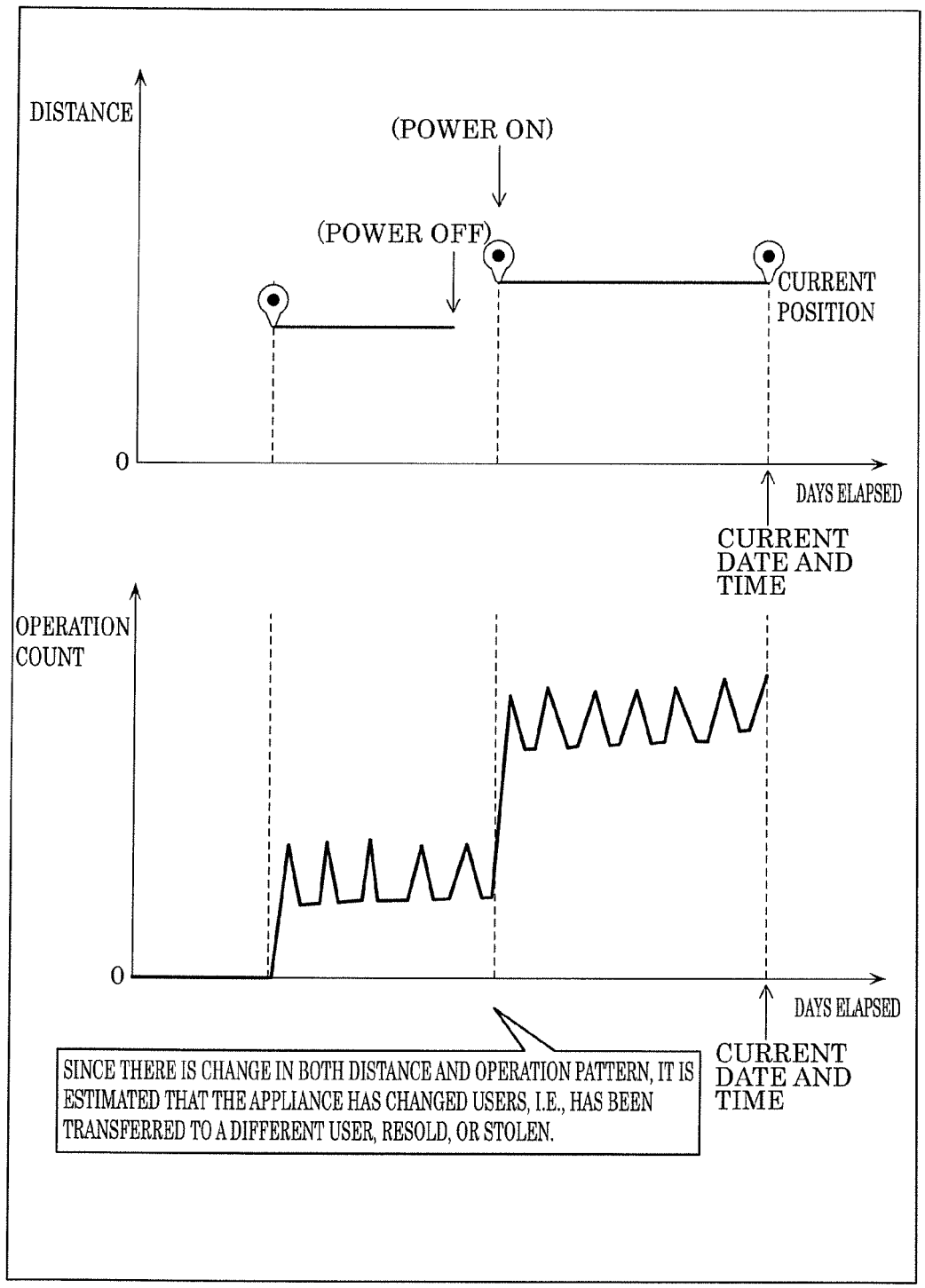
FIG. 49 illustrates a graph of a case in which it is estimated that a device has been transferred to a different user, resold, or stolen.

FIG. 49 illustrates a graph of a case in which it is estimated that device 10 has been transferred to a different user, resold, or stolen.

As illustrated in FIG. 49, when the location of device 10 changes and the operation count pattern greatly varies, it is estimated that the user of device 10 has changed. Accordingly, server 20 estimates that device 10 has been transferred to a different user, resold, or stolen. It is possible to provide a service such as prompting the user to investigate or alerting the user, via an LED or display, etc., on the appliance. Moreover, when the account information from before the change of the user is still linked, that user may be notified via, for example, email, prompting the user to unlink his or her account information.

Once a user has been unlinked from a device, it is not preferable, from a data management viewpoint, to be able to reference logs of past users from the device. Logs that can be referenced should be limited to logs linked to the user, but there are instances in which information relevant to the safety of the user, such as information indicating that service life or service use frequency of the device has exceeded, should be conveyed to the user to ensure safe use of the appliance. In view of this, it is beneficial to manage, on the server, information cumulated from the initial use of the device to the current time separately from logs pertaining to usage by a user. Alternatively, it is possible to achieve the same effect by managing what users are linked during which period in the accumulated information.

This accumulated information linked to an appliance may be used by referencing it when a device is displayed on the floor of a retailer is sold or when an appliance is resold.

Next, a countermeasure, in the state estimation of device 10, for when device 10 has been stolen will be described.

Figure 50:
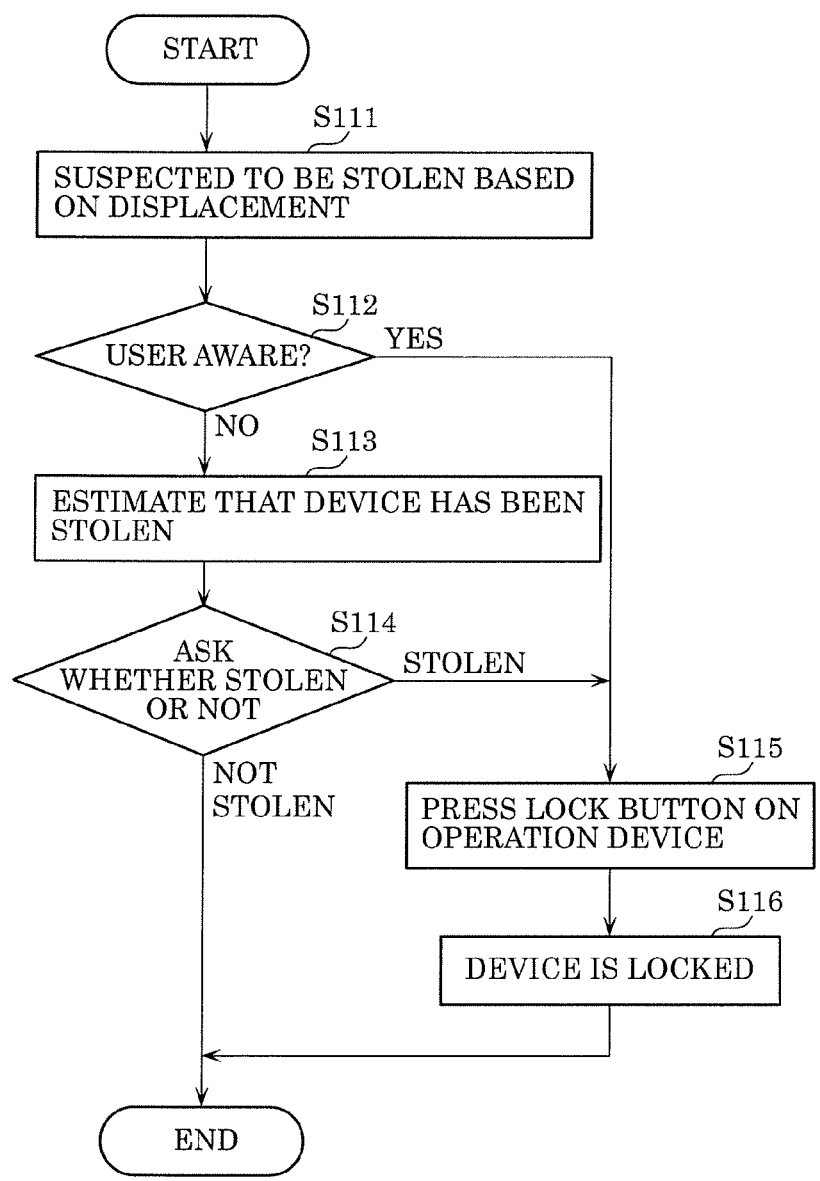
FIG. 50 is a flowchart illustrating processes for implementing countermeasures for when a device has been stolen.

FIG. 50 is a flowchart illustrating processes for implementing countermeasures for when device 10 has been stolen.

When device 10 is stolen, it is preferable to implement a function that locks device 10 linked to the user account of the user so that device 10 cannot be used by another user. Specifically, this function uses operation device 40, such as a smartphone, that was used to link device 10, to transmit, from operation device 40 to the stolen device 10, a command that locks the stolen device 10. Implementing this function makes it possible to prevent the use of device 10 by a user that dishonestly obtained device 10 by stealing device 10, and possible to prevent the ill-intentioned user from accessing past logs.

First, server 20 detects that device 10 is suspected to be stolen based on, for example, the position information and operation state transmitted by device 10 (S111).

If the user is aware that device 10 has been stolen, processing proceeds to step S115, and if the user is not aware, processing proceeds to step S113. Note that step S112 determines whether, before lapse of a predetermined period of time after step S111, information indicating the press of a lock button on the user's operation device 40 has been received from operation device 40 in step S115. Accordingly, when the lock button has not been pressed upon elapse of the predetermined period of time, processing proceeds to step S113.

In step S113, server 20 causes operation device 40 to send an inquiry to the user account linked to device 10 inquiring whether device 10 has been stolen or not (S114). This function makes it possible to, even when the user is not aware that the appliance has been stolen, alert the user that device 10 has been stolen by a message, such as "is the appliance in your home?" or "do you have the appliance with you?" being transmitted from the appliance to operation device 40.

Server 20 proceeds to step S115 upon receiving an input of "stolen" from operation device 40 in step S114. Note that in such cases, an input of "stolen" may be regarded as the pressing of the lock button in step S115.

In step S115, device 10 is locked upon the lock button being pressed. This makes it possible to prevent unauthorized use of device 10 by using the feature that locks device 10 to lock the appliance.

When an input indicating "not stolen" in step S114 is received from operation device 40, the processing is ended.

Next, the unlocking of a locked appliance will be considered. Since unauthorized use cannot be prevented if the appliance can be unlocked via one-factor authentication appliance-side, it is necessary to implement multi-factor authentication function by transmitting a confirmation of the unlocking to the linked user account. However, a user can conceivably maliciously abuse this function by, for example, reselling the appliance in a state in which the appliance is still linked to his or her user account and then locking the device after reselling the appliance. Therefore, it is necessary for the manufacturer to establish customer support for carrying out the unlocking. The manufacturer is contacted by a user whose user account is linked to the appliance in question, and determines whether to unlock the appliance or not.

Capability to communicate with the cloud using the communication module is a prerequisite when implementing the function for providing theft countermeasures. Accordingly, cases in which the communication module is removed upon stealing the appliance are conceivable. This may be addressed by causing the appliance to lock itself and keep itself locked while the communication module is removed.

In this way, when the third unique information received at the third time after the second time is different from the second unique information, controller 202 may determine that device 10 has been displaced, and may transmit, using communication unit 201, an inquiry inquiring whether device 10 has been stolen or not to a terminal possessed by the user. Next, when, after transmitting the inquiry, the inquiry response received from the terminal indicates that device 10 has been stolen, controller 202 may use communication unit 201 to transmit a control signal that locks device 10 to prevent usage of device 10. Here, upon receipt of the control signal, device 10 may lock itself to prevent usage of device 10. This makes it possible to lock device 10 when device 10 has been stolen so that another user cannot use device 10.

Here, locking device 10 so that device 10 cannot be used is, specifically, placing device 10 in a state in which device 10 does not receive user inputs via operation unit 111. For example, device 10 powers itself off and then places itself in a state in which it does not receive user inputs via operation unit 111. Moreover, when device 10 is a device that has as a door that opens and closes, such as a refrigerator, washing machine, microwave oven, or rice cooker, device 10 may be locked so that the door cannot be opened.

Next, in the state estimation of device 10, using a plurality of items of information to distinguish between whether the user has moved to a new residence or has transferred the device to a different user will be described.

Figure 51:
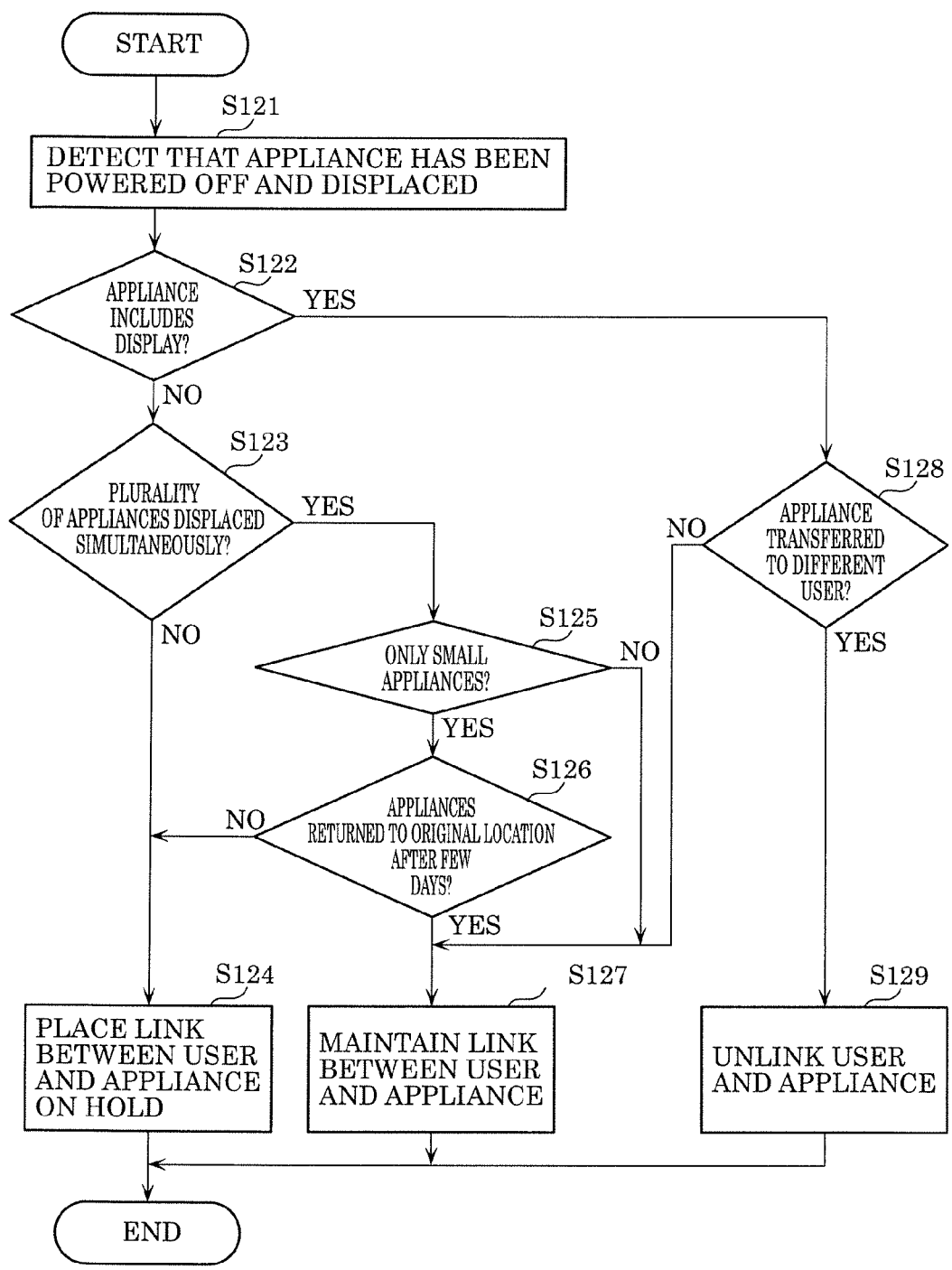
FIG. 51 is a flowchart of one example of processes for linking a user and a device when displacement of the device is detected.

FIG. 51 is a flowchart of one example of processes for linking a user and device 10 when displacement of device 10 is detected.

This flowchart illustrates one example of processes for distinguishing between whether the user has moved to a new residence or has transferred the device to a different user, using a combination of the determination methods described above.

Server 20 detects the powering off and displacement of device 10 (S121).

Server 20 determines whether device 10 includes a display or not (S122).

When server 20 determines that device 10 does not include a display (no in S122), server 20 determines whether a plurality of devices have been simultaneously displaced (S123).

When server 20 determines that a plurality of devices have not been simultaneously displaced (no in S123), server 20 puts the link between the user and device 10 on hold (S124).

In step S123, when server 20 determines that a plurality of devices have been simultaneously displaced (yes in S123), server 20 determines whether each of the plurality of displaced devices is a small appliance or not (S125).

When server 20 determines that each of the plurality of displaced devices is a small appliance (yes in S125), server 20 determines whether the plurality of devices have returned to their original location of usage after a few days (S126).

When server 20 determines that the plurality of devices have returned to their original location of usage after a few days (yes in S126), or when the result of step S125 is "no", server 20 maintains the link between the user and the plurality of devices (S127).

When server 20 determines that the plurality of devices have not returned to their original location of usage after a few days (yes in S126), processing proceeds to step S124.

In step S122, when server 20 determines that device 10 includes a display (yes in S122), server 20 transmits an inquiry to the user's operation device 40 inquiring whether the user has transferred device 10 to a different user to not (S128).

When server 20 receives a response from operation device 40 that the user has transferred device 10 to a different user (yes in S128), the user and the device are unlinked.

When server 20 receives a response from operation device 40 that the user has not transferred device 10 to a different user (no in S128), processing proceeds to step S127.

In this example, even in cases in which it is difficult to receive confirmation from the user because device 10 does not include a display, it is possible to determine that device 10 can continue to be used without placing the state of the link between the user and device 10 on hold when it can approximately be determined that the user moved to a new residence.

Figure 52:
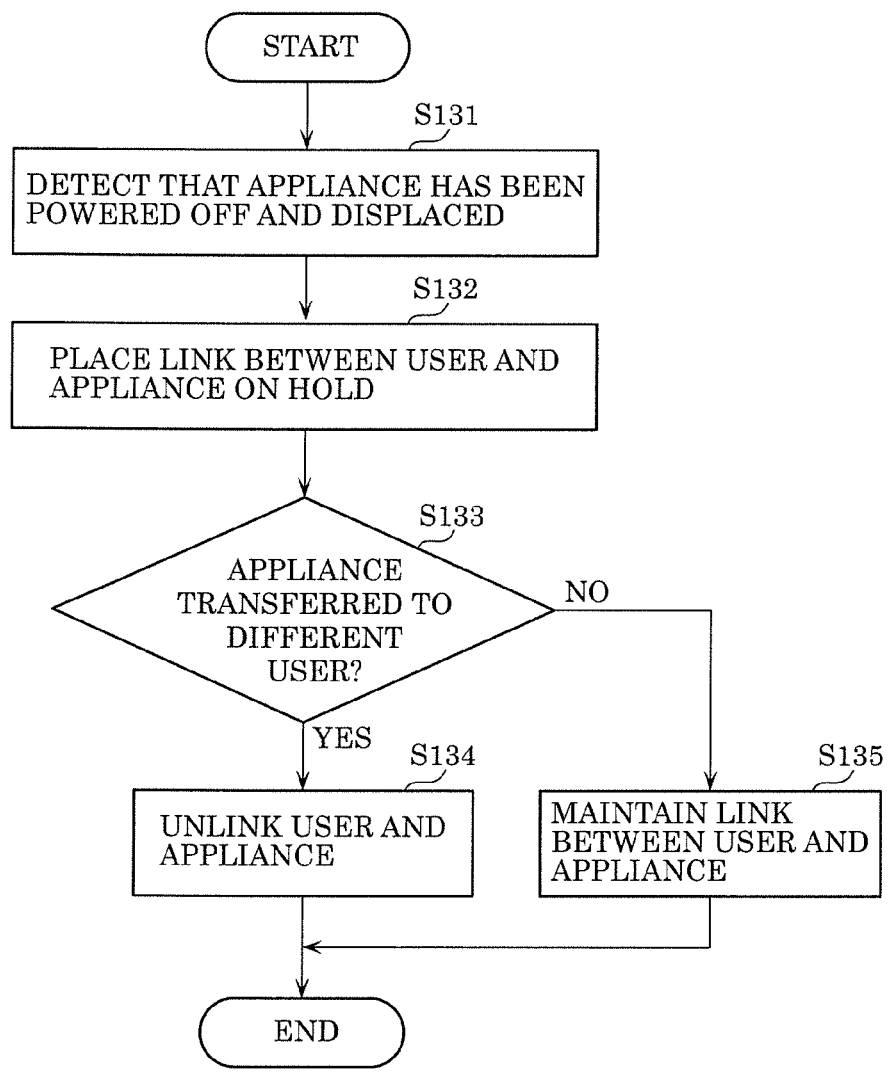
FIG. 52 is a flowchart of another example of processes for linking a user and a device when displacement of the device is detected.

FIG. 52 is a flowchart of another example of processes for linking a user and device 10 when displacement of device 10 is detected.

In contrast from the previous example, to ensure security, the link is firmly placed on hold in debatable situations by always requiring user confirmation. In this case, since performing confirmation processing each time each of the plurality of appliances is used is bothersome, in a state in which one appliance has been confirmed, a configuration that allows for the result to be shared by communication between IoT devices is preferable.

Here, server 20 detects the powering off and displacement of device 10 (S131).

Server 20 places the link between the user and device 10 on hold (S132).

Server 20 transmits an inquiry to the user's operation device 40 inquiring whether the user has transferred device 10 to a different user or not (S133).

When server 20 receives a response from operation device 40 that the user has transferred device 10 to a different user (yes in S133), the user and the device are unlinked.

When server 20 receives a response from operation device 40 that the user has not transferred device 10 to a different user (no in S133), the link between the user and the device is maintained (S135).

Next, a case, in the state estimation of device 10, in which the user changes the family structure settings, will be described.

Figure 53:
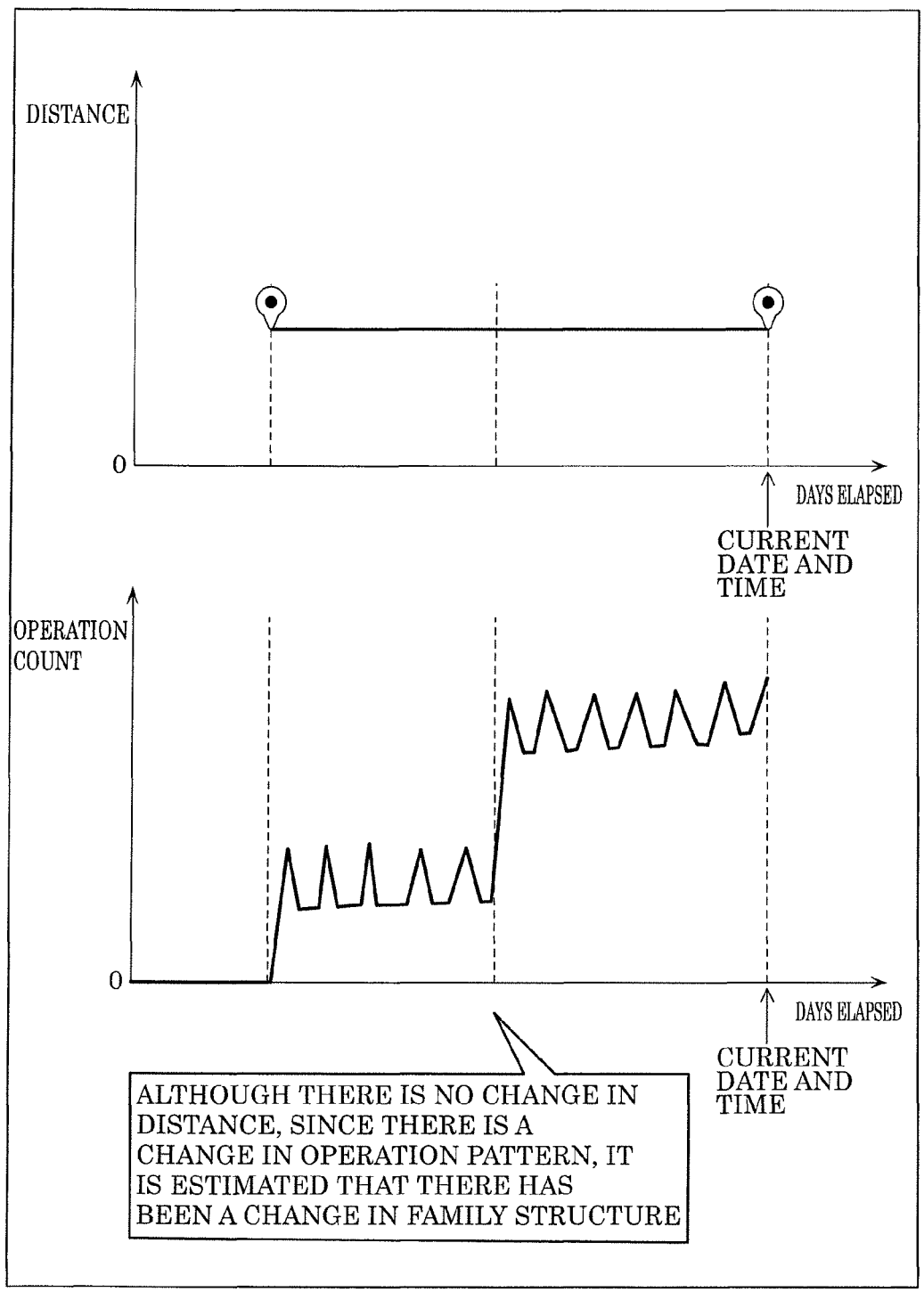
FIG. 53 illustrates a graph of a case in which it is estimated that the user has changed the family structure settings.

FIG. 53 illustrates a graph of a case in which it is estimated that the user has changed the family structure settings.

As illustrated in FIG. 53, the location of device 10 does not change but the operation count pattern greatly varies. In such cases, it is estimated that the family structure settings have been changed. It is conceivable that the user may experience changes in his or her family structure, such as changes in marital status or living arrangements with their parents. It is possible to provide services appropriate for the changes using, for example, an LED or display on the appliance, such as displaying product advertisements appropriate for the changes.

Next, a case, in the state estimation of device 10, in which device 10 is estimated to be malfunctioning or discarded will be described.

Figure 54:
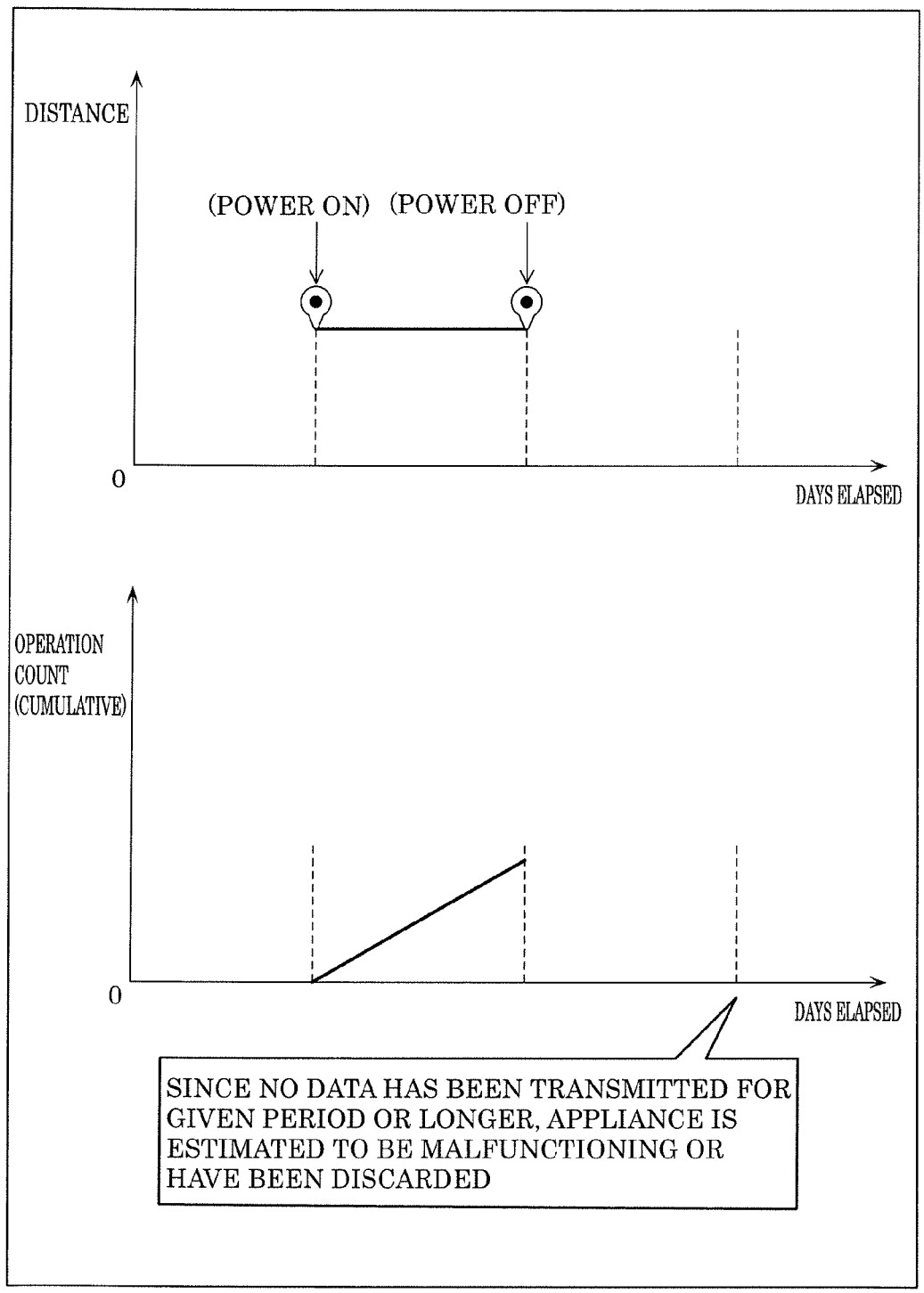
FIG. 54 illustrates a graph of a case in which it is estimated that a device is malfunctioning.
Figure 55:
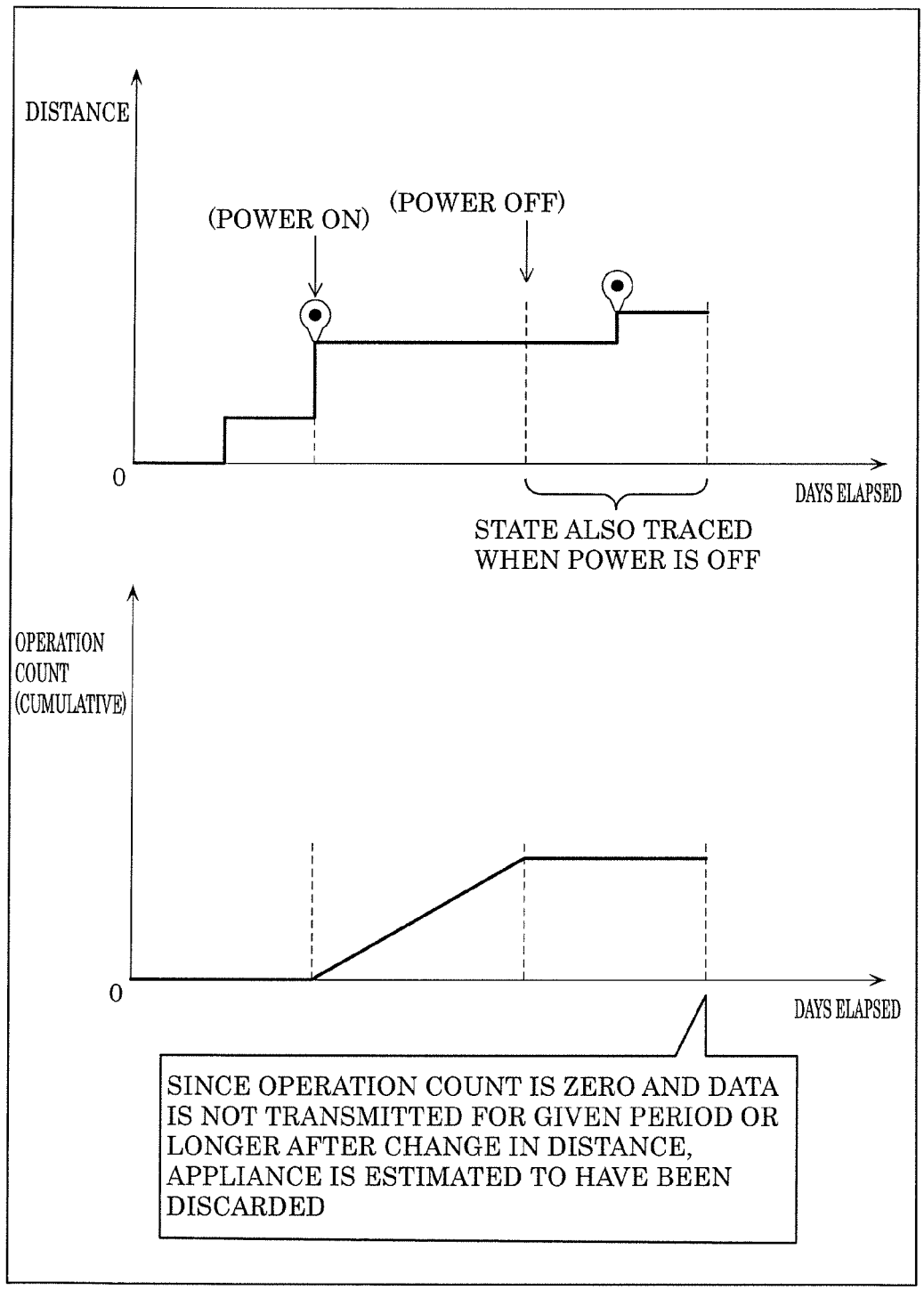
FIG. 55 illustrates a graph of a case in which it is estimated that a device has been discarded.

FIG. 54 illustrates a graph of a case in which it is estimated that device 10 is malfunctioning. FIG. 55 illustrates a graph of a case in which it is estimated that device 10 has been discarded.

As illustrated in FIG. 54 and FIG. 55, when server 20 does not receive the operation information and the position information for a given period of time or longer, server 20 estimates that device 10 is malfunctioning or has been discarded. Moreover, when device 10 is equipped with a battery for the communication module, server 20 may determine that device 10 has been discarded when, after the location of device 10 has changed, the operation count indicates zero and data has not been transmitted for a given period of time or longer.

Moreover, in cases in which device 10 is equipped with a battery for the communication module, when the location at which transmission was interrupted is within a specified range (incinerator plant or recycle center), server 20 can determine with near certainty that device 10 has been discarded. When such an appliance is subject to a recall, the appliance can be removed from the recall management list upon being determined to have been discarded. In cases in which an appliance has been erroneously determined to have been discarded and the appliance begins operating once again, communication should also be resumed, so a recall notification can be resent to cover such incidents. Accordingly, there is conceivably little risk in making an erroneous determination.

In this way, when server 20 does not receive operation information before elapse of a predetermined period starting at a fourth time after the second time, server 20 may change a management state of the plurality of items of the operation information received up to the fourth time to an unmanaged state.

Moreover, when communication unit 201 does not receive operation information before elapse of a predetermined period starting at a fourth time after the second time and fourth unique information received at the fourth time is identical to any one of a plurality of items of unique information included in a unique information list that is stored in advance, controller 202 may change a management state of a plurality of items of the operation information received up to the fourth time to an unmanaged state.

In this way, since server 20 does not manage device 10 when server 20 determines that device 10 is malfunctioning or has been discarded, the processing load required for management can be reduced.

The present disclosure relates to fourth generation household appliances that are always-connected to a cloud via LPWA (i.e., always-connected IoT appliances). Always-connected IoT appliances connect to a cloud without the user being particularly conscious of the connection, and services that make use of the cloud can be used. According to the present invention, state prediction of an appliance is realized based on log information and/or position information uploaded to a cloud by an always-connected IoT appliance.

With this function, it is possible to accurately determine what kind of state an appliance is in and how the appliance is being used, making it possible to provide functionality and information requested from the user at the corresponding time. Specifically, such functions include a function that prompts registering of a user account at the point in time that a sets up an appliance in their home after purchasing it, a function that, at the point in time that the user transfers the appliance to a different user, prompts the user to unlink his or her user account when the user forgets to, a function for timely notifying the user of recall information or performing remote maintenance in a case in which the appliance has been recalled. Expansion and provision of functions geared towards the user's lifestyle that could not be achieved with conventional microcontroller household appliances, such as accurately determining changes in lifestyle due to, for example, changes in residence or birth of a child, and displaying advertisements to the user that are geared toward their new lifestyle, can be realized.

As described above, the embodiment has been described as an exemplification of the technique according to the present disclosure. To this extent, the accompanying drawings and detailed description are provided.

Therefore, the elements described in the accompanying drawings and detailed description may include, not only those essential to solving the technical problems, but also those that are not essential to solving the technical problems but are included in order to illustrate the aforementioned technique. Thus, those unnecessary elements should not be deemed essential due to the mere fact that they are described in the accompanying drawings and the detailed description.

Furthermore, since the foregoing embodiments are for illustrating the technique according to the present disclosure, various changes, substitutions, additions, omissions, etc., can be carried out within the scope of the claims or its equivalents.

INDUSTRIAL APPLICABILITY

The present disclosure is applicable as a device management system or device management method, etc., which can efficiently manage a device.

The invention claimed is:

1. A household appliance management system, comprising:
   a server communicatively connected to a network;
   a plurality of base stations for long-distance wireless communication that are communicatively connected to the network; and
   an appliance that is communicatively connectable with the plurality of base stations, and when connected to at least one of the plurality of base stations, transmits, to the server via the at least one of the plurality of base stations, operation information indicating a current operation state of the appliance,
   wherein upon each receipt of the operation information, each of the plurality of base stations transmits, to the server, unique information which is unique to the each of the plurality of base stations together with the operation information that is received from the appliance when the appliance is connected to the each of the plurality of base stations,
   the server:
      receives the operation information and the unique information, and stores, in association with each other, the operation information and the unique information that are received at a corresponding time; and
      when first unique information received at a first time and second unique information received at a second time after the first time are different, separately manages a plurality of items of first operation information received in a first period ending at the first time and a plurality of items of second operation information received in a second period starting at the second time,
   the plurality of items of first operation information are transmitted from the appliance to the server via a first base station among the plurality of base stations,
   the first unique information is transmitted from the first base station to the server together with each of the plurality of items of first operation information, the plurality of items of second operation information are transmitted from the appliance to the server via a second base station among the plurality of base stations that is different than the first base station, and the second unique information is transmitted from the second base station to the server together with each of the plurality of items of second operation information.

2. The household appliance management system according to claim 1, wherein the server separately manages the plurality of items of first operation information and the plurality of items of second operation information by storing the plurality of items of first operation information in association with a first identifier and storing the plurality of items of second operation information in association with a second identifier different from the first identifier.

3. The household appliance management system according to claim 2, wherein the second identifier indicates association with a user using the appliance in the second period, and when third unique information received at a third time after the second time is different from the second unique information, the server determines that the appliance has been displaced, and transmits, to the appliance or a terminal possessed by the user, an inquiry as to whether the user of the appliance has changed to a different user.

4. The household appliance management system according to claim 3, wherein when, after transmitting the inquiry, a response from the appliance or the terminal to the inquiry received indicates that the user of the appliance has changed to the different user, the server manages a plurality of items of third operation information received in a third period starting at the third time, separately from the plurality of items of first operation information and the plurality of items of second operation information.

5. The household appliance management system according to claim 3, wherein when, after transmitting the inquiry, a response from the appliance or the terminal to the inquiry received indicates that the user of the appliance has not changed to the different user, the server manages a plurality of items of third operation information received in a third period starting at the third time, together with the plurality of items of second operation information.

6. The household appliance management system according to claim 1, wherein the appliance comprises a plurality of appliances, and when a plurality of items of the second unique information received from the plurality of appliances at the second time are identical, a plurality of items of third unique information received from the plurality of appliances at a third time after the second time are identical, and the second unique information and the third unique information are different, the server manages a plurality of items of third operation information received in a third period starting at the third time, together with the plurality of items of second operation information.

7. The household appliance management system according to claim 1, wherein when the server does not receive operation information before elapse of a predetermined period starting at a fourth time after the second time, the server changes a management state of a plurality of items of the operation information received up to the fourth time to an unmanaged state.

8. The household appliance management system according to claim 1, wherein when the server does not receive operation information before elapse of a predetermined period starting at a fourth time after the second time, and fourth unique information received at the fourth time is identical to any one of a plurality of items of unique information included in a unique information list that is stored in advance, the server changes a management state of a plurality of items of the operation information received up to the fourth time to an unmanaged state.

9. The household appliance management system according to claim 2, wherein the second identifier indicates association with a user using the appliance in the second period, the server:

when third unique information received at a third time after the second time is different from the second unique information, determines that the appliance has been displaced, and transmits, to a terminal possessed by the user, an inquiry as to whether the appliance has been stolen; and when, after transmitting the inquiry, a response to the inquiry received from the terminal indicates that the appliance has been stolen, transmits a control signal to the appliance that locks the appliance to prevent usage of the appliance, and upon receiving the control signal, the appliance locks itself to prevent usage.

* * * * *